United States Patent [19]
Johnson

[11] Patent Number: 5,367,627
[45] Date of Patent: * Nov. 22, 1994

[54] COMPUTER-ASSISTED PARTS SALES METHOD

[75] Inventor: Jerome D. Johnson, Mankato, Minn.

[73] Assignee: Clear with Computers, Inc., Mankato, Minn.

[*] Notice: The portion of the term of this patent subsequent to Feb. 1, 2011 has been disclaimed.

[21] Appl. No.: 133,986

[22] Filed: Oct. 12, 1993

Related U.S. Application Data

[63] Continuation of Ser. No. 959,525, Oct. 13, 1992, Pat. No. 5,283,865, which is a continuation of Ser. No. 435,809, Nov. 13, 1989, abandoned.

[51] Int. Cl.$^5$ .......................... G06F 3/14; G06F 15/24
[52] U.S. Cl. ..................................... 395/161; 364/401; 395/147
[58] Field of Search ............... 395/161, 156, 160, 147; 364/401, 403; 434/373, 365, 367, 428

[56] References Cited

U.S. PATENT DOCUMENTS

| | | | |
|---|---|---|---|
| 4,435,769 | 3/1984 | Nagano et al. | 364/464.01 |
| 4,775,935 | 10/1988 | Yourick | 364/401 |
| 4,931,929 | 6/1990 | Sherman | 364/401 |
| 4,964,043 | 10/1990 | Galvin | 364/401 |
| 4,972,318 | 11/1990 | Brown et al. | 364/401 X |
| 4,992,940 | 2/1991 | Dworkin | 364/401 |
| 5,053,956 | 10/1991 | Donald et al. | 364/401 |
| 5,146,404 | 9/1992 | Calloway et al. | 364/401 |
| 5,153,825 | 10/1992 | Yauk et al. | 364/401 |
| 5,309,355 | 5/1994 | Lockwood | 364/401 |

OTHER PUBLICATIONS

*Case IH Parts Counter Merchandiser* cover sheet and table of contents, Apr. 1990.
*JI Case Parts Price List*, vol. 1, (2 pp.), Mar. 1992.
*Read Me First*, CaseIH Operators Manual, CWC, Inc., Feb. 1989, pp. 1 to 7-12.
*Read Me First*, Cass Parts Guide, CWC, Inc., 1988, pp. 1-23.

Primary Examiner—Raymond J. Bayerl
Attorney, Agent, or Firm—Merchant, Gould, Smith, Edell, Welter & Schmidt

[57] ABSTRACT

A computerized system provides a salesperson with assistance related to training and sales of parts corresponding to particular products. More particularly, a computerized system incorporating a data storage device, a display apparatus, a part selection device and a user interface mechanism enhances the efforts of a parts salesman. The data storage device electronically stores graphic and textual partsrelated information including specifications, features and customer benefits. The display apparatus electronically displays portions of the graphic and textual information in order to provide training and sales assistance related to part features and customer benefits. The part selection device electronically selects a particular part by navigating through part choices menus based on stored part specifications. The user interface mechanism controls the operation of the display apparatus and the part selection device parts so that each of the respective parts are operatively coupled and related to one another.

15 Claims, 74 Drawing Sheets

FIG. 1C

| SEQUENTIAL DISPLAY GENERATION —148 |
|---|
| – COLOR SEQUENCE GENERATION —150<br>– CUSTOMIZED TEXT DISPLAY GENERATION —152<br>– CUSTOMIZED SEQUENCE GENERATION —154 |
| ANIMATED DEMONSTRATION GENERATION —156 |

| DEALER PERSONALIZATION —157 |
|---|
| CUSTOMER PERSONALIZATION —158<br>RETRIEVE STORED REPORT —160<br>UPDATE REPORT —162<br>PRINTED GRAPHICS GENERATION —164<br>PRINTED COLOR GENERATION —166 |

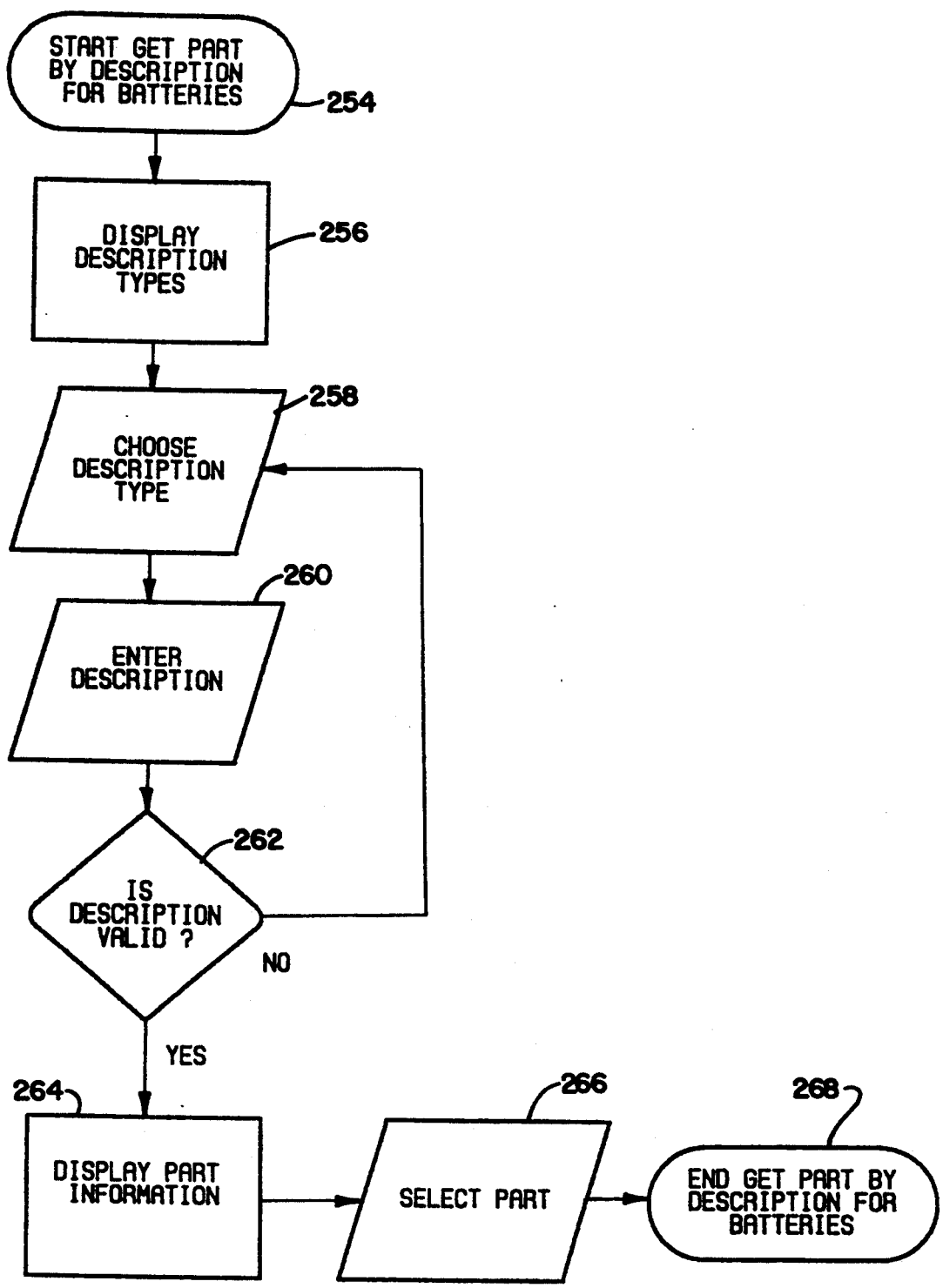

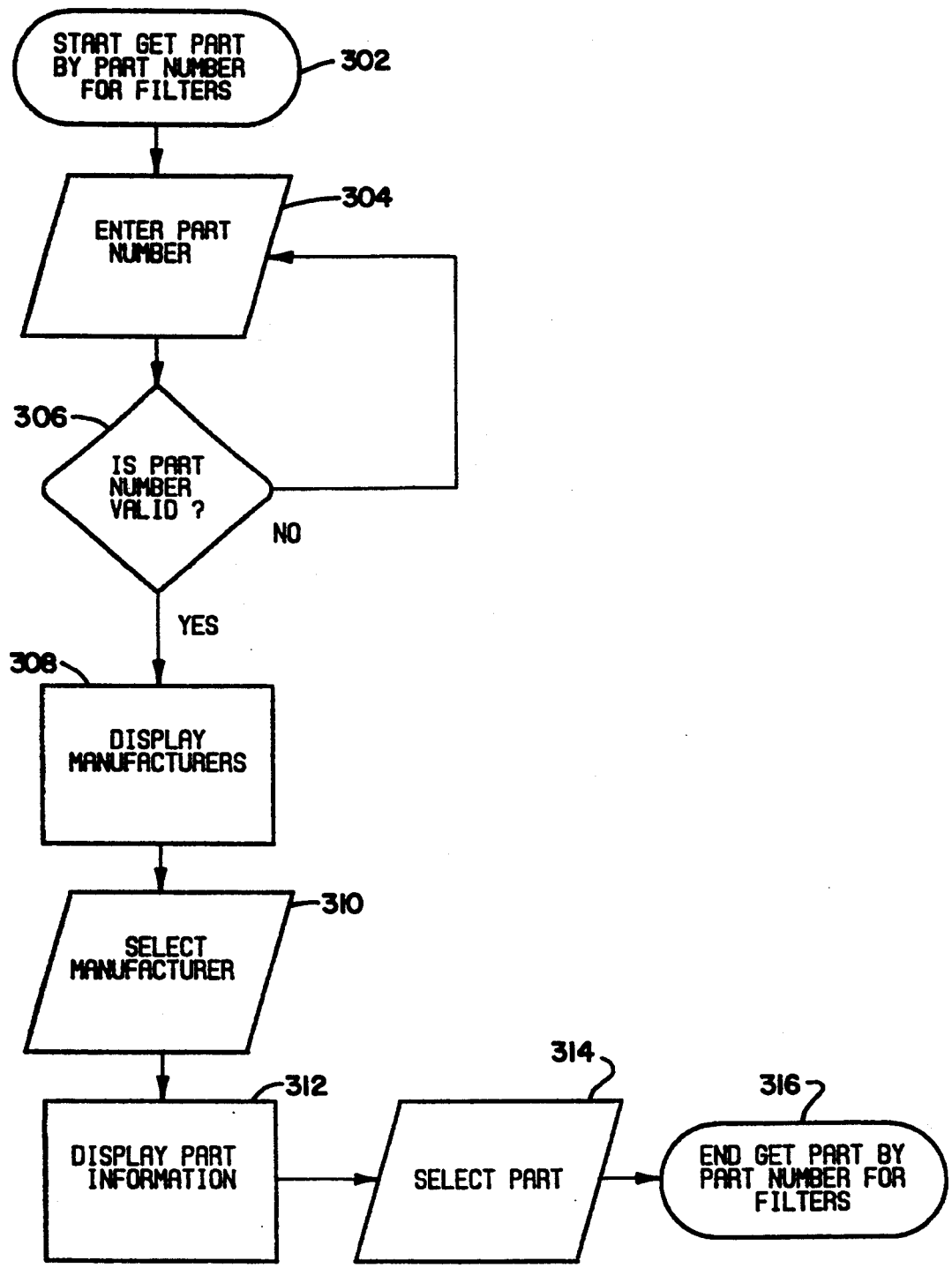

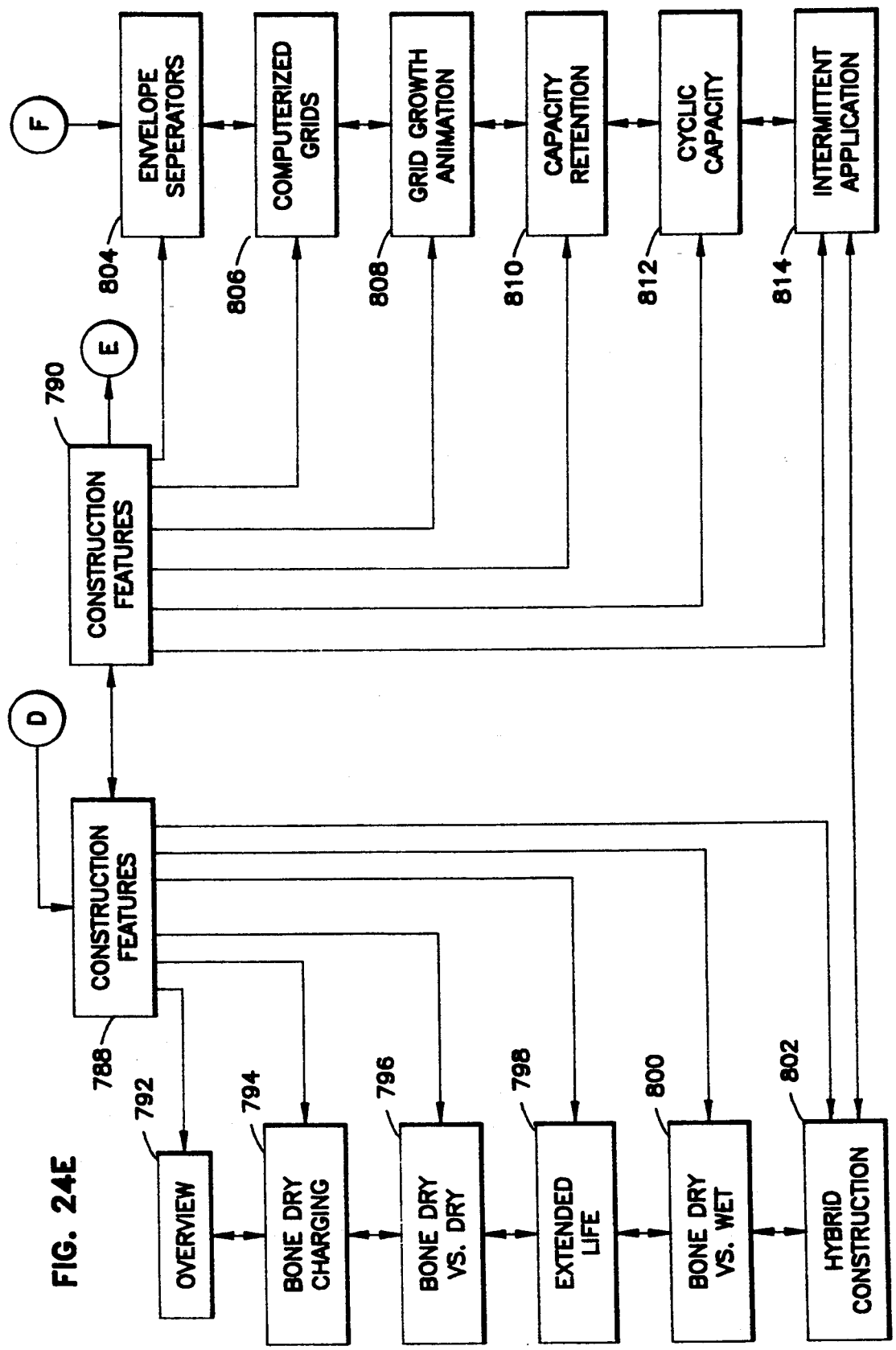

FIG. 25

| CASEIH PARTS Introduction | |
|---|---|
| QUICK REFERENCE<br>  Cross-Reference<br>  Product Information<br><br>PRESENTATIONS/PROPOSALS<br>  Customer Presentation<br>  Customer Equipment<br><br>TIME-SAVING TOOLS<br><br>GRAPHIC SLIDE SHOW<br><br>CUSTOMIZE<br><br>Leave CASS PARTS | Cross-Reference<br><br>Quickly find a part by entering a part number or a description of the equipment the part will fit |

| CASEIH PARTS Cross-Reference | |
|---|---|
| Batteries<br><br>Filters<br><br>Remanufactured<br>  Electric<br><br>Lubrication<br><br>Bearings<br><br>Main Menu | Batteries<br><br>Choose a battery by specifying:<br><br>1) CASE part number<br><br>    OR<br><br>2) Equipment Application<br>    (make & model)<br><br>    OR<br><br>3) Battery Specifications |

CASEIH PARTS
Limit Batteries

706

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

CASEIH PART #
_____

Specify the CASEIH Part number for the battery you wish to select.

Press right arrow when lit to go to order screen.

FIG. 28

CASEIH PARTS Unit — 708

Equipment
Add a unit

FIG. 30

Equipment
Add a unit

CASEIH PARTS
Unit
— 712

Manufacturer
———————
ACURA
ALFA ROMEO
ACADIAN (GM CANADA)
AMERICAN MOTORS
AMC/EAGLE/RENAULT
AUDI
AUSTIN
AUSTIN HEALEY
AUTO UNION-DKW
BEAUMONT (GM CANADA)
1 of 7

FIG. 31

CASEIH PARTS
Unit — 714

Equipment
Add a unit

Year
---
1970-77
1970-79
1973-74
1974-77
1974-79
1975-76
1978-79
1978-81
1980-81
1982
1 of 2

FIG. 33

| Equipment | CASEIH PARTS |
|---|---|
| ALL | Unit Units |
| AUDI | PASSENGER CARS |
| Add a unit | Manufacturer AUDI<br>Type ALL<br>Model All Models<br>Year 1970-77<br>Engine 80 |

```
                         CASEIH PARTS
                       Limit Batteries 42    12V   66 Plates 390 CC 50 MO 1 Battery(s) on unit
42    12V   66 Plates 390 CC 50 MO 1 Battery(s) on unit
42    12V   66 Plates 390 CC 50 MO 1 Battery(s) on unit AUDI  ALL MODELS  1970-77  ALL OTHERS
         Cold Cranking @ 0 deg F (min) 390  AMPS
         3.6  Qts Acid    18 lbs dry   27 lbs wet
         Dimensions (in) 9.31 x 6.87 x 6.87
         90 day full replacement, 50 Mo Warranty

PART NUMBER: B4250                              $  46.99
```

```
                        CASEIH PARTS
                       Limit Batteries    ┌─722

42  12V  66 Plates  390 CC  50 MO  1 Battery(s) on unit
42  12V  66 Plates  390 CC  50 MO  1 Battery(s) on unit
42  12V  66 Plates  390 CC  50 MO  1 Battery(s) on unit ┌─────────────────────┐
                   │  Report Selection   │
                   │                     │
                   │  1. Proposal/Order  │
                   │  2. Comparision     │
                   │  3. Application     │
                   └─────────────────────┘

AUDI  ALL MODELS  1970-77
      Cold Cranking @ 0 deg.F (min)  390 AMPS
      3.6  Qts Acid    18 lbs dry  27 lbs wet
      Dimensions (in)  9.31 x 6.87 x 6.87
      90 day full replacement, 50 Mo Warranty

PART NUMBER: B4250                          $   46.99
```

FIG. 36

```
                          CASEIH PARTS
                        Limit Batteries 42    12V   66 Plates   390 CC   50 MO   1 Battery(s) on unit
42    12V   66 Plates   390 CC   50 MO   1 Battery(s) on unit
42    12V   66 Plates   390 CC   50 MO   1 Battery(s) on unit Report Type
                              ───────────
                              1. Detailed
                              2. Summary AUDI   ALL MODELS   1970-77   ALL OTHERS
        Cold Cranking @ 0 deg F (min)  390  AMPS
        3.6 Qts Acid      18 lbs dry  27 lbs wet
        Dimensions (in)  9.31 x 6.87 x 6.87
        90 day full replacement, 50 Mo Warranty

PART NUMBER: B4250                              $  46.99
```

PROPOSAL / ORDER

↙ 726

| QTY | PART NUMBER | DESCRIPTION | PRICE EA ($) | PRICE TOTAL ($) |
|---|---|---|---|---|
| | | BATTERY: | | |
| 1 | B4250 AUDI | 42  12V  66 Plates 390 CC 50 MO ALL MODELS 1970-77 ALL OTHERS Cold Cranking @ 0 deg F (min) 390 AMPS 3.6 Qts Acid  18 lbs dry  27 lbs wet Dimensions (in) 9.31 x 6.87 x 6.87 90 day full replacement, 50 Mo Warranty | 46.99 | 46.99 |

S U M M A R Y

| Quantity | Product | | Price |
|---|---|---|---|
| 1 | BATTERY | $ | 46.99 |
| | BATTERY Subtotal: | $ | 46.99 |
| | Total: | $ | 46.99 |

X_____

X_____

Accepted by: _____

FIG. 38

PROPOSAL / ORDER

| QTY | PART NUMBER | DESCRIPTION | PRICE EA ($) | PRICE TOTAL ($) |
|---|---|---|---|---|
| | | | ~728 | |
| 1 | B4250 | BATTERY:<br>42  12V  66 Plates 390 CC 50 MO<br>AUDI  ALL MODELS 1970-77 ALL OTHERS | 46.99 | 46.99 |

S U M M A R Y

| Quantity | Product | | Price |
|---|---|---|---|
| 1 | BATTERY | $ | 46.99 |

BATTERY Subtotal: $ 46.99

Total: $ 46.99

X_____

Accepted by: X_____

CASEIH PARTS
Limit Batteries

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.

Multiple categories can be used.

BCI GROUP

Specify the BCI Group you wish to select a battery from.

Press right arrow when lit to go to order screen.

CASEIH PARTS
Limit Batteries

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.

Multiple categories can be used.

Cold Cranking Amps

Specify the Cold Cranking Amps the battery must deliver.

Press right arrow when lit to go to order screen.

FIG. 41

CASEIH PARTS
Limit Batteries

748

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.

Multiple categories can be used.

Reserve Capacity Minutes

Specify the Reserve Capacity Minutes the battery must deliver.

Press right arrow when lit to go to order screen.

FIG. 42

CASEIH PARTS
Limit Batteries

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.

Multiple categories can be used.

Voltage

Specify the required Voltage the battery must have.

Press right arrow when lit to go to order screen.

FIG. 43

CASEIH PARTS
Limit Batteries (752)

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.
Multiple categories can be used.

Dimensions (inches)

Will locate battery(s) of exact size or if not exact size, available battery(s) whose 3 measurements are within 1/2 inch smaller.

Press right arrow when lit to go to order screen.

FIG. 44

CASEIH PARTS
Limit Batteries

754

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

---

BATTERY SPECIFICATIONS

Choose which battery specification categories are to be used to limit battery choice.

Multiple categories can be used.

Warranty Months

Specify the number of months the battery must be covered by warranty.

Press right arrow when lit to go to order screen.

FIG. 45

CASEIH PARTS
Limit Batteries
756

CASEIH PART #

EQUIPMENT APPLICATION

BATTERY SPECIFICATIONS

BCI Group
Cold Cranking Amps
Reserve Cap Minutes
Voltage
Dimensions (inches)
Warranty Months
Price

BATTERY SPECIFICATIONS

Choose which battery specification categories are to be used to limit battery choice.

Multiple categories can be used.

Price

Specify the desired target price of the battery.

Press right arrow when lit to go to order screen.

FIG. 46

| CASEIH PARTS<br>Facts, the CASEIH story ||
|---|---|
| 730— DEALER NAME<br><br>BATTERIES<br><br>FILTERS<br><br>REMANUFACTURED<br>  ELECTRIC<br><br>LUBRICANTS<br><br>BEARINGS<br><br><br>Main Menu | DEALER NAME<br><br>Customized<br>information<br>for this<br>dealership |

FIG. 47

| CASEIH PARTS<br>Facts, the CASEIH story ||
|---|---|
| 732— DEALER NAME<br><br>BATTERIES<br><br>FILTERS<br><br>REMANUFACTURED<br>  ELECTRIC<br><br>LUBRICANTS<br><br>BEARINGS<br><br><br>Main Menu | DEALER NAME<br><br>Background<br><br>Parts<br><br>Service |

```
                    CASEIH PARTS
              Facts, the CASEIH story
                              |
                              |        BATTERIES
       DEALER NAME            |
                              |     Introduction
       BATTERIES              |
                              |     How a Battery
  734— FILTERS                |       Works
                              |
       REMANUFACTURED          |     Construction
         ELECTRIC             |       Features
                              |
       LUBRICANTS             |
                              |
       BEARINGS               |
                              |
                              |
       Main Menu              |
```

* WARRANTY
+ CASEIH stands behind their batteries with the best warranty in the industry, regardless of vehicle application Batteries for every purpose The Right Battery
Functions of a Battery
Charge/Discharge Cycle
   Fully Charged
   Discharging
   Totally Discharged
   Charging Screen 1 of 2

FIG. 54

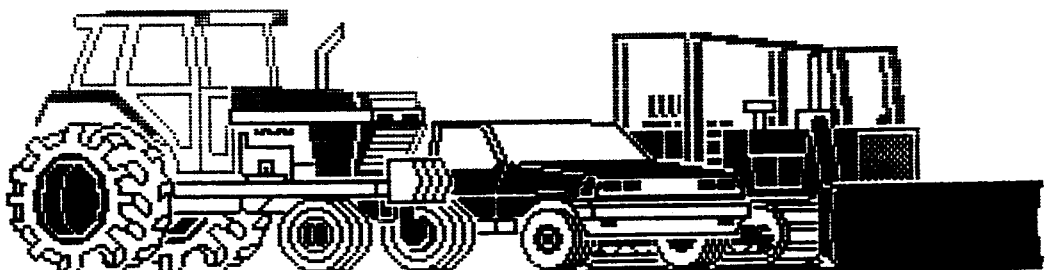

* THE RIGHT BATTERY FOR YOUR NEEDS
+ A wide selection of quality batteries, made in North America by skilled craftsmen, provide superior performance features for almost any application

FIG. 55

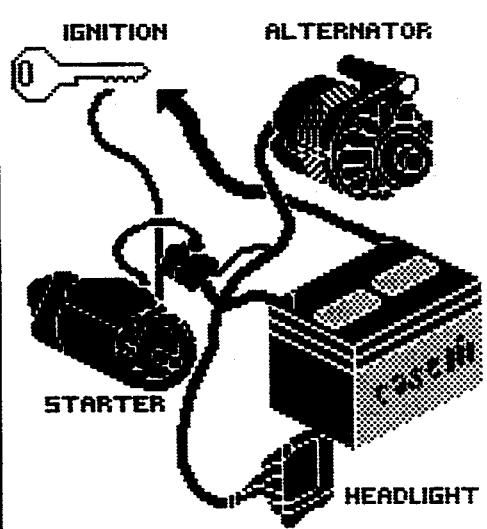

IGNITION  ALTERNATOR

STARTER

HEADLIGHT

MAIN FUNCTIONS OF THE BATTERY

1) Supply power to starter and ignition system

2) Supply extra power when vehicle's electrical load requirements exceed supply from charging system 3) Protect electrical system from temporarily high voltages

FULLY CHARGED
Electrolyte
( acid ) in battery
is at full strength
and plates are
ready to deliver
full voltage

DISCHARGING
Electrolyte
( acid ) is diluted
by water produced
and battery's
ability to deliver
a useful voltage is
lowered Cold Cranking Power
Engineering vs. Marketing Ratings
Reserve Capacity Screen 2 of 2

* COLD CRANKING CAPACITY
+ Amount of current battery can deliver for 30 seconds at 0 degrees without dropping below a specific voltage
+ Ability of battery to provide adequate power to start a cold engine based on manufacturer's standards

FIG. 76

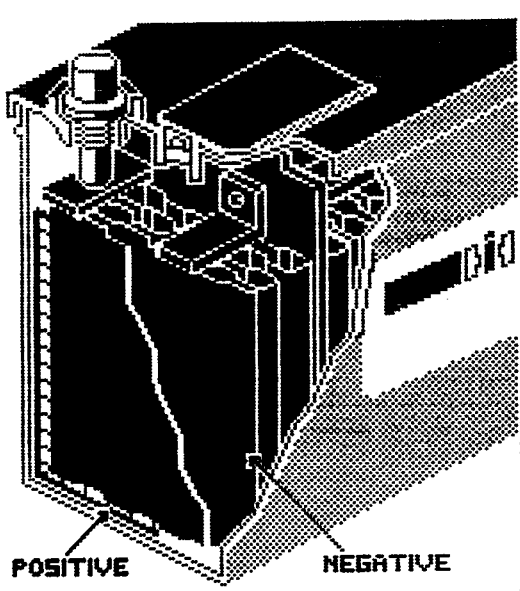

HYBRID BATTERY

+ The term "hybrid battery" means the positive grid alloy is a low antimony-lead alloy and the negative grid alloy is a calcium-lead alloy

POSITIVE       NEGATIVE

FIG. 77

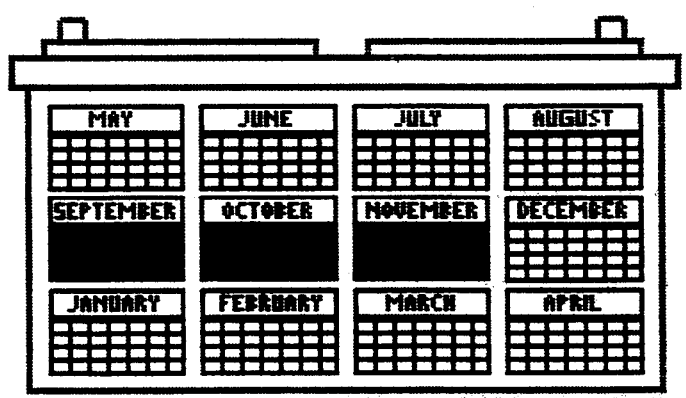

■ PERIOD OF ACTIVE APPLICATION

* INTERMITTENT APPLICATION
+ CASEIH hybrid battery is more suitable in starting a vehicle after standing for long periods of inactivity
+ Once the vehicle is started, the hybrid battery will accept charge quickly

FIG. 84

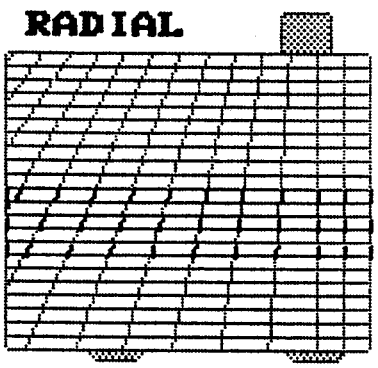 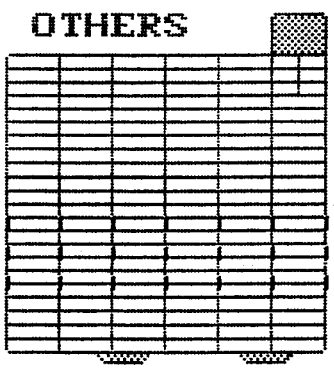

* COMPUTERIZED RADIAL GRIDS
+ Allow the shortest, most direct electrical flow to the terminals for faster starts
+ Developed by computer to guarantee the most efficient design possible

FIG. 85

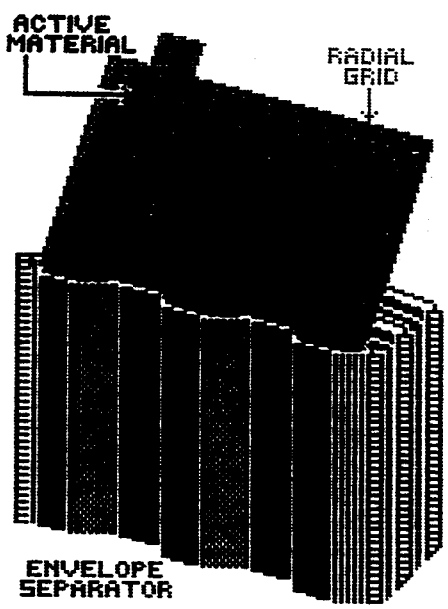

ENVELOPE SEPARATORS

+ Fully enclose grid plates to prevent direct grid-to-grid contact which results in a short circuit + Contain the shedding of active material from the grids due to vibration by keeping shed material in contact with grid FIG. 90
"FLAME ARRESTER" VENT PLUG
Allows gas to escape but prevents external flames or sparks from entering the battery
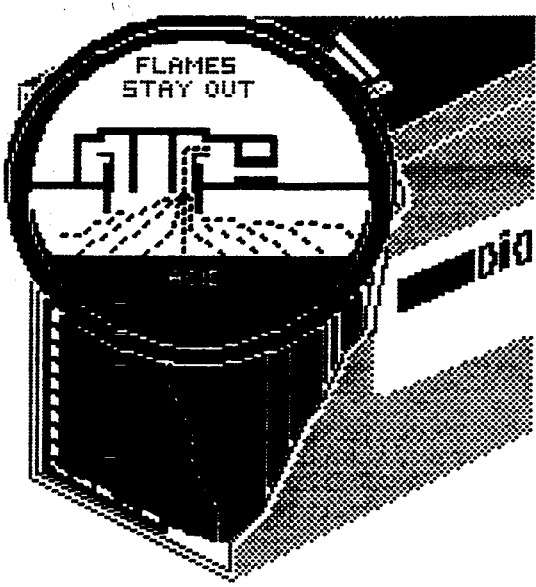
FIG. 91
 STANDARD     COMBINATION POST     TAPERED
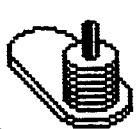 STUD TYPE     SIDE TERMINAL     L-TYPE
\* TERMINAL DESIGNS
+ CASEIH batteries offer a wide variety of terminal designs to meet your every need

COMPUTER-ASSISTED PARTS SALES METHOD

This is a continuation of application Ser. No. 07/959,525, filed Oct. 13, 1992, U.S. Pat. No. 5,283,865 which is a continuation of application Ser. No. 07/435,809, filed Nov. 13, 1989, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

Traditionally, a parts salesperson must carry with him or her all of the sales tools related to the particular kinds of parts that they wish to sell. These tools include parts catalogs, sample parts, and parts order forms. To carry the combination of all of these sales tools can be very cumbersome for a salesperson. For a salesperson to bring all of these sales tools into a customer visit could be quite difficult. In particular, if a parts salesperson must bring in parts catalogs for several types of parts as well as several different manufacturers of parts, and in addition the corresponding samples of each type of part by each of the manufacturers, the salesperson may find this overwhelming and choose to limit the number of parts that they sell or the particular manufacturers that they sell for.

Further, looking up a part number in a catalog can take significant amounts of time. In addition, trying to match a particular part with a particular need can be very difficult. For instance, trying to find a particular filter which will fit on a particular product may be impossible to accomplish in a limited amount of time. It can be even more difficult to determine all parts that a user with many types and brands of equipment may require. Further, the generation of a corresponding proposal or order, particularly a personalized one, has been difficult. An additional long felt need has been the need to educate sales people with respect to a particular product line of a manufacturer as well as the features and benefits of those particular products in comparison to other comparable products in a relatively quick and efficient manner.

The preferred system seeks to overcome these problems by linking these and other functions into a single system.

SUMMARY OF THE INVENTION

A computerized system is provided for providing a salesperson with assistance related to training and sales of parts corresponding to particular products. More particularly, a computerized system incorporating a data storage device, a display apparatus, a part selection device and a user interface mechanism is provided to enhance the efforts of a parts salesman. The data storage device electronically stores graphic and textual parts-related information including specifications, features and customer benefits. The display apparatus electronically displays portions of the graphic and textual information in order to provide training and sales assistance related to part features and customer benefits. The part selection device electronically selects a particular part by navigating through part choices menus based on stored Dart specifications. The user interface means controls the operation of the display apparatus and the part selection device parts so that each of the respective parts are operatively coupled and related to one another.

BRIEF DESCRIPTION OF THE DRAWINGS

FIG. 1C is a block diagram showing a detailed depiction of the elements of the preferred embodiment display apparatus.

FIG. 1D is a block diagram showing a detailed depiction of the elements of the preferred embodiment report generation apparatus.

FIG. 4 shows a flow chart diagramming a preferred embodiment selecting a battery by description.

FIG. 7 shows a flow chart diagramming a preferred embodiment selecting a filter by part number.

FIGS. 24A, 24B, 24C, 24D, 24E, and 24F show a flow chart diagramming an example of operating a preferred embodiment computer system from a users point of view.

FIG. 25 is a representation of an example menu/display screen for use in the example described from the users point of view.

FIG. 26 is a representation of an example menu/display screen for use in the example described from the users point of view.

FIG. 27 is a representation of an example menu/display screen for use in the example described from the users point of view.

FIG. 28 is a representation of an example menu/display screen for use in the example described from the users point of view.

FIG. 30 is a representation of an .example menu/display screen for use in the example described from the users point of view.

FIG. 31 is a representation of an example menu/display screen for use in the example described from the users point of view.

FIG. 33 is a representation of an example menu/display screen for use in the example described from the users point of view.

FIG. 34 is a representation of an example menu/display screen for use in the example described from the users point of view.

FIG. 35 is a representation of an example menu/display screen for use in the example described from the users point of view.

FIG. 36 is a representation of an example menu/display screen for use in the example described from the users point of view.

FIG. 37 is a representation of an example printed report for use in the example described from a users point of view.

FIG. 38 is a representation of an example printed report for use in the example described from a users point of view.

FIG. 39 is a representation of an example menu/display screen for use in the example described from the users point of view.

FIG. 40 is a representation of an example menu/display screen for use in the example described from the users point of view.

FIG. 41 is a representation of an example menu/display screen for use in the example described from the users point of view.

FIG. 42 is a representation of an example menu/display screen for use in the example described from the users point of view.

FIG. 43 is a representation of an example menu/display screen for use in the example described from the users point of view.

FIG. 44 is a representation of an example menu/display screen for use in the example described from the users point of view.

FIG. 45 is a representation of an example menu/display screen for use in the example described from the users point of view.

FIG. 46 is a representation of an example menu/display screen for use in the example described from the users point of view.

FIG. 47 is a representation of an example menu/display screen for use in the example described from the users point of view.

FIG. 54 is a representation of an example graphic display screen for use in the example described from the users point of view.

FIG. 55 is a representation of an example graphic display screen for use in the example described from the users point of view.

FIG. 76 is a representation of an example graphic display screen for use in the example described from the users point of view.

FIG. 77 is a representation of an example graphic display screen for use in the example described from the users point of view.

FIG. 84 is a representation of an example graphic display screen for use in the example described from the users point of view.

FIG. 85 is a representation of an .example graphic display screen for use in the example described from the users point of view.

FIG. 90 is a representation of an example graphic display screen for use in the example described from the users point of view.

FIG. 91 is a representation of an example graphic display screen for use in the example described from the users point of view.

DETAILED DESCRIPTION

Figure 1:
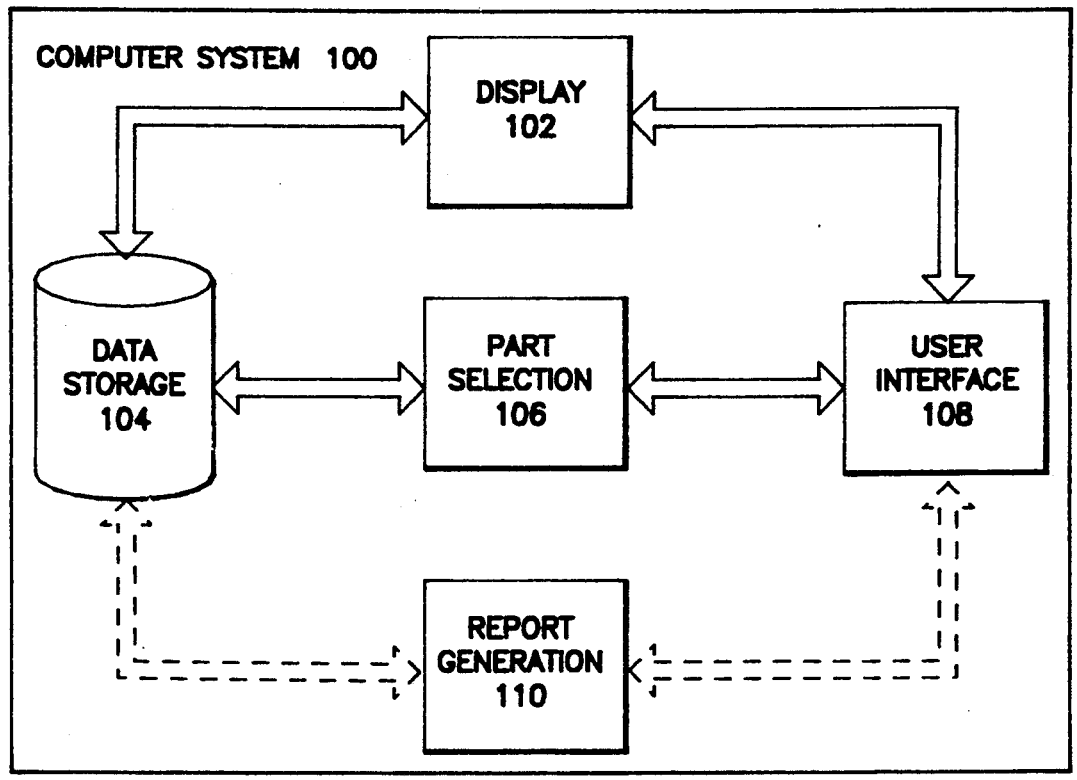
FIG. 1 is a block diagram showing a preferred embodiment of the present computerized system.

Referring now to FIG. 1, a computer system 100 is shown. The computer system 100 incorporates a display apparatus 102, a data storage device 104, a part selection device 106 and a user interface mechanism 108. The display apparatus 102 preferably is operatively interconnected to the data storage device 104 and the user interface mechanism 108. The data storage device 104 further preferably is operatively interconnected to the part selection device 106. In addition, part selection device 106 preferably is operatively interconnected to user interface mechanism 108.

Figure 1A:
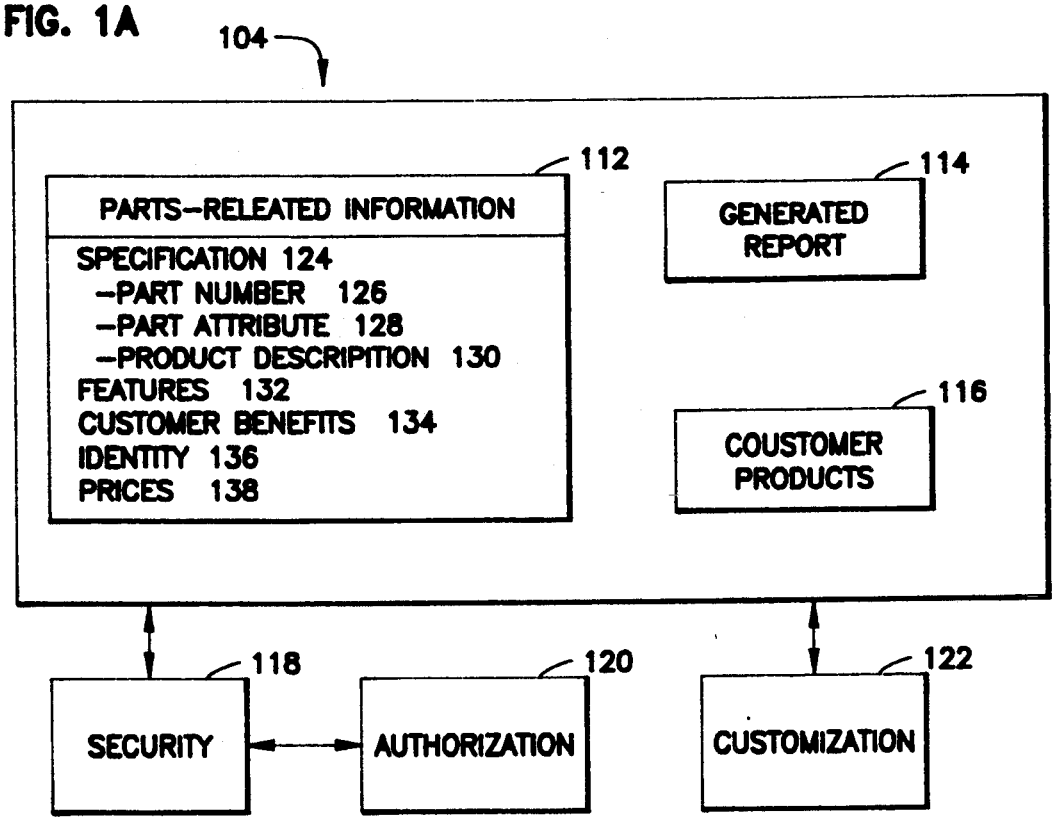
FIG. 1A is a block diagram showing a detailed depiction of the elements of the preferred embodiment data storage device.

Referring now to FIG. 1 in combination with FIG. 1A, the data storage device 104 electronically stores both graphic and textual part-related information 112 including specifications 124, features 132 and customer benefits 134. The specifications 124 may further include a manufacturers part number 126, a particular part's attributes 128 and a product description 130. The display apparatus 102 electronically displays portions of the stored graphic and textual information in order to provide training and sales assistance related to part features and customer benefits.

Figure 1B:
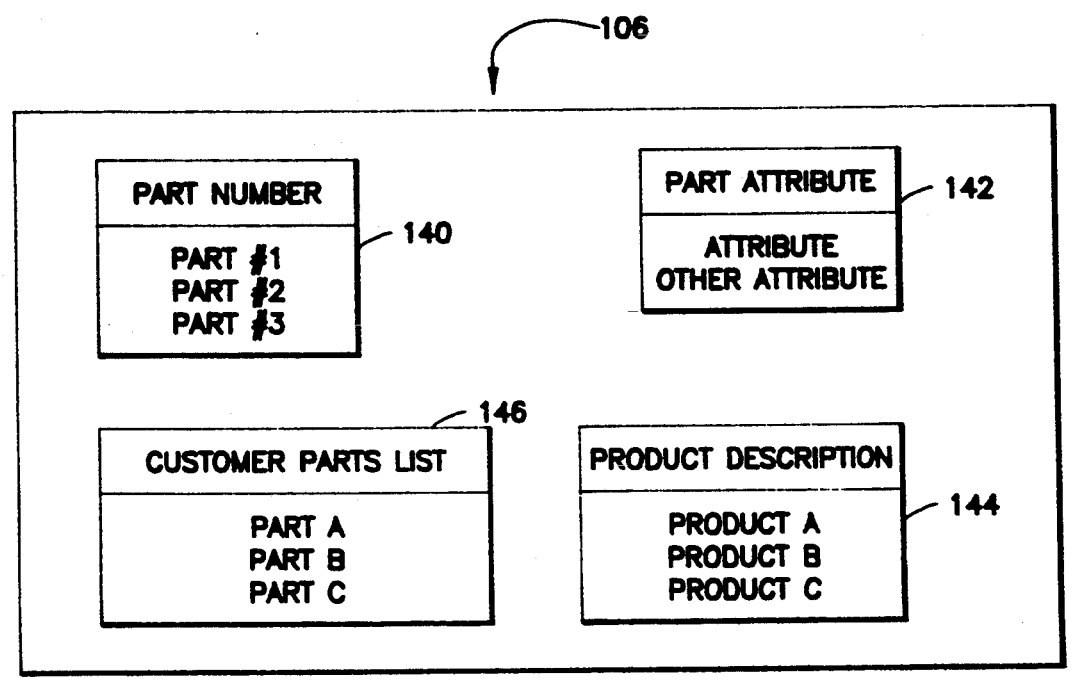
FIG. 1B is a block diagram showing a detailed depiction of the elements of the preferred embodiment part selection device.

Referring now to FIG. 1 in combination with FIG. 1B and more particularly to part selection device 106, part selection device 106 provides for electronically selecting a particular part by navigating through a plurality of part choices menus. Those part choices menus could, for example, encompass a part number menu 140, a part attribute menu 142 or a product description menu 144. A part choices menu based on part numbers such as menu 140 would typically include a plurality of part numbers in a list which a user might select from. Preferably a part choices menu based on part attributes such as menu 142 would typically include a plurality of part attributes which may be shared by one or more parts. A part choices menu based on a product description would include a plurality of products or product classes such that, after navigation through several menus, a particular product description satisfying particular constraints can be found.

User interface mechanism 108 controls the operation of the display apparatus 102 and the part selection device 106 so that a user may use either part of computer system 100 or both parts of the computer system 100 at a particular instance.

The computer system 100 may further be enhanced by operating the part selection device 106 in a manner such that a particular part may be selected by selecting a choice in a first part choices menu and successively selecting a choice in a second part choices menu. For example, the first part choices menu may include a list of generic types of parts and the second part choices menu may include a list of particular parts of a particular generic type. The part selection device 106 may further include a mechanism for generating a second part choices menu based upon choices made in the first part choices menu. In addition, part selection device 106 further may provide a mechanism for dynamically generating the first and second part choices menus from the electronically stored part-related information in data storage device 104.

The computer system 100 may further be enhanced by including a report generation apparatus 100, shown in FIG. 1, and by storing part identity information 136 and part prices 138 in data storage device 104. The computer system 100 may further include a report generation apparatus 110 which preferably is operatively interconnected to data storage device 104 and the user interface mechanism 108. Referring now to FIG. 1, FIG. 1B and FIG. 1D in combination, the report generation apparatus is typically configured to generate a printed report that includes part identity information 136 and part price 138 corresponding to the identified part. The report generation apparatus 110 may further include a mechanism for generating a printed report that includes specifications 124 related to the particular part identified in the report. Preferably, the report generation apparatus 110 further includes a parts dealer personalization mechanism 157 for generating a printed report customized for a particular parts dealer. In addition, the reports generation apparatus 110 preferably further includes customer personalization mechanism 158 for generating a printed report automatically personalized to a particular customer.

Computer system 100 may further be enhanced by electronically storing a generated report 114 in data storage device 104 as shown in FIG. 1A, and by modifying report generation apparatus 110 to include a retrieve stored report mechanism. The retrieve stored report mechanism may be configured to retrieve a stored generated report 114 from the data storage device 104 and to include an update report mechanism 162 for revising the stored generated report to include updated parts related information. The report generation apparatus 110 may further be enhanced by including a mechanism for generating a report including graphically displayed part-related information, a mechanism for printing a report in a plurality of colors. For example, a generated report includes graphics printed in red, green and black to enhance the readability of the printed report or the overall appearance of the printed report.

Preferred computer system 100 further incorporates within the data storage device 104 a security access mechanism 118 for preventing access to portions of the electronically stored information without proper authorization. Such a data storage device 104 also typically includes an authorization mechanism 120 for providing proper authorization to the security access mechanism, thereby allowing access to portions of the electronically stored information to which access was previously prevented. Such a combination of a security access mechanism 118 and authorization mechanism 120 may comprise of a data inscription and password protection scheme, a security card and security card reader, a key and lock mechanism, or combination lock mechanism.

Preferred data storage device 104 further includes a customization mechanism 122 for customizing the protected stored parts-related information after proper authorization has been provided by the authorization mechanism 120. For example, a user may wish to prevent other users from viewing some portion of the parts-related information stored within the data storage device 104. Alternatively, a particular user may wish to prevent other users from modifying particular information stored within data storage device 104 without his or her authorization. Such stored information which a user may desire to protect in this manner could be pricing information on part numbers or customer-related information.

Preferred computer system 100 comprises a system for generating and electronically storing a customer products database 116, as shown in FIG. 1A, through the use of the parts selection device 106 in combination with the data storage device 104. In particular, with such a system, a user may select particular products used by a customer through the part selection device 106 and subsequently store that information in a customer products database 116 within the data storage device 104. Subsequently, the part selection device 106 can retrieve information from the customer products database 116 and generate a customer parts list 146, as shown in FIG. 1B, corresponding to at least a portion of the products used by the customer.

Computer system 100 may be incorporated for use in a portable personal computer or a desktop personal computer. Alternatively, computer system 100 may reside at least in part on an electronic computer network so that one or more users can share electronically stored parts-related information via the network.

Preferred computer system 100 incorporates into display apparatus 102 a mechanism for sequential display generation 148 as shown in FIG. 1C. The sequential display generation mechanism 148 may be configured to generate a sequential display of graphic and textual information including portions of the stored graphic and textual parts related information within data storage device 104. Such an enhancement may further be enhanced by providing a color sequence generation mechanism 150 for displaying graphic and textual information in a plurality of colors. Another preferred enhancement to such a sequential display generation mechanism 148 is a text display generation customization mechanism which allows a user to generate custom textual displays for use in a sequential display of graphic and textual information. For instance, a parts dealer may wish to incorporate into such a sequential display information about the parts display dealership, about advantages to particular parts manufacturers or specific parts pricing information. Furthermore, such a sequential display generation mechanism 148 may comprise a sequential generation customization mechanism wherein a user may customize the sequence of displaying graphic and textual information to suit his or her particular needs. In addition, display apparatus 102 may also be enhanced by incorporating an animated demonstration generation mechanism 156 for generating an animated demonstration. For example, an animated demonstration of how a particular part or combination of parts works or particular features of parts may be very informative.

The following is a description of a preferred embodiment computerized system for providing a salesperson with assistance related to training and sales of parts corresponding to particular products. The system as generally described in FIG. 1, 1A, 1B, 1C and 1D will further be detailed in the following preferred embodiment discussion. In the preferred embodiment discussion that follows, the user may select from several generic types of parts to look up a particular part under a cross-referencing/parts selection procedure. In the preferred embodiment, the types of parts under the cross-referencing/parts selection procedure include batteries, filters, remanufactured electric parts, lubrication and bearings.

Figure 2:
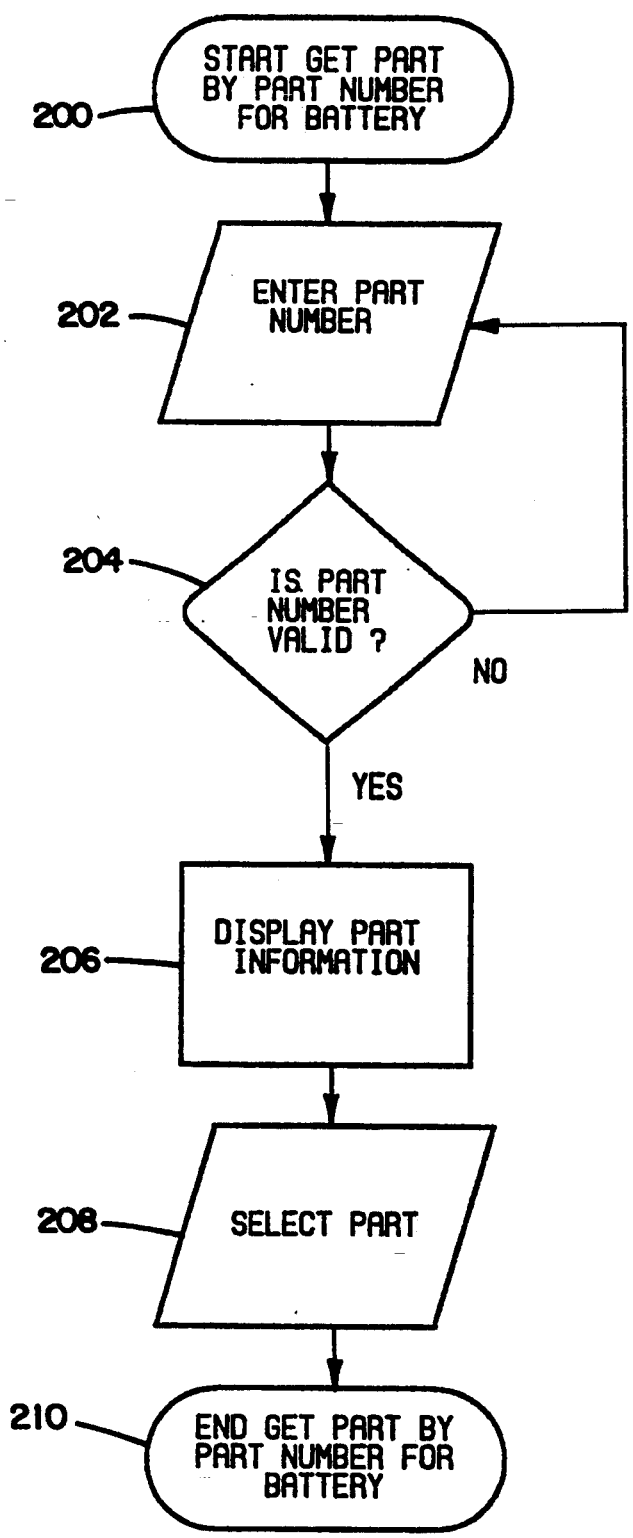
FIG. 2 shows a flow chart diagramming a preferred embodiment selecting a battery by part number.

Referring now more particularly to the preferred battery cross-referencing section as depicted in FIG. 2, 3A, 3B, 4, 5 and 6, a user may choose a battery by specifying a part number, equipment application or battery specifications. More particularly, FIG. 2 is a flow chart diagramming a preferred procedure for selecting a battery by a part number. Upon selecting the choice of specifying a battery by part number 200, a user is prompted to enter a part number 202. Subsequently, part selection device .206 will check if the part number is valid 204. If the part number is not valid, part selection device 106 will prompt the user to enter a part number 202. Otherwise, if the part number is valid, the part selection device 106 will display particular part information 206 and select that particular part 208. To select that particular part 208, part selection device 106 accesses the battery information 300 stored in data storage device 104 and shown in FIG. 6 to choose a particular part 250. By using the cross-reference file 294 in conjunction with the part number, a particular set of information is retrieved from battery information 300. Subsequently, the part selection device 106 ends the procedure get part by part number for battery 210.

Alternatively, a user may choose to pick a particular battery by specifying a particular equipment application for the battery. In choosing the particular equipment application, part selection device 106 preferably will go through a set of steps as depicted in the flow chart shown in FIG. 3A and 3B. In choosing to pick a part by equipment application 212, part selection device 106 will retrieve information stored in data storage device 104.

Figure 5:
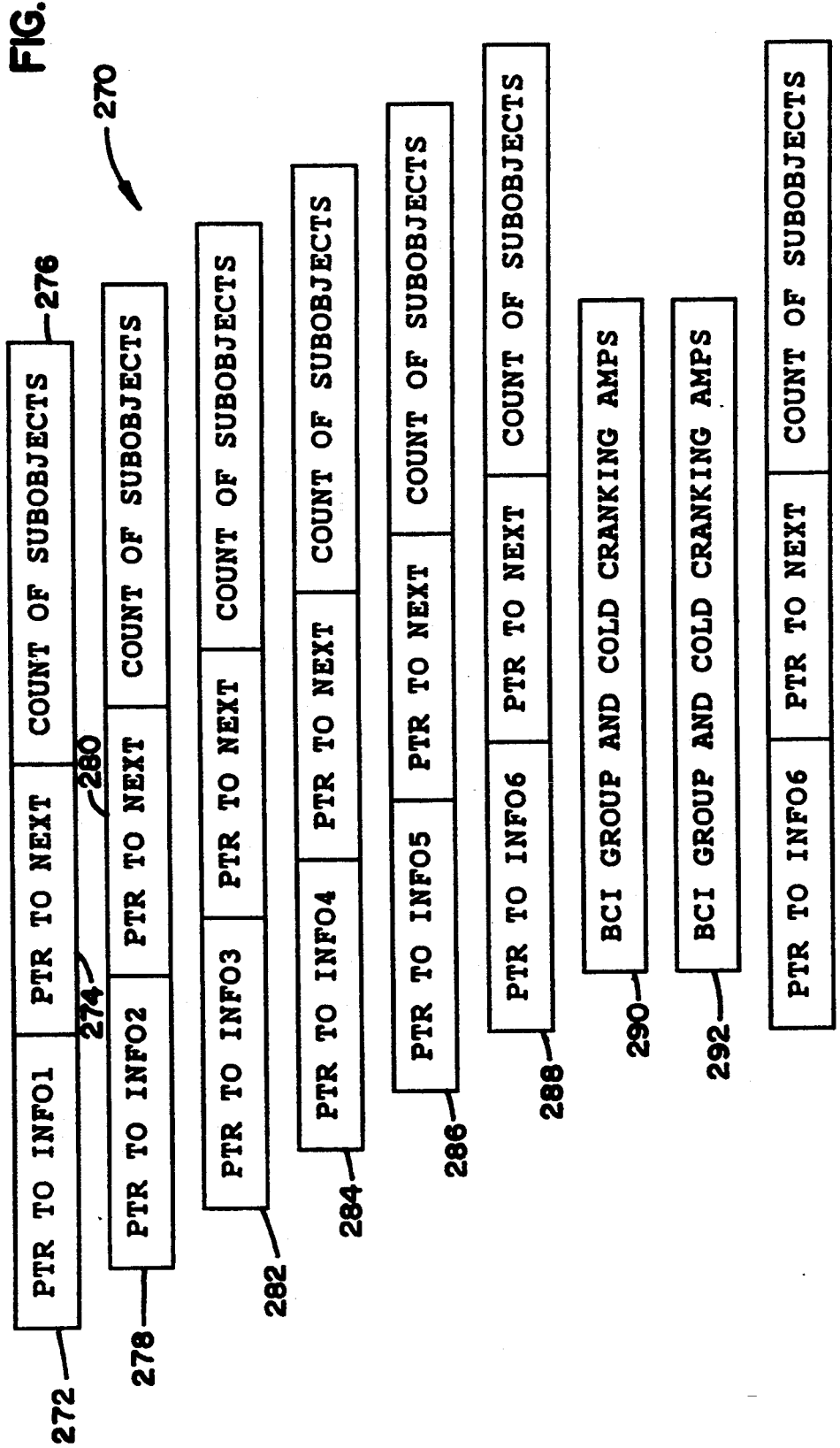
FIG. 5 shows a preferred embodiment file structure for use in selecting a battery by application.

The information stored in data storage device 104 preferably is in a structured form 270 as depicted in FIG. 5. The preferred structured file format 270 for batteries comprises several records including a first and second pointer as well as subobject count information. The records shown are configured in a hierarchical format with seven layers of hierarchy. In the preferred embodiment, on the first level of the hierarchy, are records for info 1 data. Each record for info 1 data includes a pointer 272 to particular information for that particular info 1 data, a pointer 274 to the next record of info 1 data and a count of subobjects 276 for the set records related to that particular info 1 data record. The subsequent record following the first info 1 record in preferably the first subobject related to the first info 1 record or more specifically a record related to info 2 data including a pointer 278 to the info 2 data and a pointer 280 to the next info 2 record also related to that particular info 1 data record which was selected. This hierarchy of records continues further down into the record including a pointer 282 to info 3 data. Similarly, the next record shown includes a pointer 284 to info 4 data, with the next record including a pointer 286 to info 5 data. Furthermore, the next record is shown including a pointer 288 to info 6 data. Finally, the following record preferably includes BCI group and cold cranking amps data 290 for a particular battery, with the next record including BCI group and cold cranking amps data 292 for another battery. It will be appreciated by those skilled in the art that the above discussion was merely a simple example of what a structure form 270 might include. The form 270 might further include more records at each level of the hierarchy to accommodate addition part data in the structured form 270.

Figure 3A:
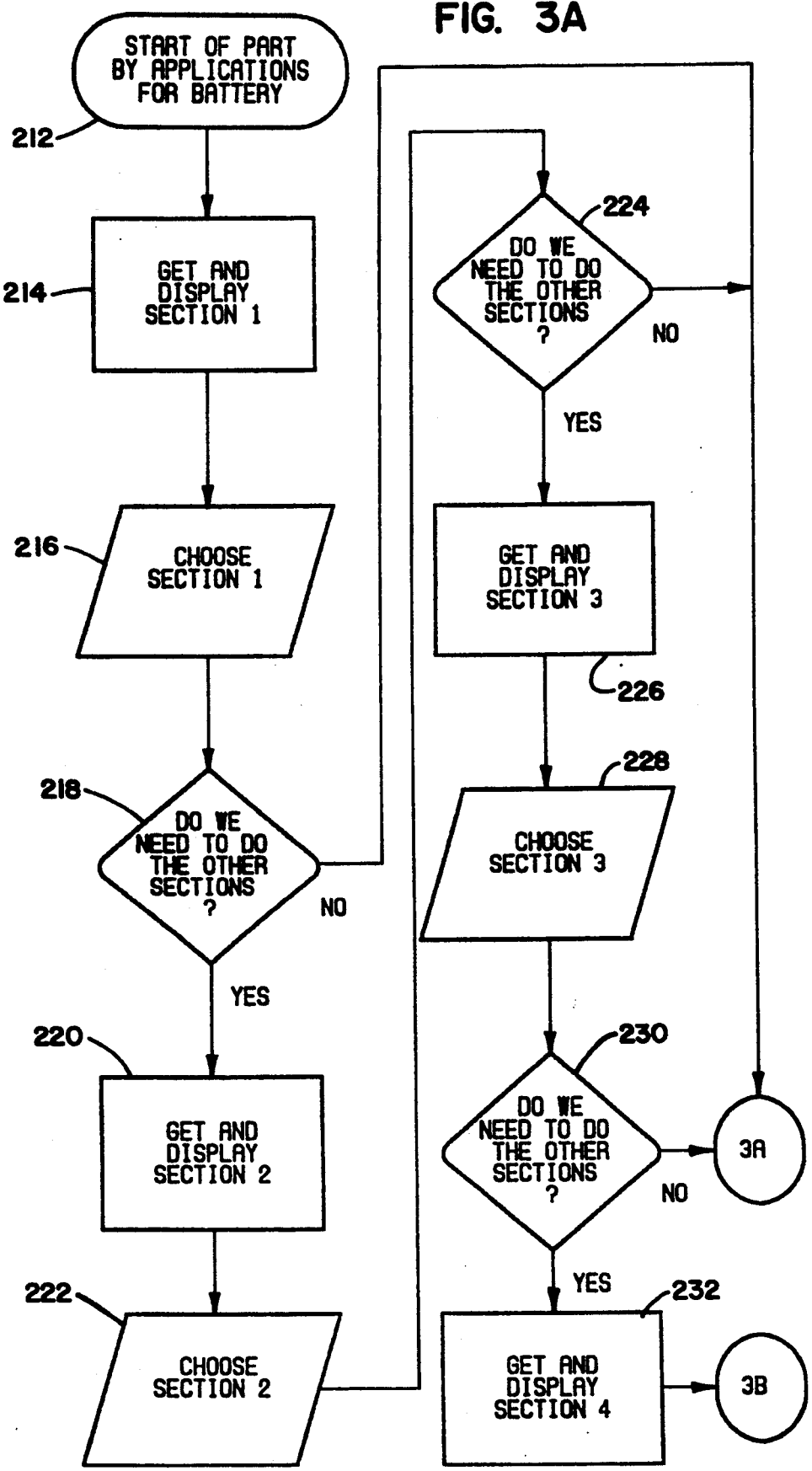
FIG. 3A and 3B show a flow chart diagramming a preferred embodiment selecting a battery by application.
Figure 3B:
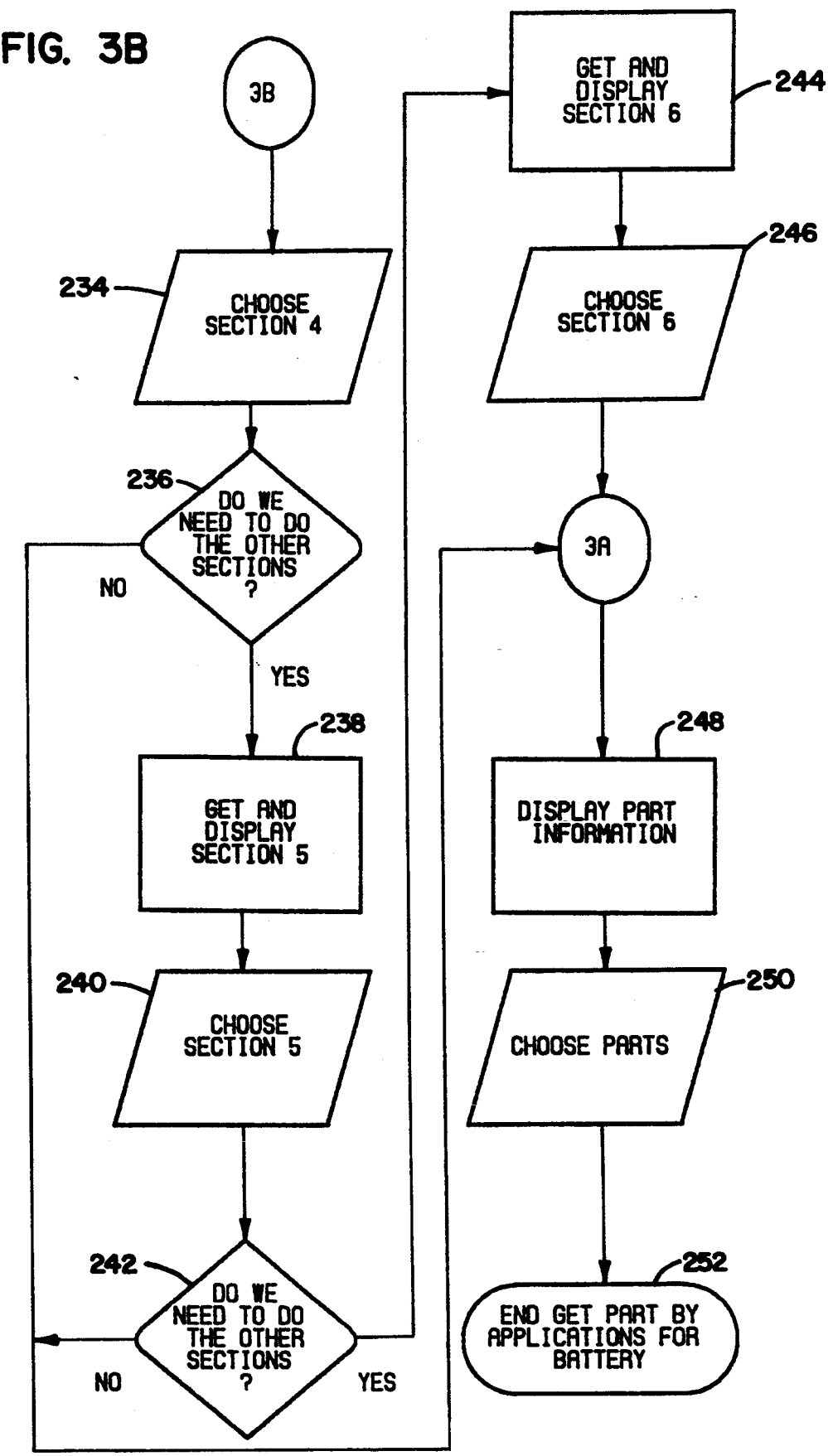

Referring now to FIG. 3A and 3B, after a user chooses to select a particular battery by equipment application 212, preferred part selection device 106 gets and displays section 1 information at 214. This section 1 information may be derived from all records in file format for battery cross-reference 270 which have a pointer 272 to info 1 data. The information may be derived by accessing file 270 and the first record containing a pointer 272 to info 1 data and subsequently accessing each record pointed to by a pointer 274 which points to the next record having a pointer to info 1 data. This process is typically repeated until the pointer which points to the next record having a pointer to info 1 data does not contain a pointer to another record having a pointer to info 1 data.

Subsequently, a user typically selects one of the elements from the section 1 information 216 and the part selection device 106 determines whether other sections are needed to particularly define the equipment application 218. If another section level is not needed to completely define the battery for a particular equipment application, part selection device 106 will display part information 248. Otherwise, part selection device 106 will get and display section 2 information 220 from file 270 records in a similar manner as was used to get and display section 1 information. These records typically include the first record following the info 1 record selected in section 1 choosing step 216, wherein the record following the first record comprises a pointer 278 to info 2 data, and further includes data derived from all records in the sequence of records including the pointer to the next info 2 data record.

Subsequently, a user typically selects one of the elements from the section 2 information 220 and the part selection device 106 checks if other sections are needed to particularly define the equipment application 224. If another section level is not needed to completely define the battery for a particular equipment application, part selection device 106 displays part information 248. Otherwise, part selection device 106 will get and display section 3 information 226 from file 270 records in a similar manner as was used to get and display section 1 information. These records typically include the first record following the info 2 record selected in section 2 choosing step 222, wherein the record following the first record comprises a pointer 282 to info 3 data, and further includes data derived from all records in the sequence of records including the pointer to the next info 3 data record.

Subsequently, a user may select one of the elements from the section 3 information 228 and the part selection device 106 checks if other sections are needed to particularly define the equipment application 230. If another section level is not needed to completely define the battery for a particular equipment application, part selection device 106 displays part information 248. Otherwise, part selection device 106 will get and display section 4 information 232 from file 270 records in a similar manner as was used to get and display section 1 information. These records would include the first record following the info 3 record selected in section 3 choosing step 228 wherein the record following the first record comprises a pointer 284 to info 4 data and would further include data derived from all records in the sequence of records including the pointer to the next info 4 data record.

Subsequently, a user typically selects one of the elements from the section 4 information 234 and the part selection device 106 checks if other sections are needed to particularly define the equipment application 236. If another section level is not needed to completely define the battery for a particular equipment application, part selection device 106 displays part information 248. Otherwise, part selection device 106 will get and display section 5 information 238 from file 270 records in a similar manner as was used to get and display section 1 information. These records would include the first record following the info 4 record selected in section 4 choosing step 234 wherein the record following the first record comprises a pointer 286 to info 5 data and would further include data derived from all records in the sequence of records including the pointer to the next info 5 data record.

Subsequently, a user may select one of the elements from the section 5 information 240 and the part selection device 106 checks if other sections are needed to particularly define the equipment application 242. If another section level is not needed to completely define the battery for a particular equipment application, part selection device 106 displays part information 248. Otherwise, part selection device 106 will get and display section 6 information 244 from file 270 records in a similar manner as was used to get and display section 1 information. These records would include the first record following the info 5 record selected in section 5 choosing step 240 wherein the record following the first record comprises a pointer 288 to info 6 data and would further include data derived from all records in the sequence of records including the pointer to the next info 6 data record.

Subsequently, a user typically selects one of the elements from the section 6 information 246 and part selection device 106 displays part information 248.

Figure 6:
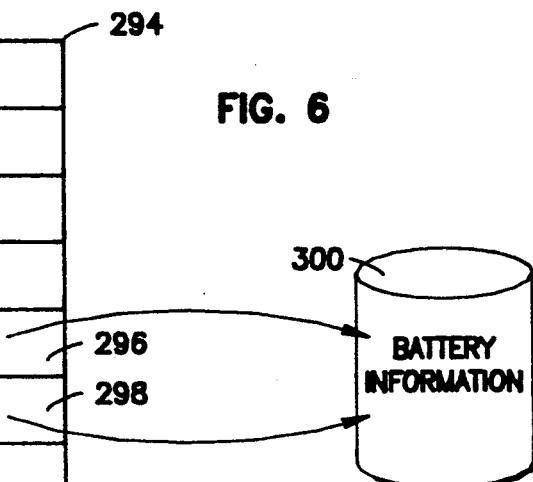
FIG. 6 shows a preferred embodiment file structure for use in selecting a battery by part number and description.

After displaying the part information 248, part selection device 106 accesses the battery information 300 stored in data storage device 104 and shown in FIG. 6 to choose a particular part 250. By using the cross-reference file 294 in conjunction with the particular BCI group and designated cold cranking amps for the particular part, a particular set of information is retrieved from battery information 300. Subsequently, the part selection device 106 ends the get part by applications for battery procedure 252.

Alternatively, a user may choose to pick a particular battery by specifying a particular battery description. In specifying the particular battery description, part selection device 106 preferably will go through a set of steps as depicted in the flow chart shown in FIG. 4. In choosing a particular battery by battery description 254, preferred part selection device 106 will retrieve parts-related information by using cross-reference file 294 in combination with battery information 300 depicted in FIG. 6. The cross-reference file 294 and battery information 300 are stored in data storage device 104. The part selection device 106 displays battery description types 256. These description types may include BCI number, cold cranking amps, reserve capacity, voltage, length of battery, width of battery, height of battery, warranty period, and price of the battery. The part selection device 106 prompts a user to choose a description type 258. Upon a user specifying a particular parameter for the battery description 260, the part selection device 106 checks to see if the description is valid 262. If the description is not valid, then the parts selection device 106 returns to prompting the user to choose a description type 258. Otherwise, if the description is valid, the part selection device 106 displays the part information which is defined by the description entered 264. This part information may include more than one part if more than one part meets the constraints entered in the part description 260. A user typically will select as much of the battery description as is needed to specify only a few battery parts. Subsequently, preferred part selection device 106 prompts the user to select a particular part 266 from the displayed part information. Upon selection of the particular part, the part selection device accesses the cross-reference file 294 to retrieve the particular part information from battery information 300. Subsequently, the part selection device 106 ends the get part by description for battery procedure 268.

Figure 8A:
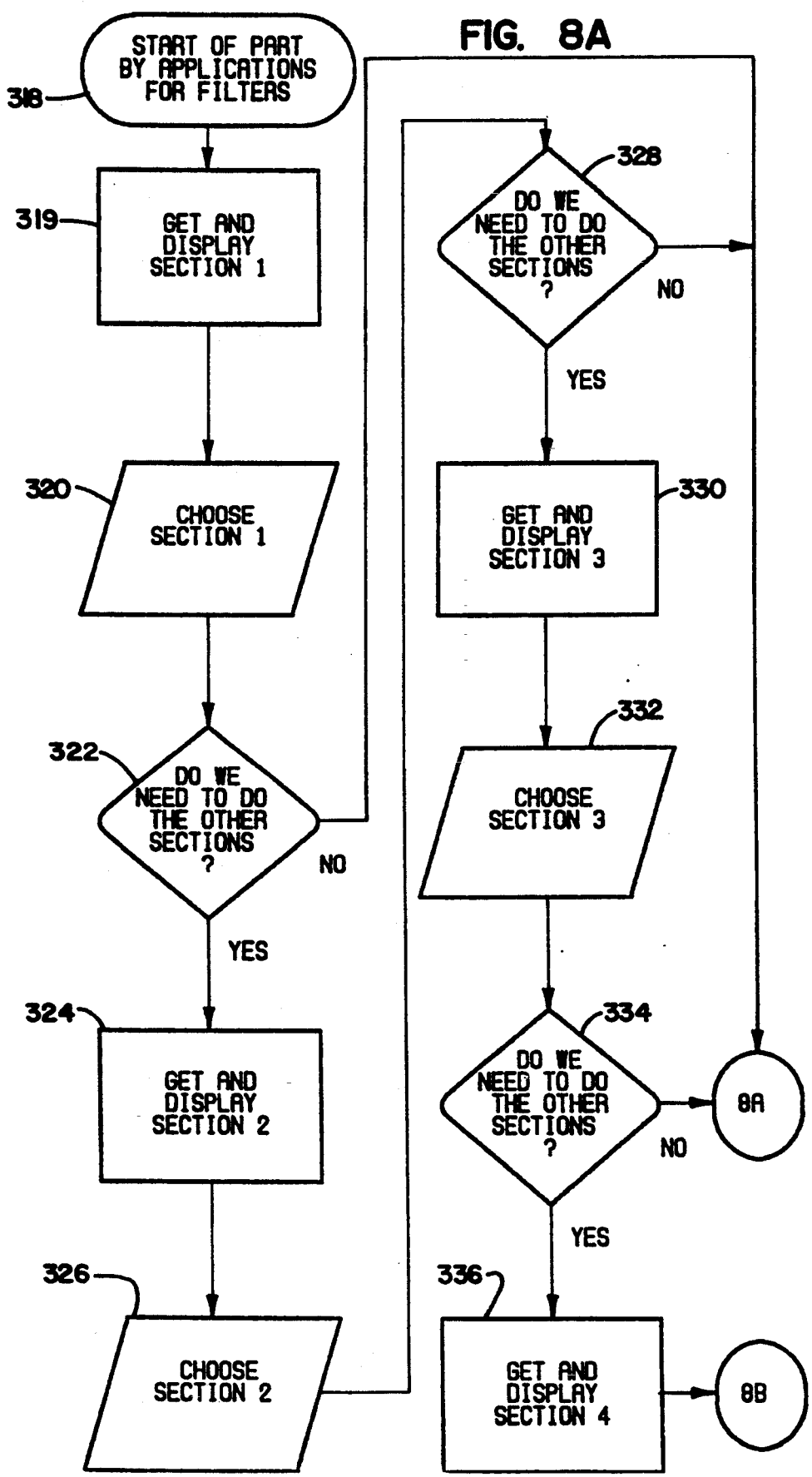
FIG. 8A and 8B show a flow chart diagramming a preferred embodiment selecting a filter by application.
Figure 8B:
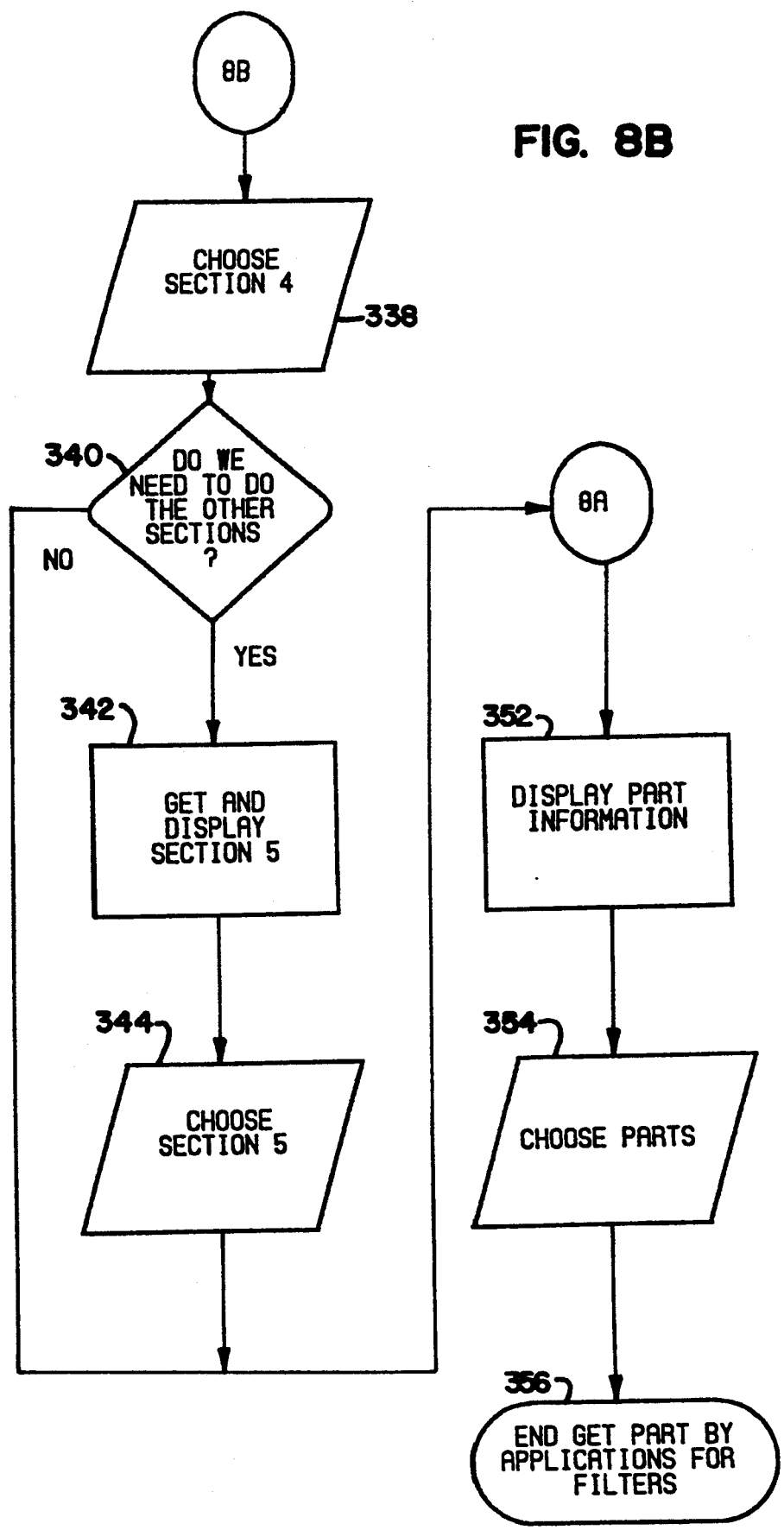
Figure 9:
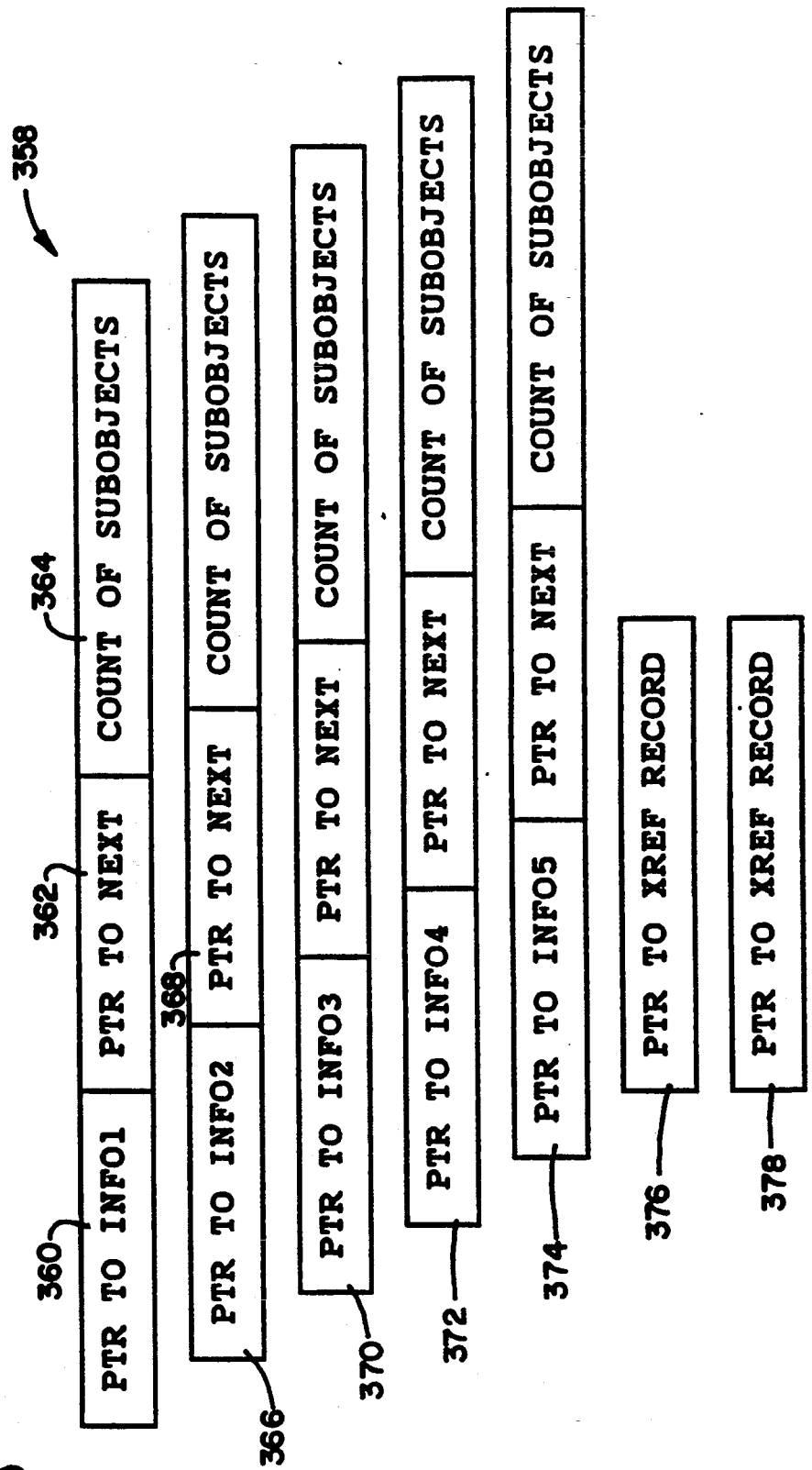
FIG. 9 shows a preferred embodiment file structure for use in selecting a filter by application.
Figure 10:
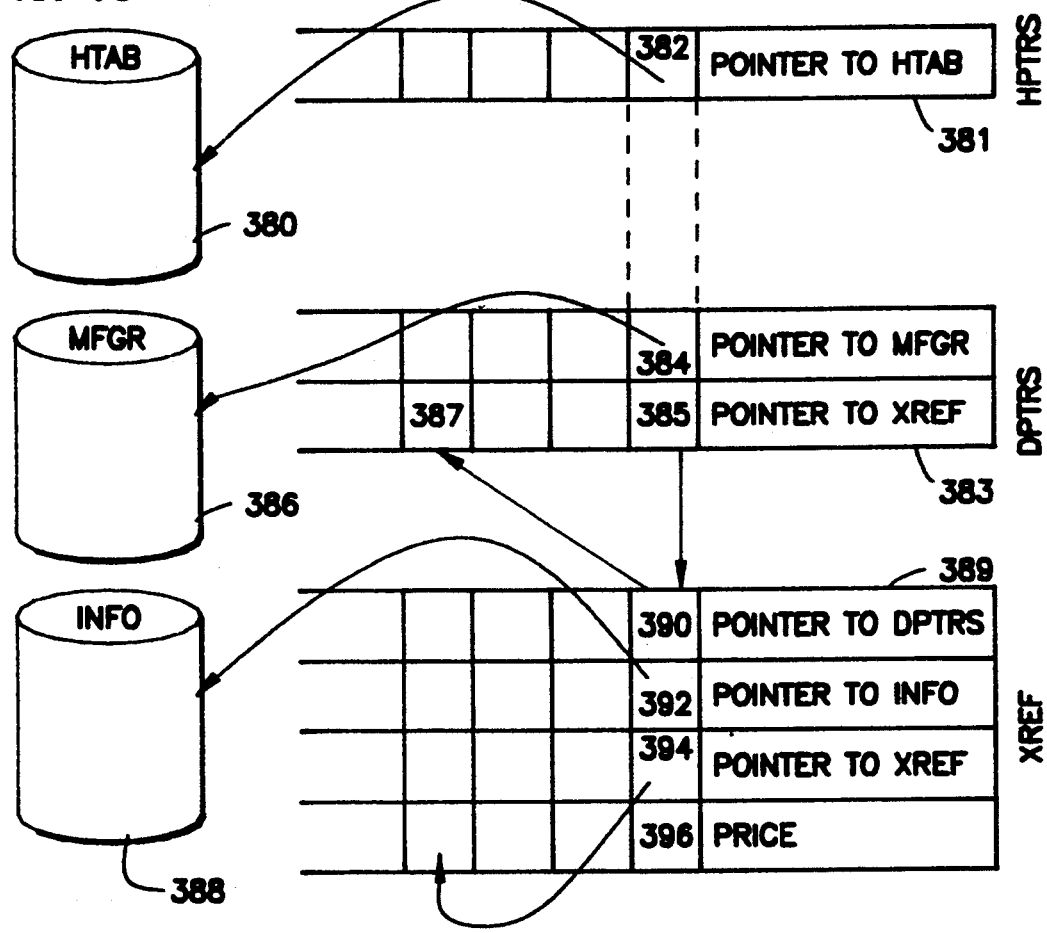
FIG. 10 shows a preferred embodiment file structure for use in selecting a filter by part number.

Referring now more particularly to the filter cross-referencing section as depicted in FIG. 7, 8A, 8B, 9 and 10, a user may choose a filter by specifying a part number or equipment application. More particularly, FIG. 7 is a flow chart diagramming a preferred procedure for selecting a filter by a part number, and FIG. 10 shows a preferred embodiment file structure containing filter information stored in data storage device 104 for use in selecting a filter by part number. Upon selecting the choice of specifying a filter by part number 302, a user is prompted to enter a part number 304.

Subsequently, part selection device 106 will check if the part number is valid 306. The validity checking is accomplished by finding an HPTR record in the HPTR file 381 which is substantially similar to the part number entered. The HPTR file 381 comprises HPTR records sorted in part number order. Each HPTR record comprises a pointer to a record within an HTAB file 380 comprising a part number. If the part number is not valid, part selection device 106 will prompt the user to enter a part number 304 once again.

Otherwise, if the part number is valid, then part selection device 106 will display manufacturers of the part number 308 and prompt the user to select a manufacturer of the part number. The list of manufacturers displayed is derived from data storage device 104 by accessing the same record number in the DPTR file 383 as was found to be a valid part number in the validity checking. The DPTR file 383 comprises the same number of records as the HPTR file 381 sorted in the same order by part number. Each DPTR record includes a pointer 384 to a manufacturer in a MFGR file 386 and a pointer 385 to an XREF file 389. The XREF file 389 is a file sorted by part number comprising records including a pointer 390 into a record within DPTR file 383, a pointer into INFO file 388, a pointer 394 to another XREF record and the price 396 of the part.

For example, a list of manufacturers is derived by taking HPTR record number (e.g., the record including pointer 382) of the valid part number and using it to access the same record number in the DPTR file 383. The record number in the DPTR file 383 corresponding to the same record number comprises a pointer (e.g. pointer 384) to a manufacturer of that part number. The manufacturer is retrieved by accessing the data in the record in the MFGR file 386 pointed to by the pointer (e.g. pointer 384). The DPTR file 383 record also includes a pointer (e.g. 385) to a record in the XREF file 389. This XREF record may include a pointer back into the DPTR file 383 (e.g. pointer 390) which includes a pointer (e.g. 387) to another record in the MFGR file 386 comprising manufacturer of that part. The process of looking up more records in the MFGR file 386 comprises searching records sequentially in the sorted DPTR file 383 until the HPTR 384 record is not related to the selected part number being considered for inclusion in the list of manufacturers. At this point the part selection device 106 knows all of the manufacturers of the part number entered.

Upon selection of a manufacturer 310, the part selection device 106 will display the particular part information 312 and select a particular part. The part information is derived from the data storage device 104 by access information pointed to by the records of the DPTR file 383 associated with the part number entered. The specific part information is accessed from the records pointed to in the XREF file 389 and subsequently the record pointed to in the INFO file 388. Upon selection of a particular part 314, part selection device 106 accesses all of the needed filter information 388 stored in data storage device 104 to select a particular part. Subsequently, the part selection device 106 ends the procedure get part by part number for filter 316.

Alternatively, a user may choose to pick a particular filter by specifying a particular equipment application for the filter. In choosing the particular equipment application, part selection device 106 preferably will go through a set of steps as depicted in the flow chart shown in FIG. 8A and 8B. In choosing to pick a part by equipment application 318, part selection device 106 will retrieve information stored in data storage device 104.

The information stored in data storage device 104 preferably is in a structured form 358 as depicted in FIG. 9. The preferred structured file format 358 for filter comprises several records including a first and second pointer as well as subobject count information. The records are configured in a hierarchical format with six layers of hierarchy. In the preferred embodiment, on the first level of the hierarchy are records for info 1 data. Each record for info 1 data includes a pointer 360 to particular information for that particular info 1 data, a pointer 362 to the next record of info 1 data and a count of subobjects 364 for the set records related to that particular info 1 data record. The subsequent record following the first info 1 record is typically the first subobject related to the first info 1 record or more specifically a record related to info 2 data including a pointer 366 to the info 2 data and a pointer 368 to the next info 2 record also related to that particular info 1 data record which was selected. This hierarchy of records continues further down into the record including a pointer 370 to info 3 data. Similarly, the next record typically includes a pointer 372 to info 4 data, with the next record including a pointer 374 to info 5 data. Finally, the following record typically includes a pointer to an XREF record 376 for a particular filter, with the next record including a pointer to an XREF record 378 for another filter. It will be appreciated by those skilled in the art that the above discussion was merely a simple example of what a structure form 358 might include. The form 358 might further include more records at each level of the hierarchy to accommodate addition part data in the structured form 358.

Referring now to FIG. 8A and 8B, after a user chooses to select a particular filter by equipment application 318, part selection device 106 gets and displays section 1 information at 319. This section i information may be derived from all records in file format for filter cross-reference 358 which have a pointer 360 to info 1 data. The information is typically derived by accessing file 358 and the first record containing a pointer 360 to info 1 data and subsequently accessing each record pointed to by a pointer 362 which points to the next record having a pointer to info 1 data. This process is typically repeated until the pointer which points to the next record having a pointer to info 1 data does not contain a pointer to another record having a pointer to info 1 data.

Subsequently, a user may select one of the elements from the section 1 information 320 and the part selection device 106 checks if other sections are needed to particularly define the equipment application 322. If another section level is not needed to completely define the filter for a particular equipment application, part selection device 106 will display part information 352. Otherwise, part selection device 106 will get and display section 2 information 324 from file 358 records in a similar manner as was used to get and display section 1 information. These records typically include the first record following the info 1 record selected in section 1 choosing step 320 wherein the record following the first record comprises a pointer 366 to info 2 data and further includes data derived from all records in the sequence of records including the pointer to the next info 2 data record.

Subsequently, a user typically selects one of the elements from the section 2 information 326 and the part selection device 106 checks if other sections are needed to particularly define the equipment application 328. If another section level is not needed to completely define the filter for a particular equipment application, part selection device 106 displays part information 352. Otherwise, part selection device 106 will get and display section 3 information 330 from file 358 records in a similar manner as was used to get and display section 1 information. These records typically include the first record following the info 2 record selected in section 2 choosing step 326 wherein the record following the first record comprises a pointer 370 to info 3 data and further include data derived from all records in the sequence of records including the pointer to the next info 3 data record.

Subsequently, a user would select one of the elements from the section 3 information 332 and the part selection device 106 checks if other sections are needed to particularly define the equipment application 334. If another section level is not needed to completely define the filter for a particular equipment application, part selection device 106 displays part information 352. Otherwise, part selection device 106 will get and display section 4 information 336 from file 358 records in a similar manner as was used to get and display section 1 information. These records typically include the first record following the info 3 record selected in section 3 choosing step 332 wherein the record following the first record comprises a pointer 372 to info 4 data and further includes data derived from all records in the sequence of records including the pointer to the next info 4 data record.

Subsequently, a user typically selects one of the elements from the section 4 information 338 and the part selection device 106 checks if other sections are needed to particularly define the equipment application 340. If another section level is not needed to completely define the filter for a particular equipment application, part selection device 106 displays part information 352. Otherwise, part selection device 106 will get and display section 5 information 342 from file 358 records in a similar manner as was used to get and display section 1 information. These records typically include the first record following the info 4 record selected in section 4 choosing step 338 wherein the record following the first record comprises a pointer 374 to info 5 data and further include data derived from all records in the sequence of records including the pointer to the next info 5 data record.

Subsequently, a user typically selects one of the elements from the section 5 information 344. This in turn typically fully specifies the filter, with part selection device 106 displaying part information 352. The part information is derived from a pointer 370 to an XREF record and typically further includes data derived from all records in the sequence of records pointed to by the particular XREF record.

After displaying the part information 352, part selection device 106 accesses the filter information stored in data storage device 104 and shown in FIG. 10 to choose a particular part 354. Subsequently, the part selection device 106 ends the get part by applications for filter procedure 356.

Figure 14:
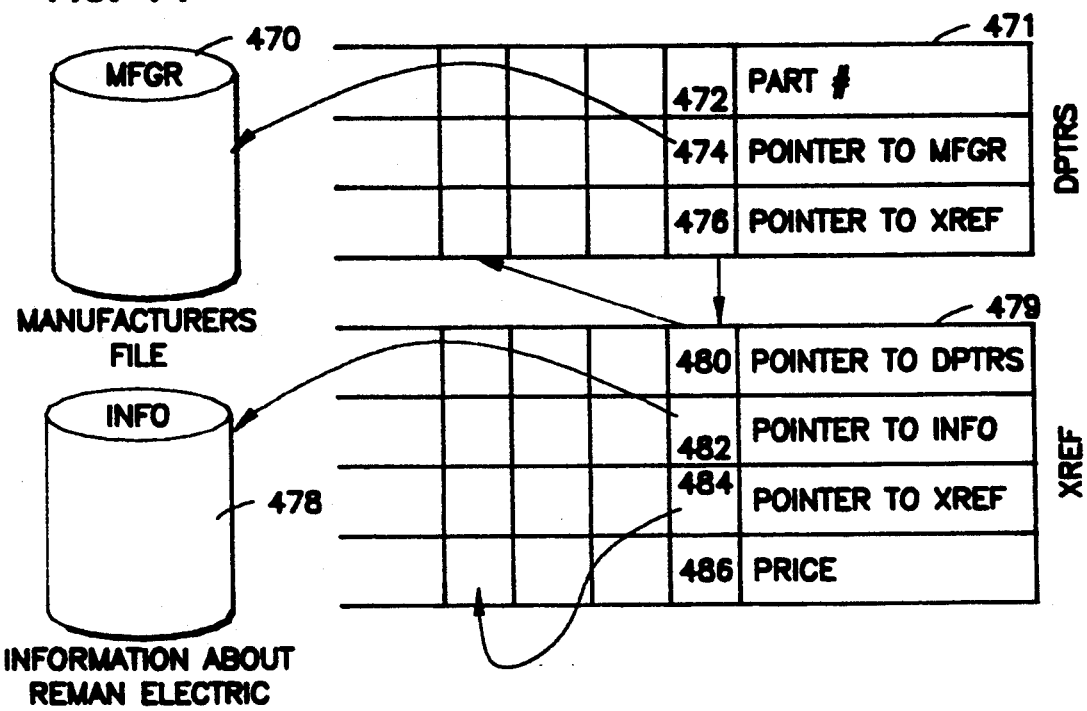
FIG. 14 shows a preferred embodiment file structure for use in selecting a remanufactured electric part by part number.
Figure 11:
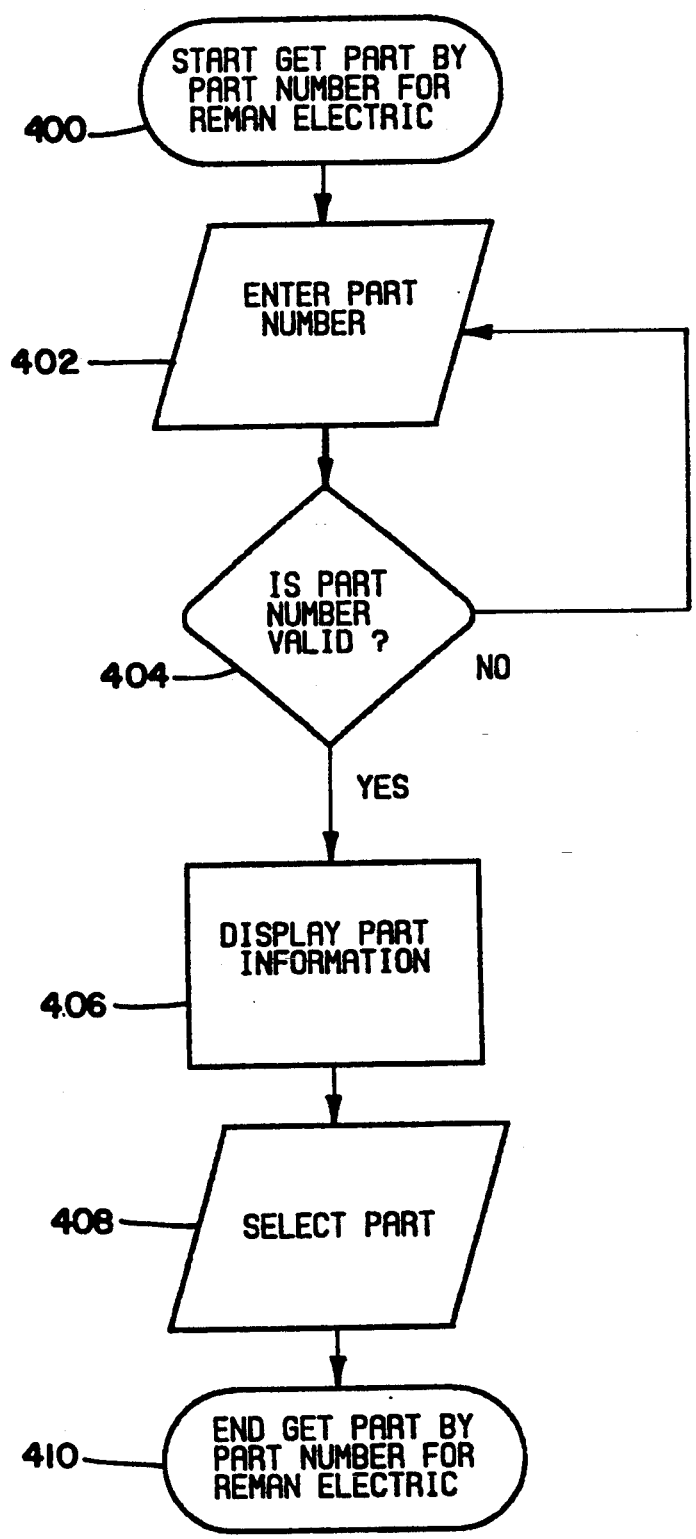
FIG. 11 shows a flow chart diagramming a preferred embodiment selecting a remanufactured electric part by part number.

Referring now more particularly to the remanufactured electric parts cross-referencing section as depicted in FIG. 11, 12A, 12B, 13 and 14, a user may choose a remanufactured electric part by specifying a part number or equipment application. More particularly, FIG. 11 is a flow chart diagramming a procedure for selecting a remanufactured electric part by a part number and FIG. 14 shows a preferred embodiment file structure containing remanufactured electric parts information stored in data storage device 104 for use in selecting a remanufactured electric part filter by part number. Upon selecting the choice of specifying a remanufactured electric part by part number 400, a user is prompted to enter a part number 402.

Subsequently, part selection device 106 will check if the part number is valid 404. The validity checking is accomplished by finding an DPTR record in the DPTR file 471 which is substantially similar to the part number entered. The DPTR file 471 comprises DPTR records sorted in part number order. Each DPTR record comprises a part number 472, a pointer 474 to a manufacturer in a MFGR file 470 and a pointer 476 to an XREF file 479. If the part number is not valid, part selection device 106 will prompt the user to enter a part number 402 once again.

Otherwise, if the part number is valid, then part selection device 106 will display part information of the part number 406 and select a particular part. The particular part displayed is derived from data storage device 104 by accessing the record in the XREF file 479 pointed to by pointer 476 of the DPTR record found in the validity checking. The XREF file 479 is a file sorted by part number comprising records including a pointer 480 into a record within DPTR file 471, a pointer into INFO file 478, a pointer 484 to another XREF record and the price 486 of the part.

Upon selection of a particular part 408 by the user, part selection device 106 accesses all of the needed remanufactured electric part information stored in data storage device 104 to select a particular part. Subsequently, the part selection device 106 ends the procedure get part by part number for remanufactured electric part 410.

Alternatively, a user may choose to pick a particular remanufactured electric part by specifying a particular equipment application for the remanufactured electric part. In choosing the particular equipment application, part selection device 106 preferably will go through a set of steps as depicted in the flow chart shown in FIG. 12A and 12B. In choosing to pick an application by equipment application 412, part selection device 106 will retrieve information stored in data storage device 104.

Figure 13:
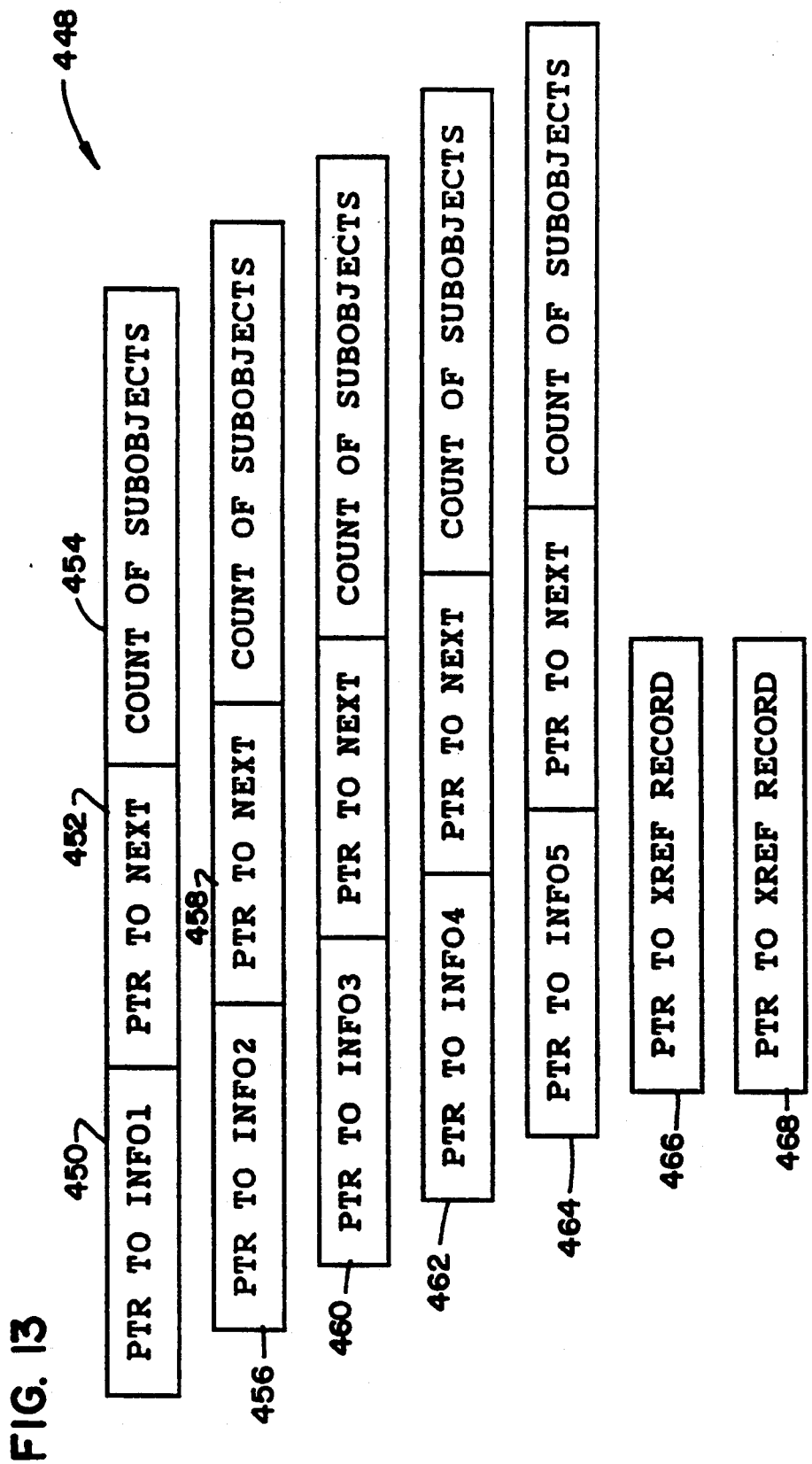
FIG. 13 shows a preferred embodiment file structure for use in selecting a remanufactured electric part by application.

The information stored in data storage-device 104 preferably is in a structured form 448 as depicted in FIG. 13. The preferred structured file format 448 for remanufactured electric parts comprises several records including a first and second pointer as well as subobject count information. The records shown are configured in a hierarchical format with six layers of hierarchy. In the preferred embodiment, on the first level of the hierarchy are records for info 1 data. Each record for info 1 data includes a pointer 450 to particular information for that particular info 1 data, a pointer 452 to the next record of info 1 data and a count of subobjects 454 for the set records related to that particular info 1 data record. The subsequent record following the first info 1 record is typically the first subobject related to the first info 1 record or more specifically a record related to info 2 data including a pointer 456 to the info 2 data and a pointer 458 to the next info 2 record also related to that particular info 1 data record which was selected. This hierarchy of records continues further down into the record including a pointer 460 to info 3 data. Similarly, the next record typically includes a pointer 462 to info 4 data, with the following record including a pointer 464 to info 5 data. Finally, the following record typically includes a pointer to an XREF record 466 for a particular remanufactured electric part, with the next record including a pointer to an XREF record 468 for another remanufactured electric part. It will be appreciated by those skilled in the art that the above discussion was merely a simple example of what a structure form 448 might include. The form 448 might further include more records at each level of the hierarchy to accommodate addition part data in the structured form 448.

Figure 12A:
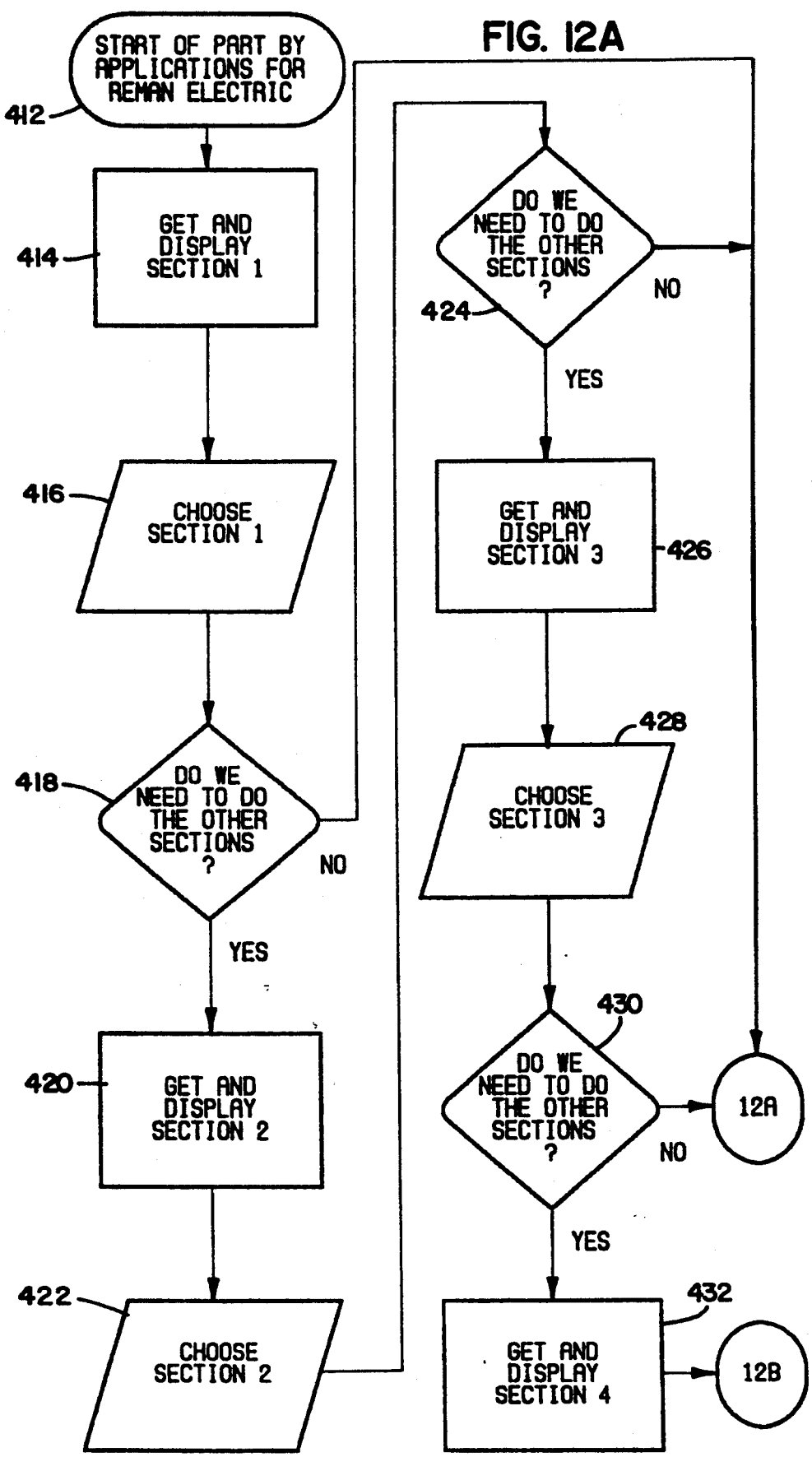
FIG. 12A and 12B show a flow chart diagramming a preferred embodiment selecting a remanufactured electric part by application.
Figure 12B:
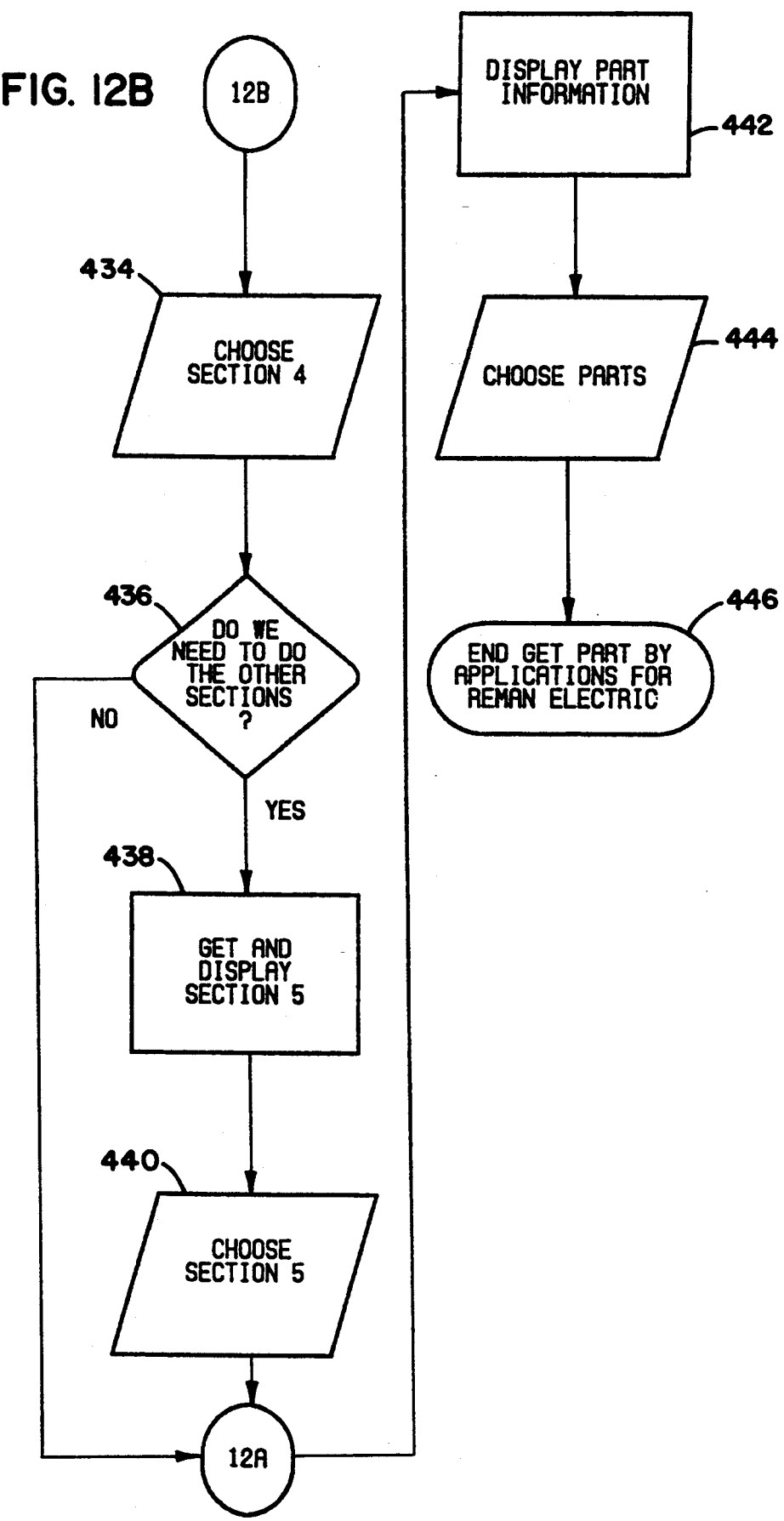

Referring now to FIG. 12A and 12B, after a user chooses to select a particular remanufactured electric part by equipment application 412, part selection device 106 gets and displays section 1 information at 414. This section 1 information is typically derived from all records in file format for remanufactured electric parts cross-reference 448 which have a pointer 450 to info 1 data. The information is typically derived by accessing file 448 and the first record containing a pointer 450 to info 1 data and subsequently accessing each record pointed to by a pointer 452 which points to the next record having a pointer to info 1 data. This process is typically repeated until the pointer which points to the next record having a pointer to info 1 data does not contain a pointer to another record having a pointer to info 1 data.

Subsequently, a user may select one of the elements from the section 1 information 416 and the part selection device 106 checks if other sections are needed to particularly define the equipment application 418. If another section level is not needed to completely define the remanufactured electrical part for a particular equipment application, part selection device 106 will display part information 442. Otherwise, part selection device 106 will get and display section 2 information 420 from file 448 records in a similar manner as was used to get and display section 1 information. These records include the first record following the info 1 record selected in section 1 choosing step 416 wherein the record following the first record comprises a pointer 456 to info 2 data and further include data derived from all records in the sequence of records including the pointer to the next info 2 data record.

Subsequently, a user typically selects one of the elements from the section 2 information 422 and the part selection device 106 checks if other sections are needed to particularly define the equipment application 424. If another section level is not needed to completely define the remanufactured electric part for a particular equipment application, part selection device 106 displays part information 442. Otherwise, part selection device 106 will get and display section 3 information 426 from file 448 records in a similar manner as was used to get and display section 1 information. These records typically include the first record following the info 2 record selected in section 2 choosing step 422 wherein the first following the first record comprises a pointer 460 to info 3 data and further include data derived from all records in the sequence of records including the pointer to the next info 3 data record.

Subsequently, a user typically selects one of the elements from the section 3 information 428 and the part selection device 106 checks if other sections are needed to particularly define the equipment application 430. If another section level is not needed to completely define the remanufactured electric part for a particular equipment application, part selection device 106 displays part information 442. Otherwise, part selection device 106 get and display section 4 information 432 from file 448 records in a similar manner as was used to get and display section 1 information. These records typically include the first record following the info 3 record selected in section 3 choosing step 428 wherein the record following the first record comprises a pointer 462 to info 4 data and further include data derived from all records in the sequence of records including the pointer to the next info 4 data record.

Subsequently, a user may select one of the elements from the section 4 information 434 and the part selection device 106 checks if other sections are needed particularly define the equipment application 436. another section level is not needed to completely define the remanufactured electrical part for a particular equipment application, part selection device 106 displays part information 442. Otherwise, part selection device ]06 will get and display section 5 information 438 from file 448 records in a similar manner as was used to get and display section 1 information. These records typically include the first record following the info 4 record selected in section 4 choosing step 434 wherein the record following the first record comprises a pointer 464 to in#o 5 data and would further include data derived from all records in the sequence of records including the pointer to the next info 5 data record.

Subsequently, a user typically selects one of the elements from the section 5 information 440. This in turn typically fully specifies the remanufactured electric part, with part selection device 106 displaying part information 442. The part information is derived from a pointer 466 to an XREF record and typically further includes data derived from all records in the sequence of records pointed to by the particular XREF record.

After displaying the part information 442, part selection device 106 accesses the remanufactured electric part information stored in data storage device 104 and shown in FIG. 14 to choose a particular part 444. Subsequently, the part selection device 106 ends the get part by applications for remanufactured electric part procedure 446.

Figure 15A:
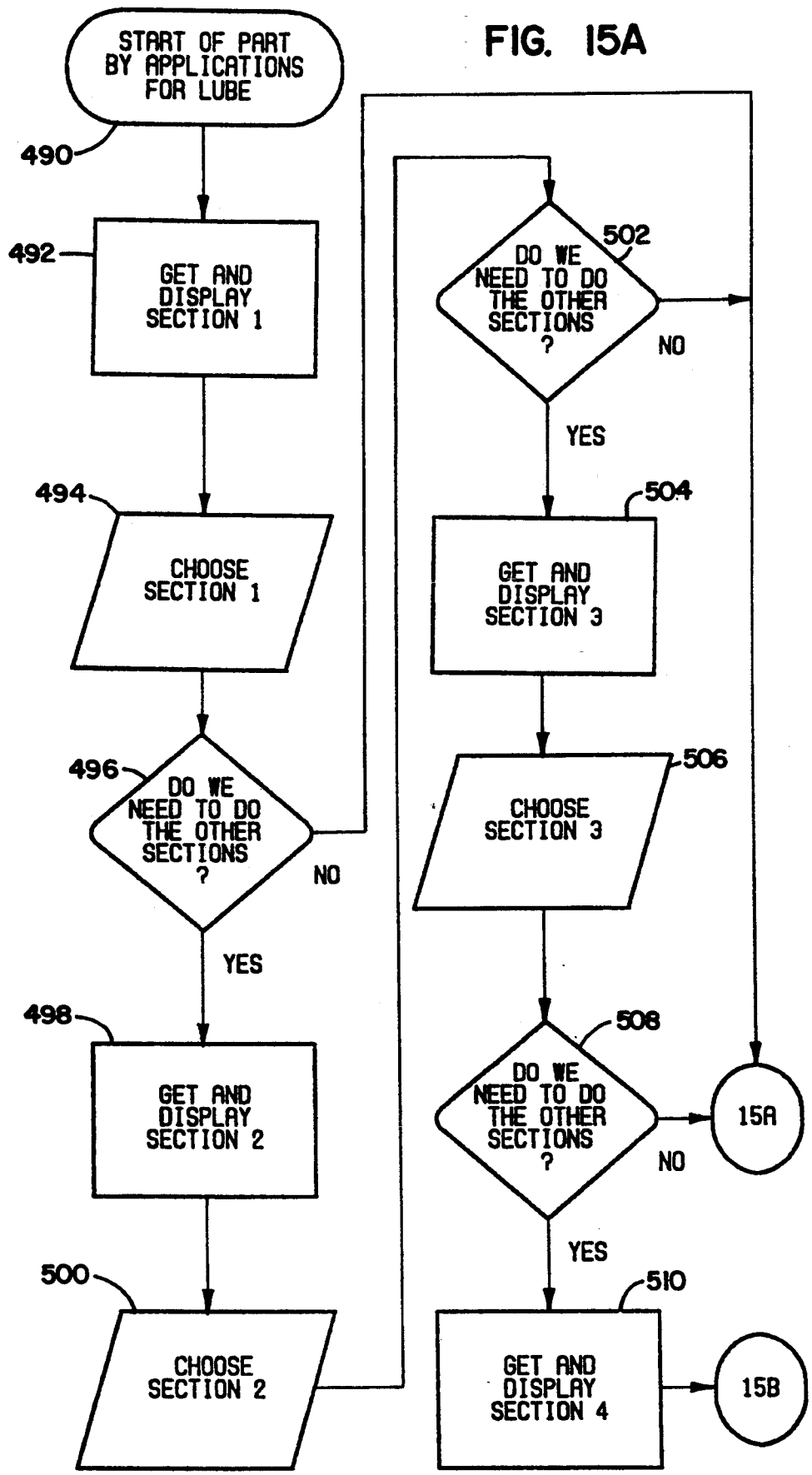
FIG. 15A and 15B show a flow chart diagramming a preferred embodiment selecting lubrication by application.
Figure 15B:
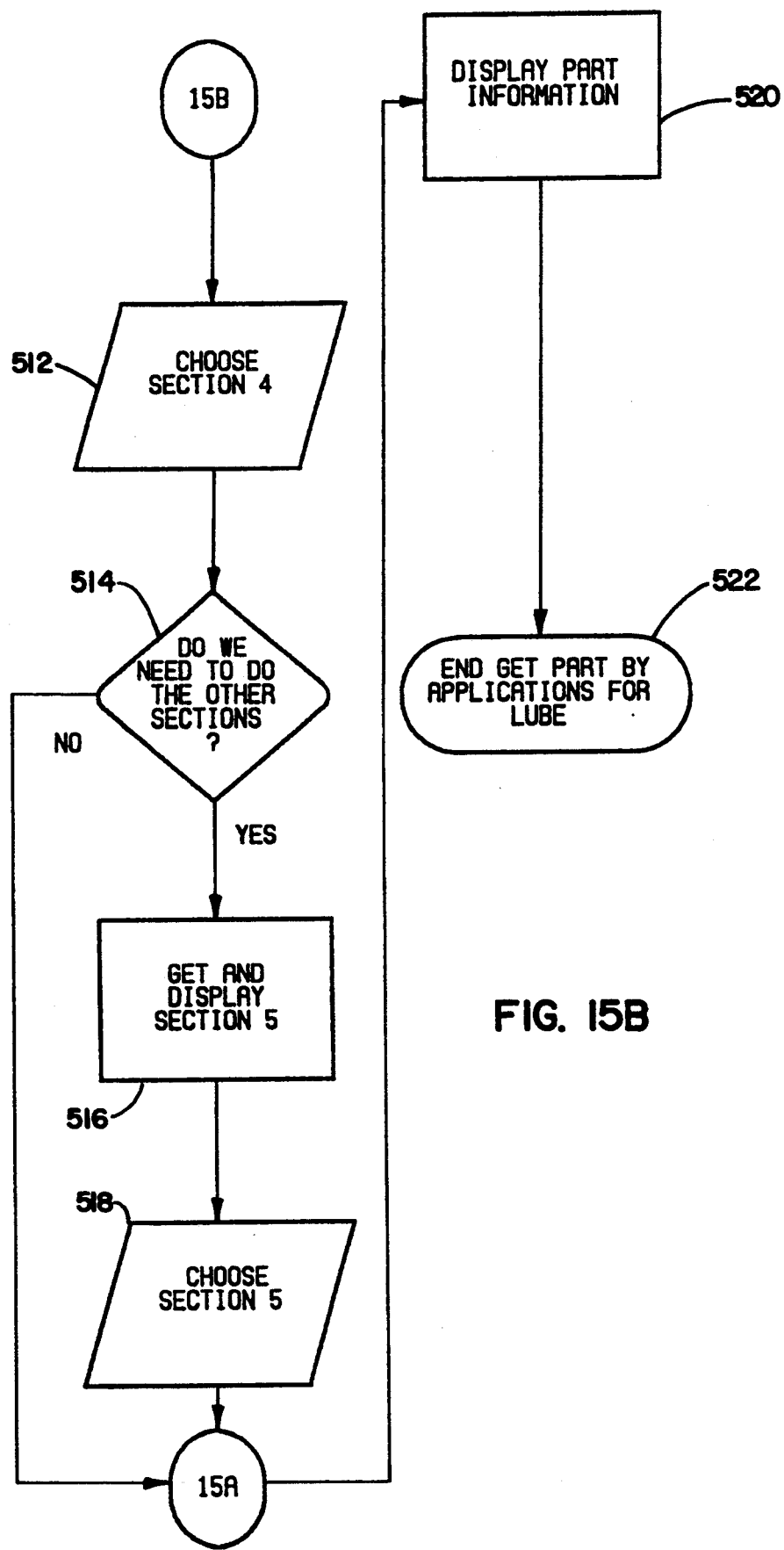
Figure 16:
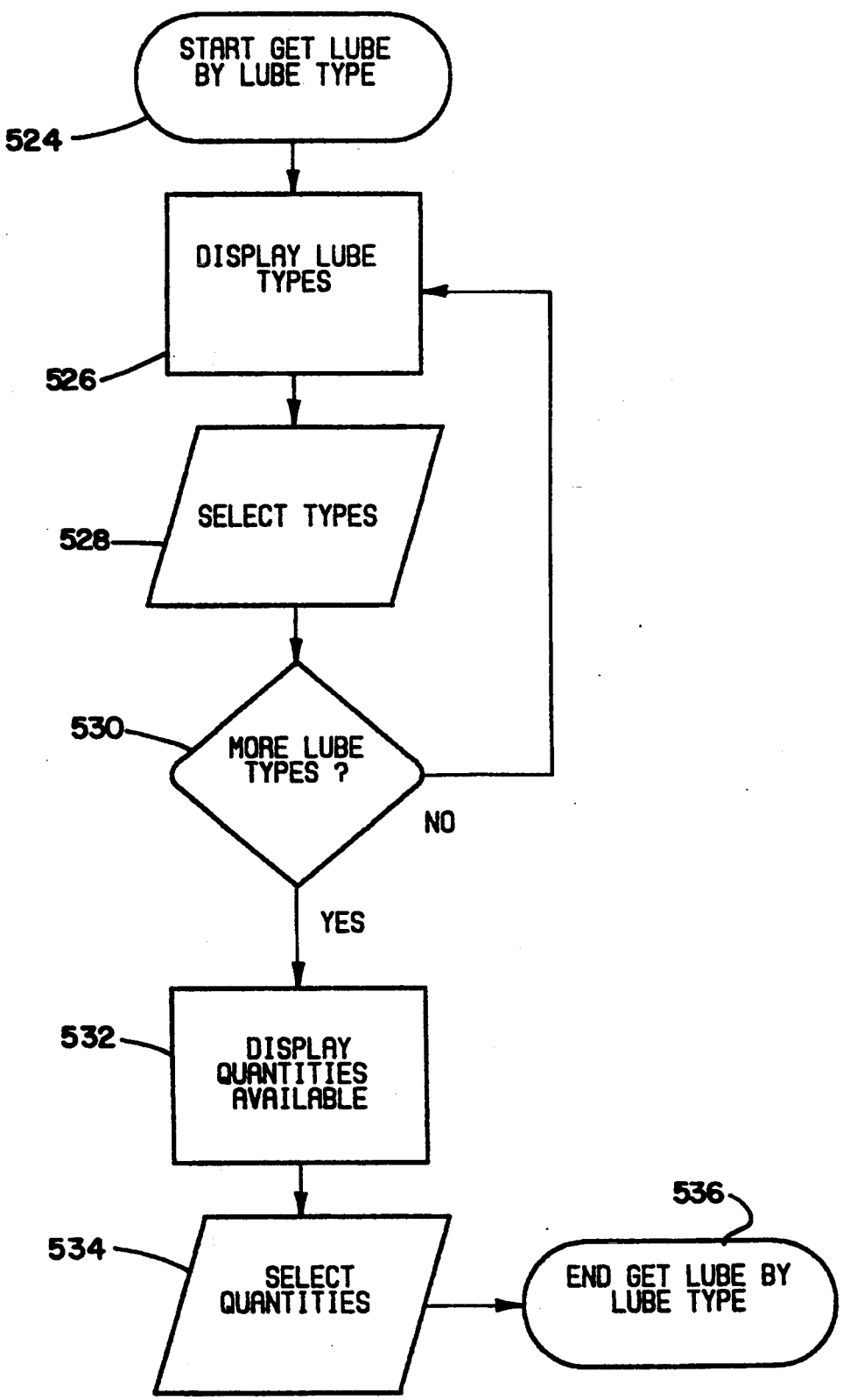
FIG. 16 shows a flow chart diagramming a preferred embodiment selecting lubrication by lube type.
Figure 17:
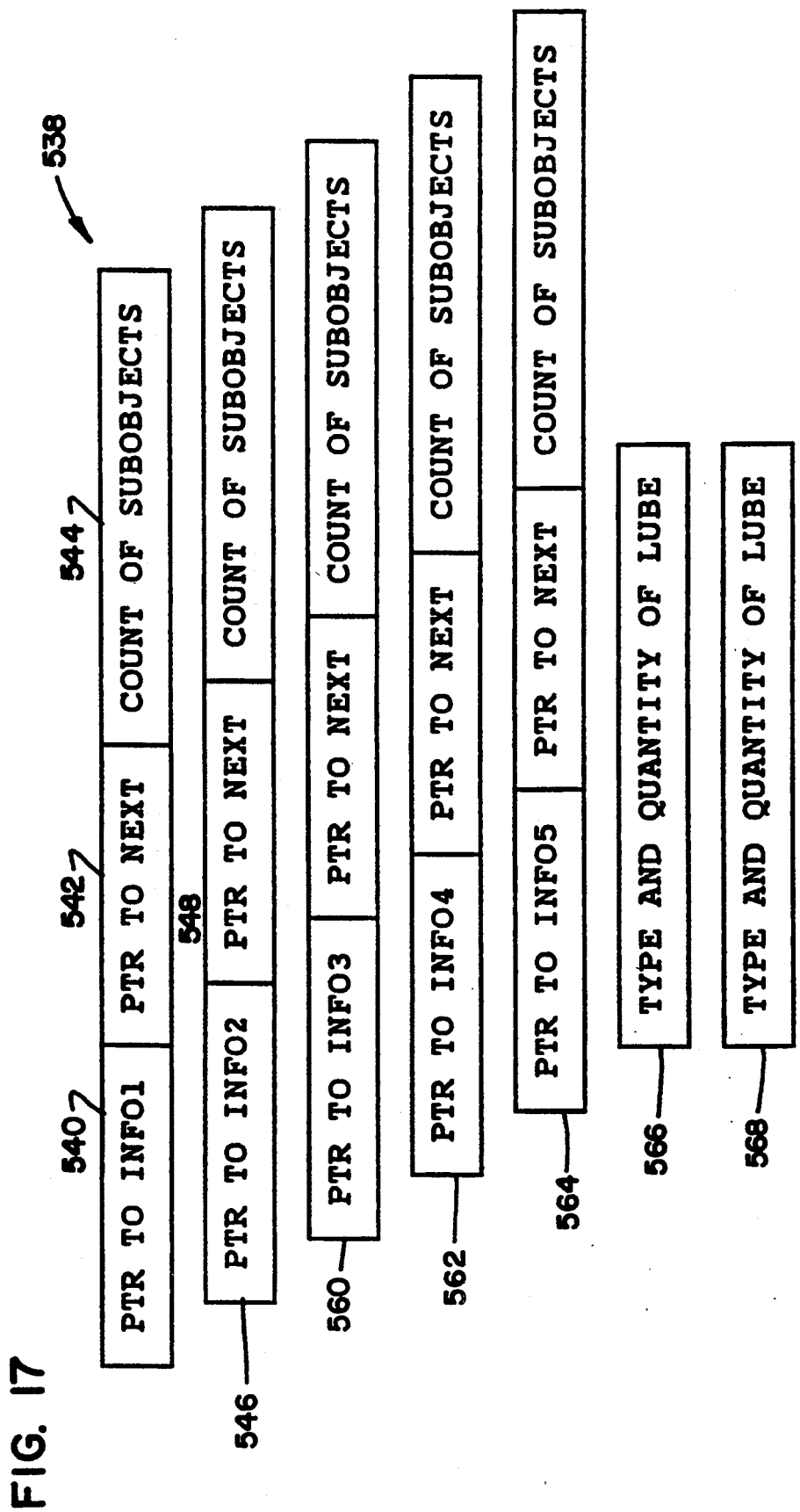
FIG. 17 shows a preferred embodiment file structure for use in selecting lubrication by application.
Figure 18:
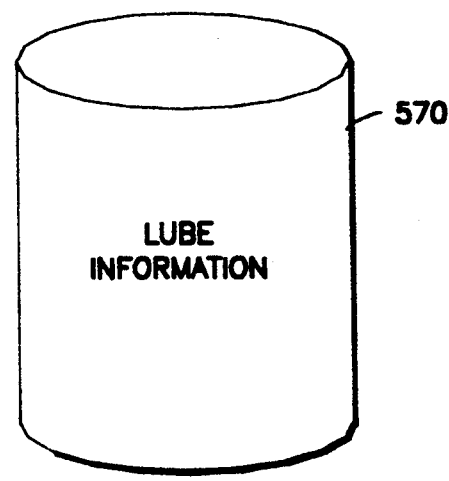
FIG. 18 shows a preferred embodiment file structure for use in selecting lubrication by lube type.

Referring now more particularly to the lubrication cross-referencing section as depicted in FIG. 15A, 15B, 16, 17 and 18, a user may choose lubrication by specifying a lube type or equipment application. More particularly, FIG. 16 is a flow chart diagramming a procedure for selecting lubrication by lube type, and FIG. 18 shows a preferred embodiment file structure containing lubrication information stored in data storage device 104 for use in selecting lubrication by lube type. Upon selecting the choice of specifying lubrication by lube type 524, the part selection device 106 displays types of lubrication 526 and a user is prompted to select a type of lube 528. The lube types are derived from accessing the lubrication information file 570 stored in data storage device 104.

After a user selects a lube type 528, the part selection device 106 checks if the user wants to select another lube type. If the user indicates the desire to select another lube type, the part selection device 106 displays the lube types 526 once again.

Otherwise, if the user does not indicate that he or she desires to select another lube type, then part selection device 106 will display quantity information 532 corresponding to the lube types selected and prompt the user to Select the quantity of the various lube types desired. The quantity information is derived from accessing information in lubrication information file 570 for each type of lubrication selected. Upon selection of the quantity desired for each type of lubrication selected, the part selection device 106 ends the procedure get part by part number for remanufactured electric part 536.

Alternatively, a user may choose to pick a particular lubrication by specifying a particular equipment application for the lubrication. In choosing the particular equipment application, part selection device 106 preferably will go through a set of steps as depicted in the flow chart shown in FIG. 15A and 15B. In choosing to pick an application by equipment application 490, part selection device 106 will retrieve information stored in data storage device 104.

The information stored in data storage device 104 preferably is in a structured form 538 as depicted in FIG. 17. The preferred structured file format 538 for lubrication comprises several records including a first and second pointer as well as subobject count information. The records preferably are configured in a hierarchical format with six layers of hierarchy. In the preferred embodiment, on the first level of the hierarchy are records for info 1 data. Each record for info 1 data includes a pointer 540 to particular information for that particular info 1 data, a pointer 542 to the next record of info 1 data and a count of subobjects 544 for the set records related to that particular info 1 data record. The subsequent record following the first info 1 record is typically the first subobject related to the first info 1 record or more specifically would be a record related to info 2 data including a pointer 546 to the info 2 data and a pointer 548 to the next info 2 record also related to that particular info 1 data record which was selected.

This hierarchy of records continues further down into the record including a pointer 560 to info 3 data. Similarly, the next record typically includes a pointer 562 to info 4 data, with the following record including a pointer 564 to info 5 data. Finally, the next record typically includes type and quantity 566 for a particular lube with the next record including type and quantity 568 for another lube. It will be appreciated by those skilled in the art that the above discussion was merely a simple example of what a structure form 538 might include. The form 538 might further include more records at each level of the hierarchy to accommodate addition part data in the structured form 538.

Referring now to FIG. 15A and 15B, after a user chooses to select a particular lube by equipment application 490, part selection device 106 gets and displays section 1 information at 492. This section 1 information is typically derived from all records in file format for lubrication cross-reference 538 which have a pointer 540 to info 1 data. The information is typically derived by accessing file 538 and the first record containing a pointer 540 to info 1 data and subsequently accessing each record pointed to by a pointer 542 which points to the next record having a pointer to info 1 data. This process is repeated until the pointer which points to the next record having a pointer to info 1 data does not contain a pointer to another record having a pointer to info 1 data.

Subsequently, a user typically selects one of the elements from the section 1 information 494 and the part selection device 106 checks if other sections are needed to particularly define the equipment application 496. If another section level is not needed to completely define the lube for a particular equipment application, part selection device 106 will display part information 520. Otherwise, part selection device 106 will get and display section 2 information 498 from file 538 records in a similar manner as was used to get and display section 1 information. These records typically include the first record following the info 1 record selected in section 1 choosing step 494 wherein the record following the first record comprises a pointer 546 to info 2 data and would further include data derived from all records in the sequence of records including the pointer to the next info 2 data record.

Subsequently, a user may select one of the elements from the section 2 information 500 and the part selection device 106 checks if other sections are needed to particularly define the equipment application 502. If another section level is not needed to completely define the lube for a particular equipment application, part selection device 106 displays part information 520. Otherwise, part selection device 106 will get and display section 3 information 504 from file 538 records in a similar manner as was used to get and display section 1 information. These records typically include the first record following the info 2 record selected in section 2 choosing step 500 wherein the record following the first record comprises a pointer 560 to info 3 data and would further include data derived from all records in the sequence of records including the pointer to the next info 3 data record.

Subsequently, a user typically selects one of the elements from the section 3 information 538 and the part selection device 106 checks if other sections are needed to particularly define the equipment application 508. If another section level is not needed to completely define the lube for a particular equipment application, part selection device 106 displays part information 520. Otherwise, part selection device 106 will get and display section 4 information 510 from file 538 records in a similar manner as was used to get and display section 1 information. These records typically include the first record following the info 3 record selected in section 3 choosing step 506 wherein the record following the first record comprises a pointer 562 to info 4 data and would further include data derived from all records in the sequence of records including the pointer to the next info 4 data record.

Subsequently, a user may select one of the elements from the section 4 information 512 and the part selection device 106 checks if other sections are needed to particularly define the equipment application 514. If another section level is not needed to completely define the lube for a particular equipment application, part selection device 106 displays part information 520. Otherwise, part selection device 106 will get and display section 5 information 516 from file 538 records in a similar manner as was used to get and display section 1 information. These records typically include the first record following the info 4 record selected in section 4 choosing step 512 wherein the record following the first record comprises a pointer 564 to info 5 data and would further include data derived from all records in the sequence of records including the pointer to the next info 5 data record.

Subsequently, a user may select one of the elements from the section 5 information 518. This in turn typically fully specifies the lubrication needed, thus part selection device 106 displays part information 520. The part information typically is derived from the lubrication information file 570 and the stored information concerning type and quantity of lube.

Subsequently, the part selection device 106 ends the get part by applications for lube procedure 522.

Figure 19:
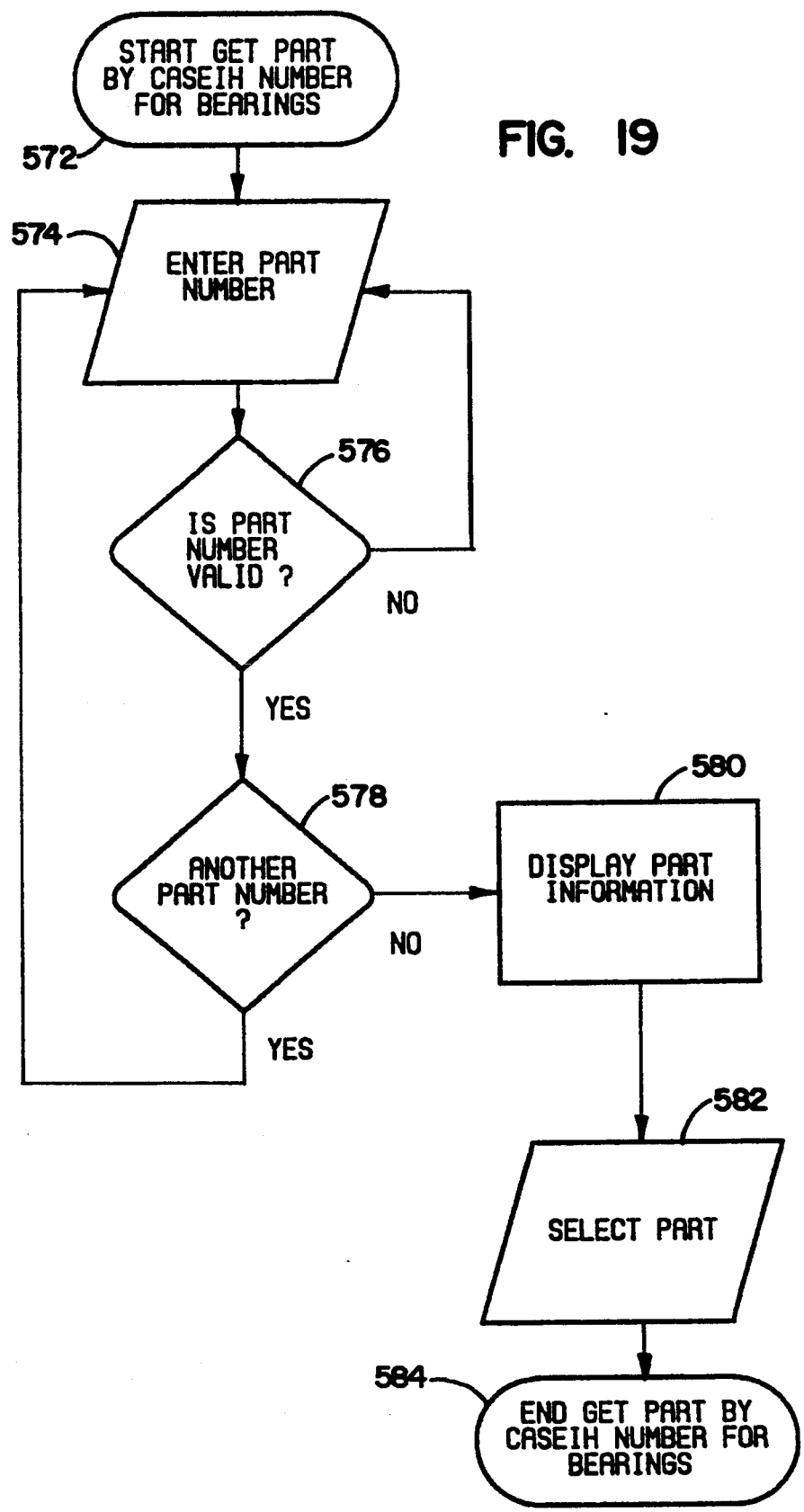
FIG. 19 shows a flow chart diagramming a preferred embodiment selecting a bearing by a part number.
Figure 21:
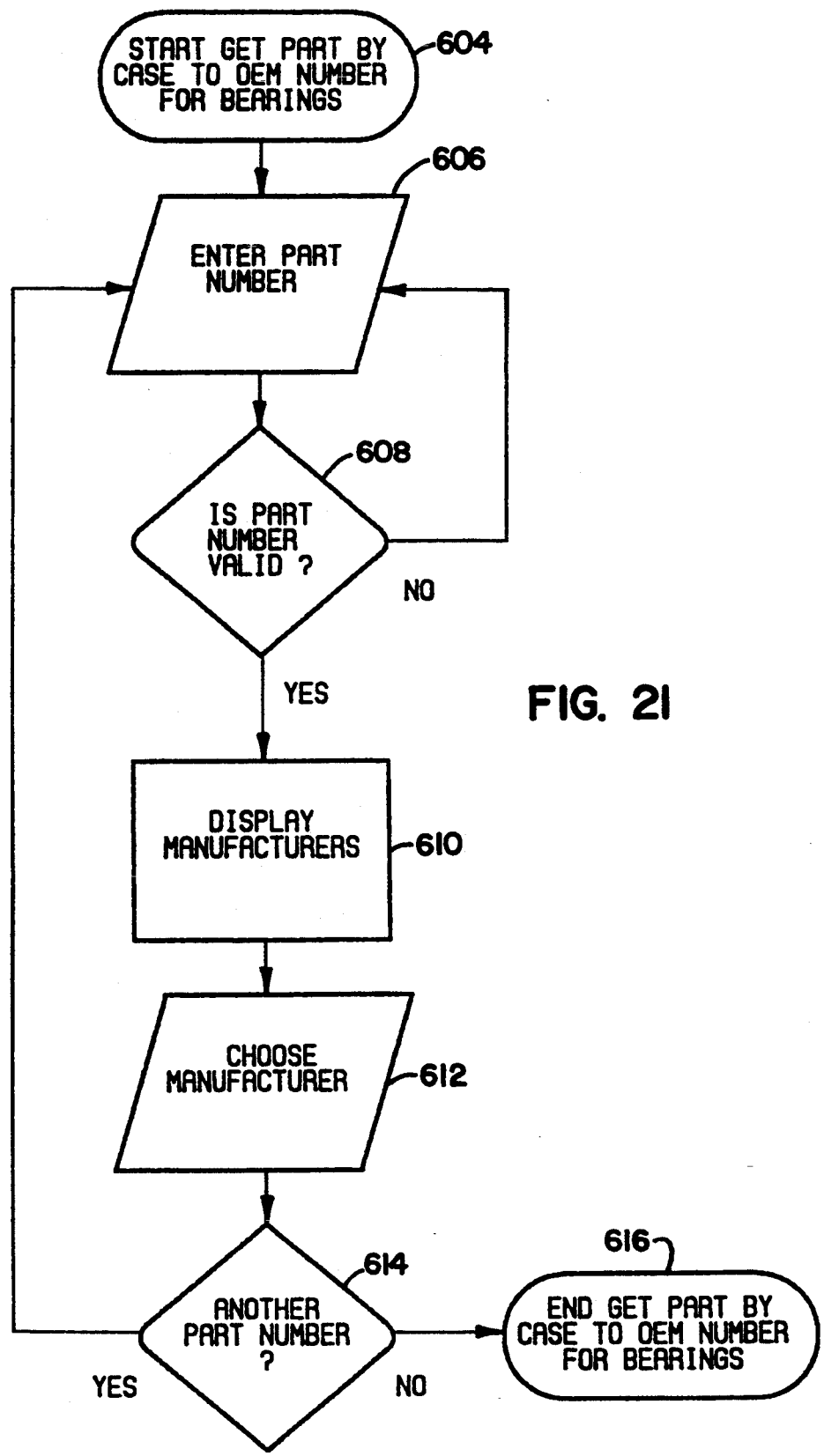
FIG. 21 shows a flow chart diagramming a preferred embodiment selecting a bearing by a part number to an OEM part number.
Figure 22:
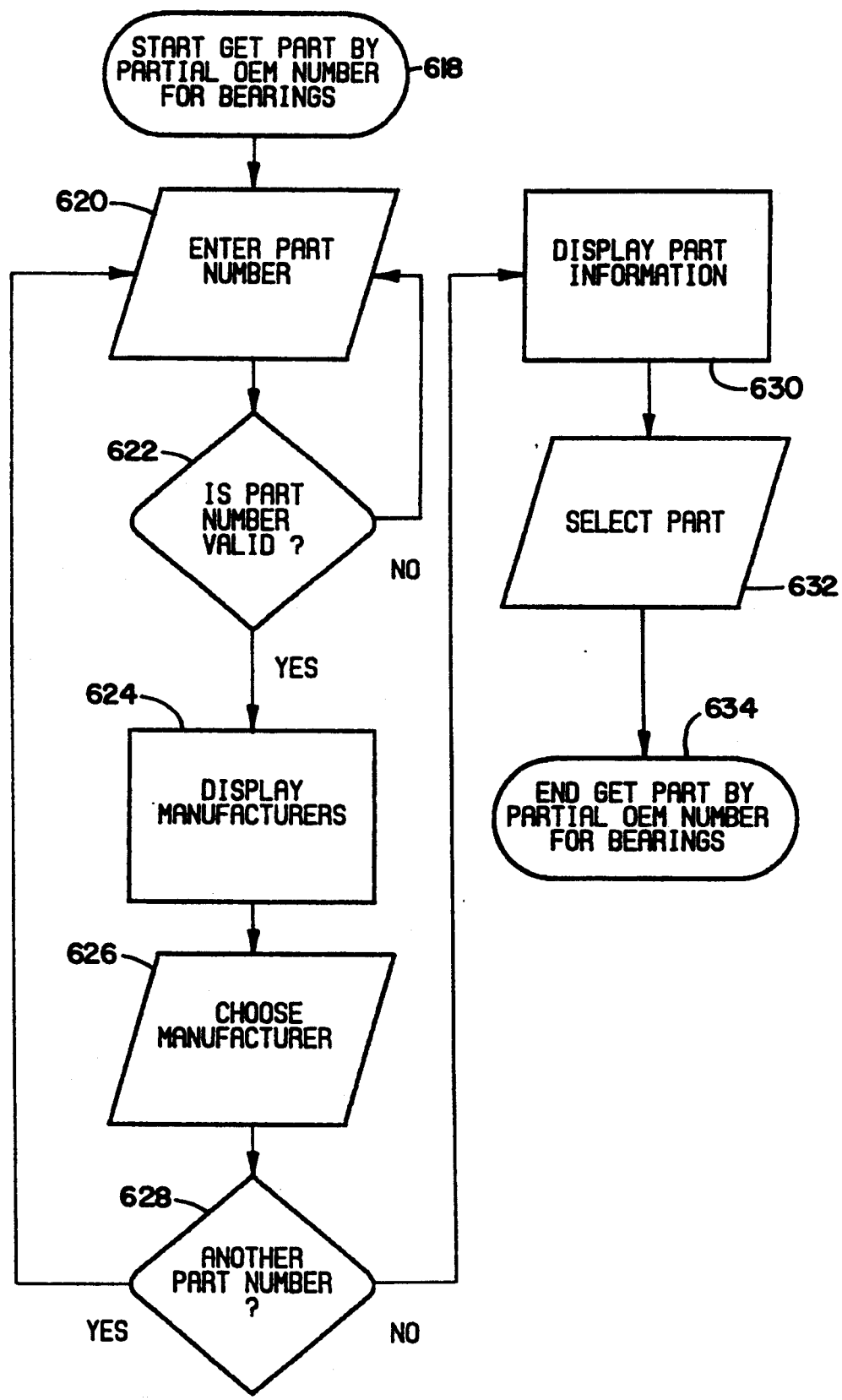
FIG. 22 shows a flow chart diagramming a preferred embodiment selecting a bearing by a partial OEM part number.
Figure 23:
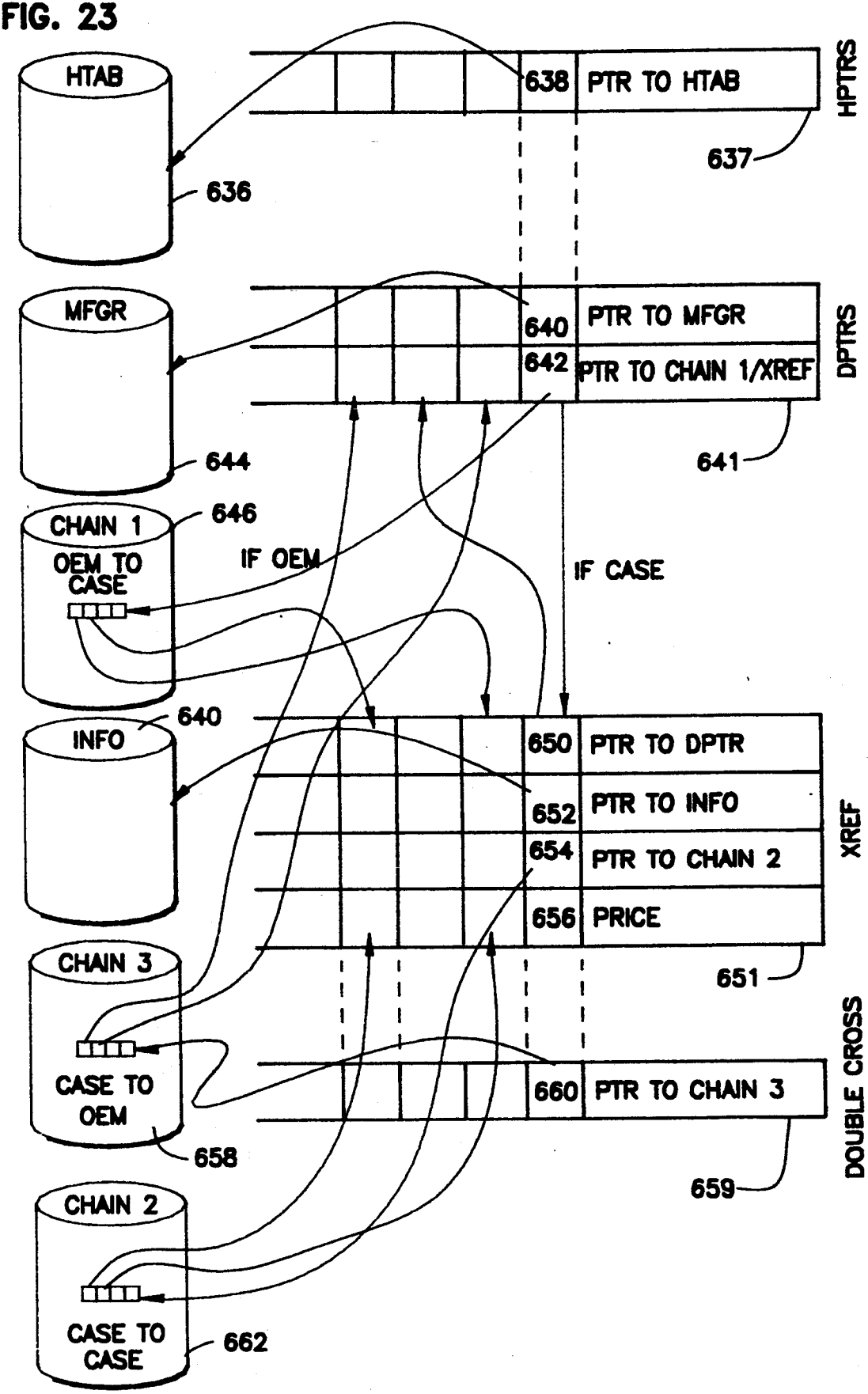
FIG. 23 shows a preferred embodiment file structure for use in selecting bearings.

Referring now more particularly to the bearing cross-referencing section as depicted in FIG. 19, 20, 21, 22 and 23. Within the bearing cross-referencing section of the preferred embodiment, a user may choose a bearing by specifying a part number, OEM part number, part number to OEM part number, or by partial OEM part number. More particularly, FIG. 19 is a flow chart diagramming a procedure for selecting a bearing by a part number and FIG. 23 shows a preferred embodiment file structure containing bearing information stored in data storage device 104 for use in selecting a bearing by part number. Upon selecting the choice of specifying a bearing by part number 572, a user is prompted to enter a part number 574.

Subsequently, part selection device 106 will check if the part number is valid 576. The validity checking is accomplished by finding an HPTR record in the HPTR file 637 which is substantially similar to the part number entered. The HPTR file 637 comprises HPTR records sorted in part number order. Each HPTR record comprises a pointer to a record within an HTAB file 636 comprising a part number. If the part number is not valid, part selection device 106 will prompt the user to enter a part number 574 once again.

Otherwise, if the part number is valid then part selection device 106 will query the user whether or not the user wants to enter another parts number 578. If the user wants to enter another parts number, the part selection device 106 will prompt the user to enter a part number 574. Otherwise, part selection means 106 displays the part information 580. The part information displayed is derived from data storage device 104 by accessing the same record number in the DPTR file 641 as was found to be a valid part number in the validity checking. The DPTR file 641 comprises the same number of records as the HPTR file 637 sorted in the same order by part number. Each DPTR record includes a pointer 640 to a manufacturer in a MFGR file 644 and a pointer 642 to either an CHAIN1 file 646 when the selected part number is an OEM part number or to an XREF file 651 when the selected part number is not an OEM part number. The CHAIN1 file 646 comprises records including one or more pointers to records within XREF file 651. The XREF file 651 is a file sorted by part number and comprises records including a pointer 650 into a record within DPTR file 641, a pointer into INFO file 652, a pointer 654 to CHAIN2 file 662 and the price 656 of the part. The CHAIN2 file 662 comprises records including one or more pointers to records within XREF file 651.

For example, part information is derived by taking HPTR record number (e.g. the record including pointer 638) of the valid part number and using it to access the same record number in the DPTR file 641. The record number in the DPTR file 641 corresponding to the same record number comprises a pointer (e.g. pointer 642) to a record in the XREF file 651. This XREF record includes a pointer into the INFO file 640 (e.g. pointer 652). As a result, the part information pointed to by pointer 652 in INFO file 651 can be retrieved for the display of part information 580.

The specific part information is accessed from the records pointed to in the XREF file 651 and subsequently the record pointed to in the INFO file 640. Upon selection of a particular part 582, part selection device 106 accesses all of the needed bearing information stored in data storage device 104 to select a particular part. Subsequently, the part selection device 106 ends the procedure get part by part number for bearing 584.

Figure 20:
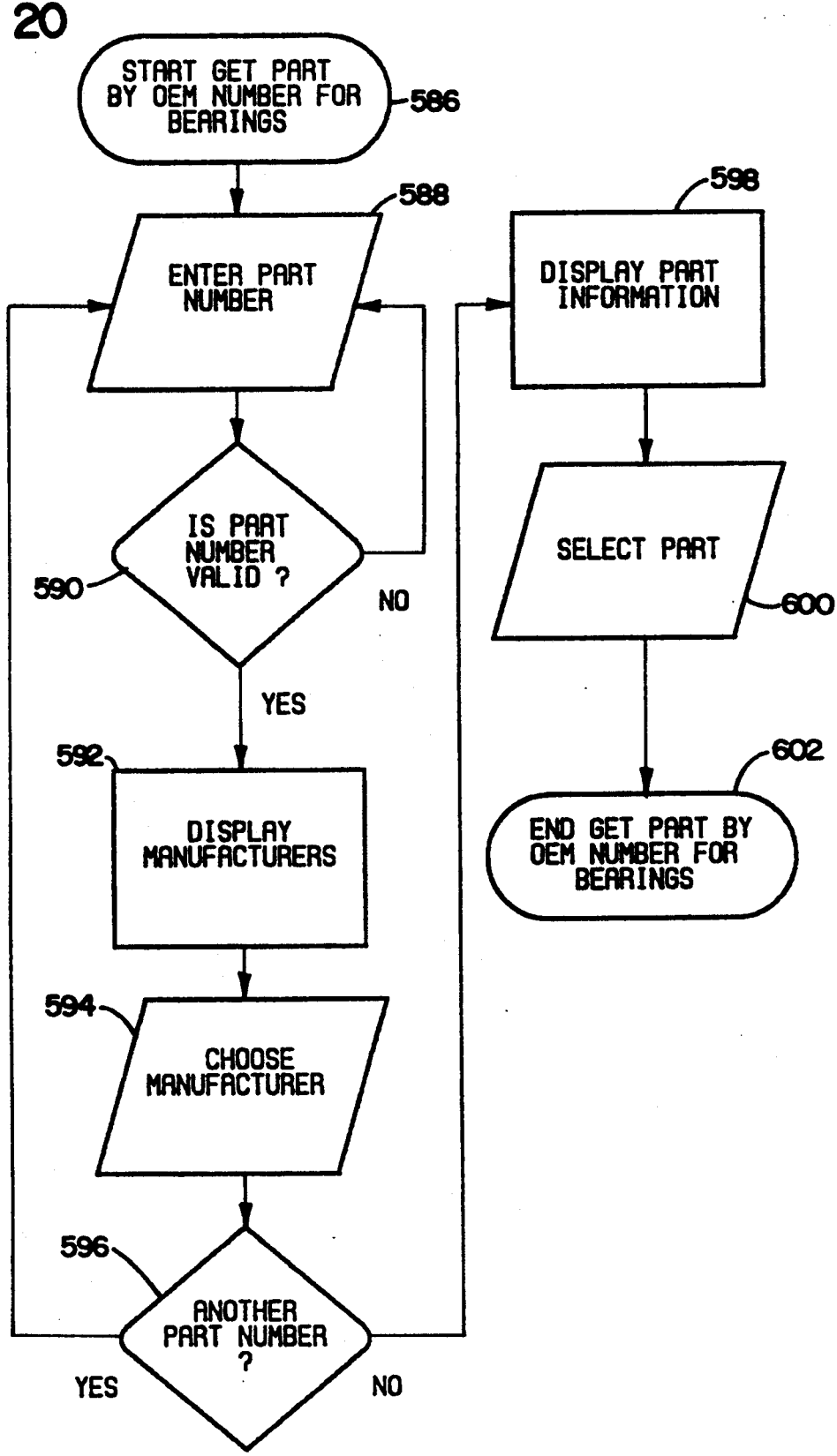
FIG. 20 shows a flow chart diagramming a preferred embodiment selecting a bearing by an OEM part number.

Alternatively a user may choose a bearing by OEM part number. FIG. 20 is a flow chart diagramming a procedure for selecting a bearing by an OEM part number and FIG. 23 shows a preferred embodiment file structure containing bearing information stored in data storage device 104 for use in selecting a bearing by part number. Upon selecting the choice of specifying a bearing by OEM part number 586, a user is prompted to enter a part number 588.

Subsequently, part selection device 106 will check if the part number is valid 590. The validity checking is accomplished by finding an HPTR record in the HPTR file 637 which is substantially similar to the part number entered. The HPTR file 637 comprises HPTR records sorted in part number order. Each HPTR record comprises a pointer to a record within an HTAB file 636 comprising a part number. If the part number is not valid, part selection device 106 will prompt the user to enter a part number 588 once again.

Otherwise, if the part number is valid then part selection device 106 will display manufacturers of the part number 592 and prompt the user to select a manufacturer of the part number. The list manufacturers displayed is derived from data storage device 104 by accessing the same record number in the DPTR file 641 as was found to be a valid part number in the validity checking. The DPTR file 641 comprises the same number of records as the HPTR file 637 sorted in the same order by part number. Each DPTR record includes a pointer 640 to a manufacturer in a MFGR file 644 and a pointer 642 to either a CHAIN1 file 646 when the selected part number is an OEM part number or to an XREF file 651 when the selected part number is not an OEM part number. The XREF file 651 is a file sorted by part number comprising records including a pointer 650 into a record within DPTR file 641, a pointer 652 into INFO file 640, a pointer 654 to CHAIN2 file 662 and the price 656 of the part. The CHAIN2 file 662 comprises records including one or more pointers to records within XREF file 651.

For example, a list of manufacturers is derived by taking HPTR record number (e.g. the record including pointer 638) of the valid part number and using it to access the same record number in the DPTR file 641. The record number in the DPTR file 641 corresponding to the same record number comprises a pointer (e.g. pointer 640) to a manufacturer of that part number. The manufacturer is retrieved by accessing the data in the record in the MFGR file 644 pointed to by the pointer (e.g. pointer 640). The DPTR file 641 record also includes a pointer (e.g. pointer 642) to a record in the CHAIN1 file 646. This CHAIN1 file 646 may include one or more pointers to records in the XREF file 651. Each of these records pointed at may include pointers 650 which point back into the DPTR file 641 which includes a pointer (e.g. pointer 640) to a particular record in the MFGR file 644 comprising another manufacturer of that part. The process of looking up more records in the MFGR file 644 comprises searching records sequentially in the sorted DPTR file 641 until the HPTR file record corresponding to the DPTR file 641 record being considered for inclusion in the list of manufacturers is not related to the selected part number. At this point the part selection device 106 knows all of the manufacturers of the part number entered.

Upon selection of a manufacturer 594, the part selection device 106 queries the user whether or not the user wants to enter another parts number 596. If the user wants to enter another parts number, the part selection device 106 will prompt the user to enter a part number 588. Otherwise, part selection means 106 displays the particular part information 598 and selects a particular part. The part information is derived from the data storage device 104 by accessing information pointed to by the records of the DPTR file 641 associated with the part number entered. The specific part information is accessed from the records pointed to in the XREF file 651 and subsequently the record pointed to in the INFO file 640. Upon selection of a particular part 600, part selection device 106 accesses all of the needed bearing information stored in data storage device 104 to select a particular part. Subsequently, the part selection device 106 ends the procedure get part by OEM part number for bearing 602.

Alternatively a user may choose a bearing by part number to OEM part number. FIG. 21 is a flow chart diagramming a procedure for selecting a bearing by a part number and FIG. 23 shows a preferred embodiment file structure containing bearing information stored in data storage device 104 for use in selecting a bearing by part number. Upon selecting the choice of specifying a bearing by part number 604, a user is prompted to enter a part number 606.

Subsequently, part selection device 106 will check if the part number is valid 608. The validity checking is accomplished by finding an HPTR record in the HPTR file 637 which is substantially similar to the part number entered. The HPTR file 637 comprises HPTR records sorted in part number order. Each HPTR record comprises a pointer to a record within an HTAB file 636 comprising a part number. If the part number is not valid, part selection device 106 will prompt the user to enter a part number 606 once again.

Otherwise, if the part number is valid then part selection device 106 will display manufacturers of the part number 610 and prompt the user to select a manufacturer cf the part number. The list manufacturers displayed is derived from data storage device 104 by accessing the same record number in the DPTR file 641 as was found to be a valid part number in the validity checking. The DPTR file 641 comprises the same number of records as the HPTR file 637 sorted in the same order by part number. Each DPTR record includes a pointer 640 to a manufacturer in a MFG.. file 644 and a pointer 642 to either a CHAIN1 file 646 when the selected part number is an OEM part number or to an XREF file 651 when the selected part number is not an OEM part number. The XREF file 651 is a file sorted by part number comprising records including a pointer 650 into a record within DPTR file 641, a pointer into INFO file 652, a pointer 654 to CHAIN2 file 662 and the price 656 of the part. The CHAIN2 file 662 comprises records including one or more pointers to records within XREF file 651. Another file known as DOUBLE CROSS file 659 is included in the data storage device 104. DOUBLE CROSS file 659 is a file with the same number of records as XREF file 651 sorted by part number comprising records including a pointer 660 into a record within CHAIN3 file 658.

For example, a list of manufacturers is derived by taking HPTR record number (e.g. the record including pointer 638) of the valid part number and using it to access the same record number in the DPTR file 641. The record number in the DPTR file 641 corresponding to the same record number comprises a pointer (e.g. pointer 642) to a record in the XREF file 651. This XREF record corresponds to a record in the DOUBLE CROSS file 659 which includes a pointer 660 to CHAIN3 file 658. The record pointed to in CHAIN3 file 658 includes one or more pointers back into DPTR file 641 each of which subsequently include a pointer (e.g. pointer 640) to a record in the MFGR file 644 comprising an OEM manufacturer of that part number. The process of looking up more records in the MFGR file 644 continues until the last pointer in the pointed at record in the CHAIN3 file 658 does not contain a pointer back into the DPTR file 641. At this point the part selection device 106 knows all of the OEM manufacturers of the part number entered.

Upon selection of a manufacturer 612, the part selection device 106 queries the user whether or not the user wants to enter another parts number 614. If the user wants to enter another parts number, the part selection device 106 will prompt the user to enter a part number 606. Otherwise, the part selection device 106 ends the procedure get part by part number to OEM part number for bearing 616.

Alternatively a user may choose a bearing by a partial OEM part number. FIG. 22 is a flow chart diagramming a procedure for selecting a bearing by a partial OEM part number and FIG. 23 shows a preferred embodiment file structure containing filter information stored in data storage device 104 for use in selecting a bearing by OEM part number. Upon selecting the choice of specifying a bearing by OEM part number 618, a user is prompted to enter a part number 620.

Subsequently, part selection device 106 will check if the part number is valid 622. The validity checking is accomplished by finding an HPTR record in the HPTR file 637 which is substantially similar to the part number entered. The HPTR file 637 comprises HPTR records sorted in part number order. Each HPTR record comprises a pointer to a record within an HTAB file 636 comprising a part number. If the part number is not valid, part selection device will prompt the user to enter a part number 620 once again.

Otherwise, if the part number is valid then part selection device 106 will display manufacturers of the part number 624 and prompt the user to select a manufacturer of the part number. The list manufacturers displayed is derived from data storage device 104 by accessing the same record number in the DPTR file 641 as was found to be a valid part number in the validity checking. The DPTR file 641 comprises the same number of records as the HPTR file 637 sorted in the same order by part number. Each DPTR record includes a pointer 640 to a manufacturer in a MFGR file 644 and a pointer 642 to either a CHAIN1 file 646 when the selected part number is an OEM part number or to an XREF file 651 when the selected part number is not an OEM part number. The XREF file 651 is a file sorted by part number comprising records including a pointer 650 into a record within DPTR file 641, a pointer into INFO file 652, a pointer 654 to CHAIN2 file 662 and the price 656 of the part. The CHAIN2 file 662 comprises records including one or more pointers to records within XREF file 651.

For example, a list of manufacturers is derived by taking HPTR record number (e.g. the record including pointer 638) of the valid part number and using it to access the same record number in the DPTR file 641. The record number in the DPTR file 641 corresponding to the same record number comprises a pointer (e.g. pointer 640) to a manufacturer of that part number. The manufacturer is retrieved by accessing the data in the record in the MFGR file 644 pointed to by the pointer (e.g. pointer 640). The DPTR file 641 record also includes a pointer (e.g. pointer 642) to a record in the CHAIN1 file 646. This CHAIN1 file 646 may include one or more pointers to records in the XREF file 651. Each of these records pointed at may include pointers 650 which point back into the DPTR file 641 which includes a pointer (e.g. pointer 640) to a particular record in the MFGR file 644 comprising another manufacturer of that part. The process of looking up more records in the MFGR file 644 comprises searching records sequentially in the sorted DPTR file 641 until the HPTR file 637 record corresponding to the DPTR file 641 record being considered for inclusion in the list of manufacturers is not related to the selected part number. At this point the part selection device 106 knows all of the manufacturers of the part number entered.

Upon selection of a manufacturer 626, the part selection device 106 queries the user whether or not the user wants to enter another parts number 628. If the user wants to enter another parts number, the part selection device 106 will prompt the user to enter a part number 620. Otherwise, part selection means 106 displays the particular part information 630 and selects a particular part. The part information is derived from the data storage device 104 by accessing information pointed to by the records of the DPTR file 641 associated with the part number entered. The specific part information is accessed from the records pointed to in the XREF file 651 and subsequently the record pointed to in the INFO file 640. Upon selection of a particular part 632, part selection device 106 accesses all of the needed bearing information stored in data storage device 104 to select a particular part. Subsequently, the part selection device 106 ends the procedure get part by partial OEM part number for bearing 634.

Referring now to FIG. 24A, 24B, 24C, 24D, 24E, and 24F, these figures encompass a flow chart of an example showing the use of the preferred part selection device 106 and display apparatus 102 in a parts selection computer system 100. The flow chart diagrams an example of using computer system 100 from a user's point of view by depicting graphic and textual parts-related information which may be shown to a user. This information preferably is shown to a user on a video display screen for review or for continued navigation through a series of menus.

Figure 24A:
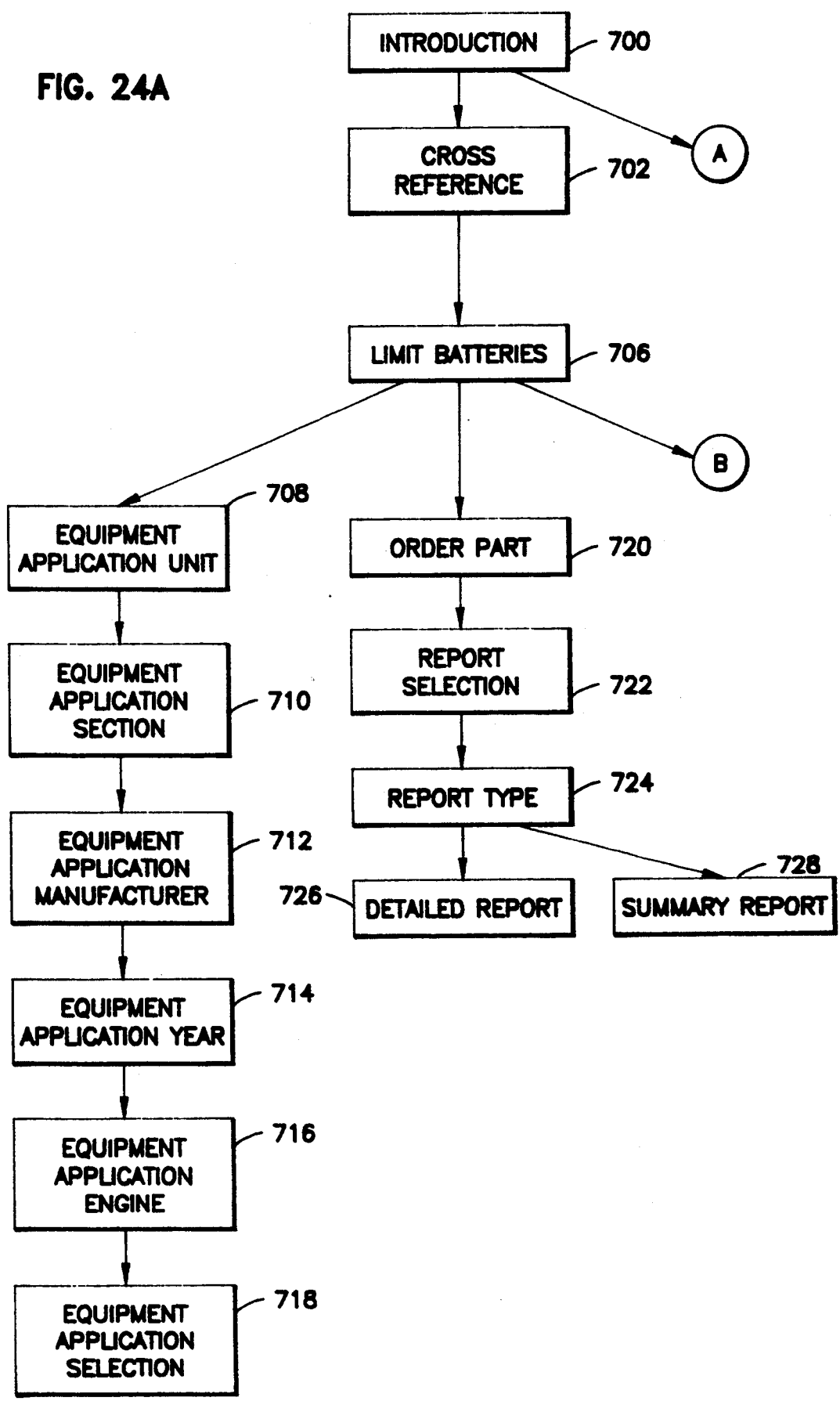
Figure 24B:
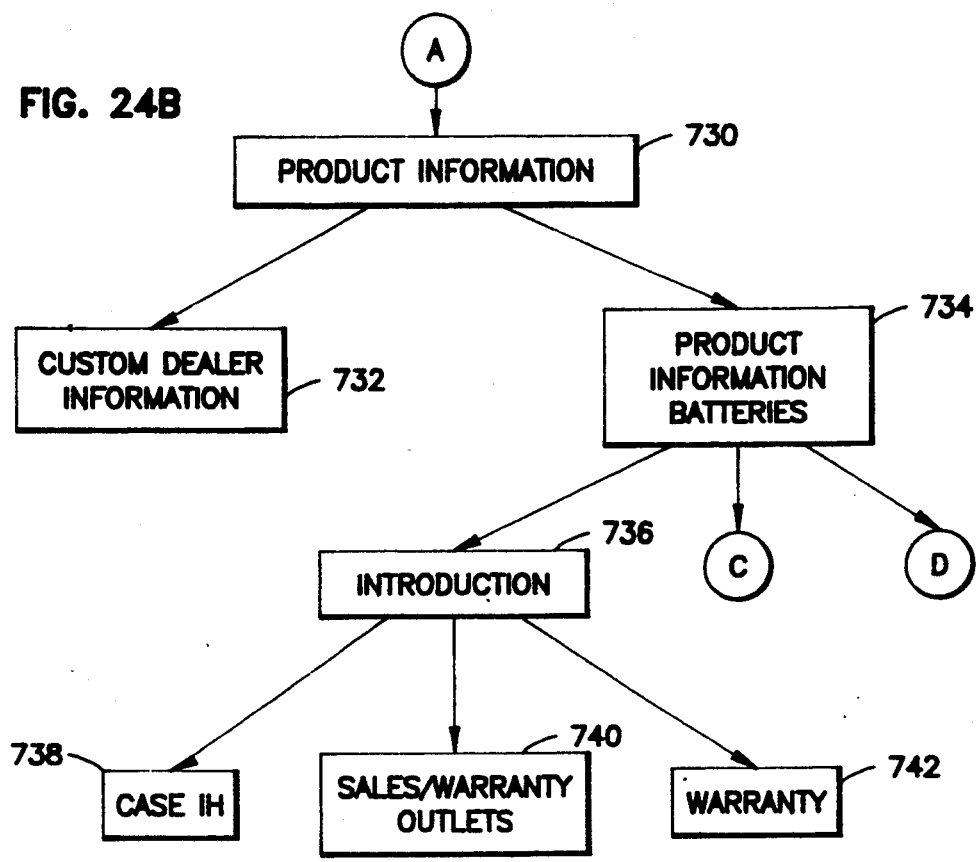

Referring now more particularly to FIG. 24a, by starting at the introduction menu/screen display 700 a user is given the choice to select from a plurality of options including an option to go to a cross-reference menu/screen display 702 and a product information menu/screen display 730. Upon selecting to go to cross-reference 702, a screen such as the one shown in FIG. 26 is presented on the display. At this point the user may choose to look up various parts, e.g., batteries, filters, remanufactured electrical parts, lubrication and bearings. For this example we will focus on batteries; however, it will be appreciated by those skilled in the art that the cross-reference scheme shown here by example for batteries can be substantially duplicated for virtually any part benefiting from the present system.

Figure 29:
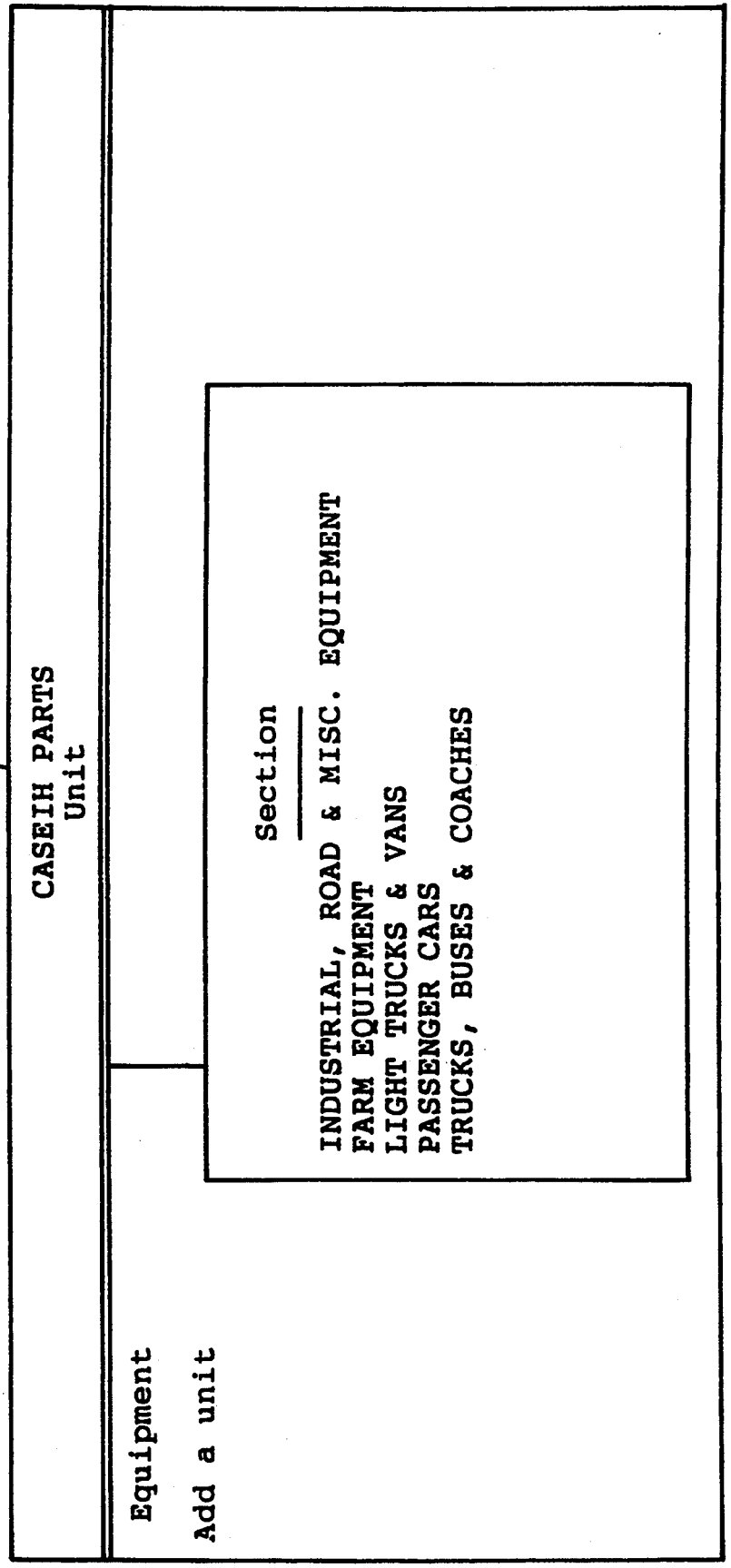
FIG. 29 is a representation of an example menu/display screen for use in the example described from the users point of view.

Upon choosing batteries from the options in FIG. 26, a menu/screen display 706 shown in FIG. 27 is presented to the user. At this point the user may choose to find a particular part by part number, equipment application or battery specifications. In choosing a part by part number, a particular part is automatically found in data storage device 104 and selected for the user. However, if a user chooses to find a part by equipment application, a menu/display screen 708 as shown in FIG. 28 is presented to the user. At this point the user may choose to add a unit to the list of equipment for this particular proposal or order. Upon choosing to add the equipment, a pop-up menu of equipment application section menu/screen display 710 as depicted in FIG. 29 is shown to the user. The user may select any one of the five types of equipment to find a part for. In this example, we will choose to select passenger cars; however, it will be appreciate by those familiar with the art that the other types of equipment will have similar types of menu selections in order to find a particular part for a particular product or piece of equipment.

Upon selecting passenger cars, a menu/screen display 712 as shown in FIG. 30 is shown to the user. The menu shows particular manufacturers of passenger cars to choose from to find a particular part for. As indicated in FIG. 30, subsequent screens showing other manufacturers of passenger cars are available for viewing. In the preferred embodiment, the menu display screen shown is the first of a set of seven possible menu/display screens which may be shown on the display screen. For simplicity we will select for this example the Audi manufacturer.

Figure 32:
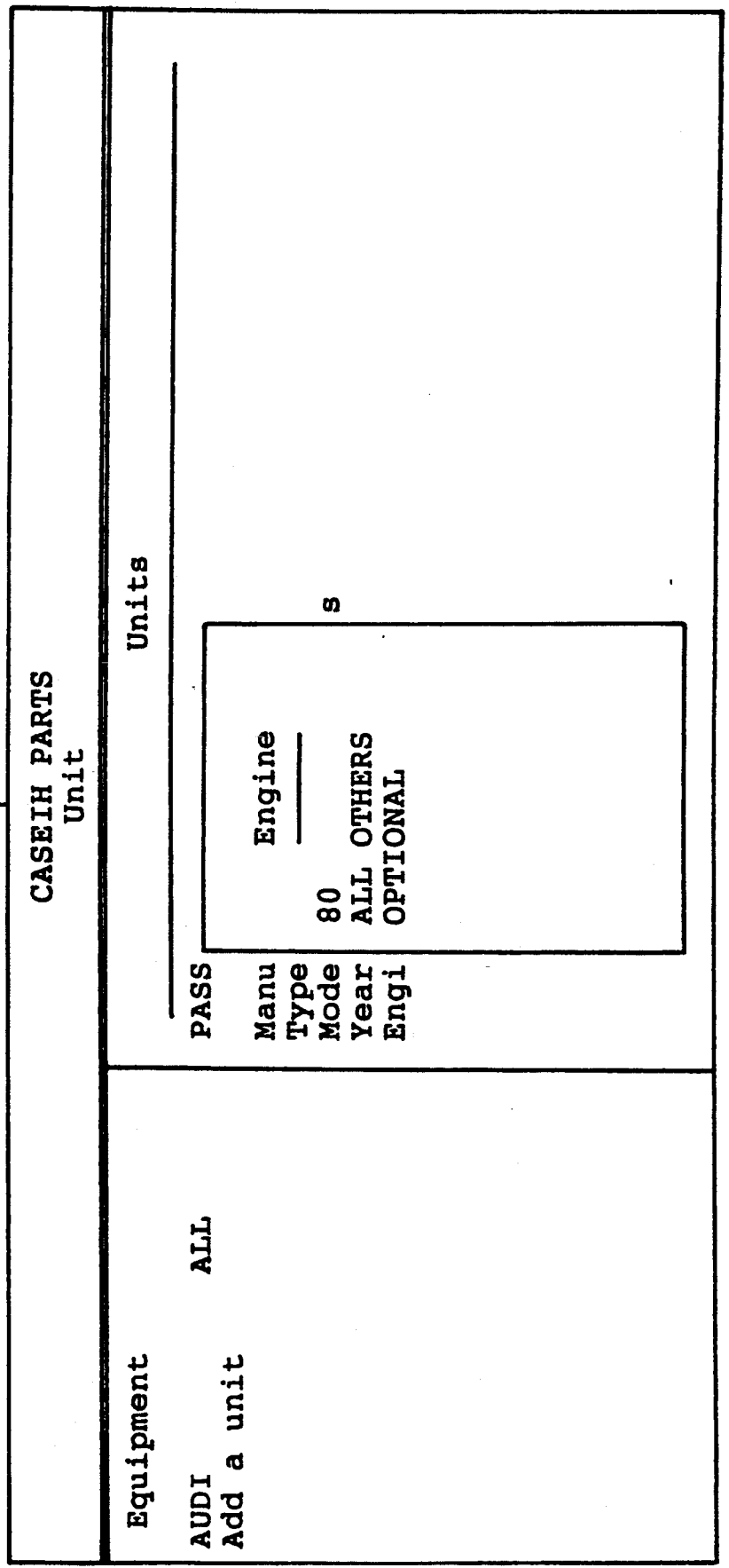
FIG. 32 is a representation of an example menu/display screen for use in the example described from the users point of view.

Upon choosing the Audi manufacturer, a menu/screen display 714 is shown to the user so that he or she may select a particular set of years in which to look for a part for that particular manufacturer of passenger cars. For this example, we will choose the model years 1970 to 1977. Upon choosing model years 1970 to 1977, a menu/screen display 716 shown in FIG. 32 is shown to the user. On this screen display the user is given the choice to select a particular engine type which, in this case, include 80, all others or optional engine types. For simplicity, we will choose an 80 engine for this example. Upon selection of the 80 engine, the user is presented a menu/screen display 718 shown in FIG. 33 which gives a brief summary of the selections made in choosing this particular piece of equipment. If the user is satisfied with this selection, he or she may return to menu/screen display 706 shown in FIG. 27. Otherwise, the user may choose to edit the particular equipment selected or add another unit.

Upon returning to menu/screen display 706 shown in FIG. 27, the user may choose to order the part at this point. If the user chooses to order the part, he or she is shown a screen similar to one as depicted in menu/screen display 720 shown in FIG. 34. The menu/screen display 720 shown in FIG. 34 is related to the selections previously made in this example, and it will be appreciated by those familiar with the art that the menu/screen display will change depending upon the particular piece of equipment selected. The user may choose to display the price of the particular part 721 at this time.

If the user is satisfied with the parts that have been selected, he or she may choose to generate a report showing this proposal/order of parts. Upon selecting a reporting option, a menu/screen display 722 shown in FIG. 35 may be shown to the user. The user may choose to generate several types of reports. In this example, we will choose to generate a proposal/order. Upon choosing a proposal/order report selection, a menu/screen display 724 shown in FIG. 36 is shown to the user. At this point, the user may choose to generate a detailed or a summary report type.

Upon choosing a detailed report type, a report similar to one shown in screen display 726 and depicted in FIG. 37 is generated. Alternatively, the user may choose to generate a summary report type. Upon choosing the summary report type, a proposal/order would be generated similar to one shown in screen display 728 as depicted in FIG. 38.

Figure 24C:
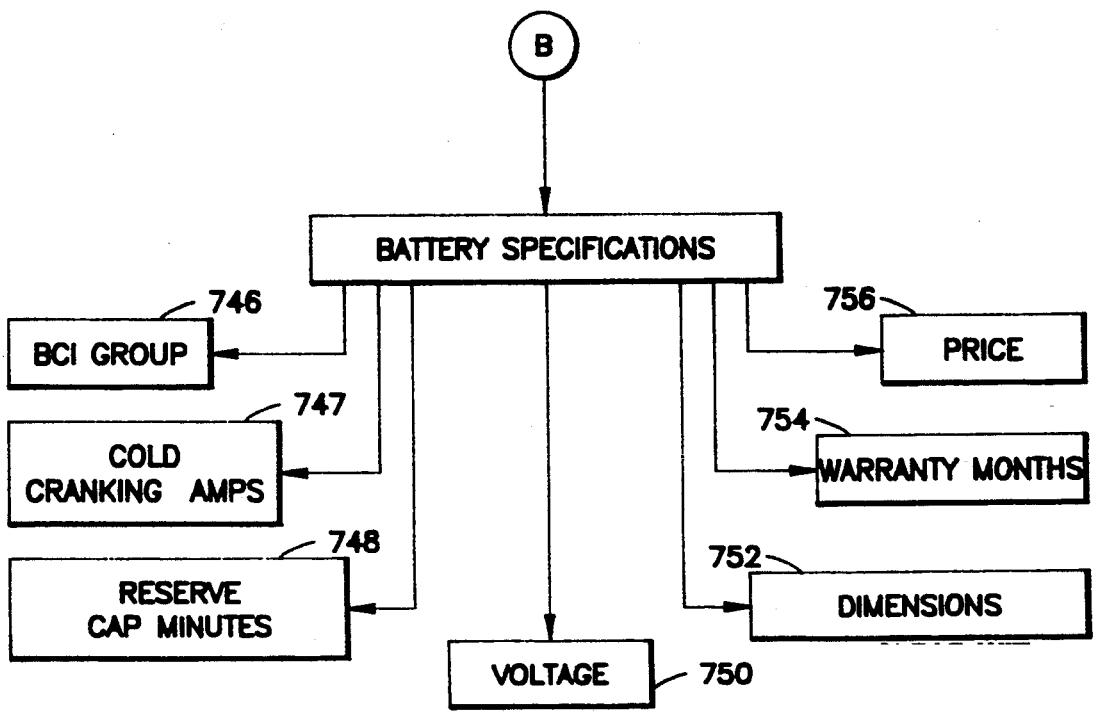

Alternatively, a user may choose to pick a particular battery by setting particular battery specifications, as shown in FIG. 24C. For example, a user may choose to specify a BCI group as shown in menu/screen display 746 and depicted in FIG. 39. Alternatively, a user may choose to specify a particular battery by cold cranking amps as depicted in menu/screen display 747 as shown in FIG. 40. Alternatively, a user may choose to select a particular battery by reserved capacity minutes as shown in menu/screen display 748 and depicted in FIG. 41. Alternatively, a user may choose to select a particular battery by voltage as shown in menu/screen display 750 and depicted in FIG. 42. Alternatively, a user may choose to select a particular battery by dimensions as shown in menu/screen display 752 and depicted in FIG. 43. Alternatively, a user may choose to select a particular battery by number of warranty months as shown in menu/screen display 754 and depicted in FIG. 44. Alternatively, a user may choose to select a particular battery by price as shown in menu/screen display 756 and depicted in FIG. 45.

It is also possible for a user to pick one or more of the battery specifications to further specify a particular battery for selection. Typically, it is necessary to pick more than one particular specification in order to limit the possible part choices down to a small number of batteries to choose from. Furthermore, in practice, a user will know several of the specifications for his or her particular need and, as such, selecting a particular battery through battery specifications may be very useful. After selecting a particular battery by any one of the three possible selection schemes including by part number, by equipment application and by battery specifications, a user can choose to generate a report or continue and pick another part, e.g., a filter, remanufactured electrical part, lubrication or bearings or perhaps may choose to select yet another battery for an order. As previously indicated, those skilled in the art will recognize that the present invention can be substantially duplicated for virtually any part benefiting from the present system.

Figures 48, 49:
FIG. 48 is a representation of an example menu/display screen for use in the example described from the users point of view.
FIG. 49 is a representation of an example menu/graphic display screen for use in the example described from the users point of view.

Alternatively, when a user is shown menu/display screen 700 as depicted in FIG. 25, he or she may choose to select product information. Upon choosing product information, a menu/screen display 730 as depicted in FIG. 46 is shown to the user. Menu/screen display 730 provides an opportunity to the user to select information about a dealer, batteries, filters, remanufactured electrical parts, lubricants, or bearings. If the user chooses to select information about a dealer, menu/screen display 732 as shown in FIG. 47 is presented to the user. From this menu/screen display 732, a user may choose to further select background information, parts information, or service information about a particular dealer. Alternatively, referring now to FIG. 46, if a user chooses to learn more information about a battery, a menu/screen display 734 as shown in FIG. 48 is shown to a user. At this point, a user may choose to view a brief introduction, information about how a battery works, or construction features of a battery.

Figure 50:
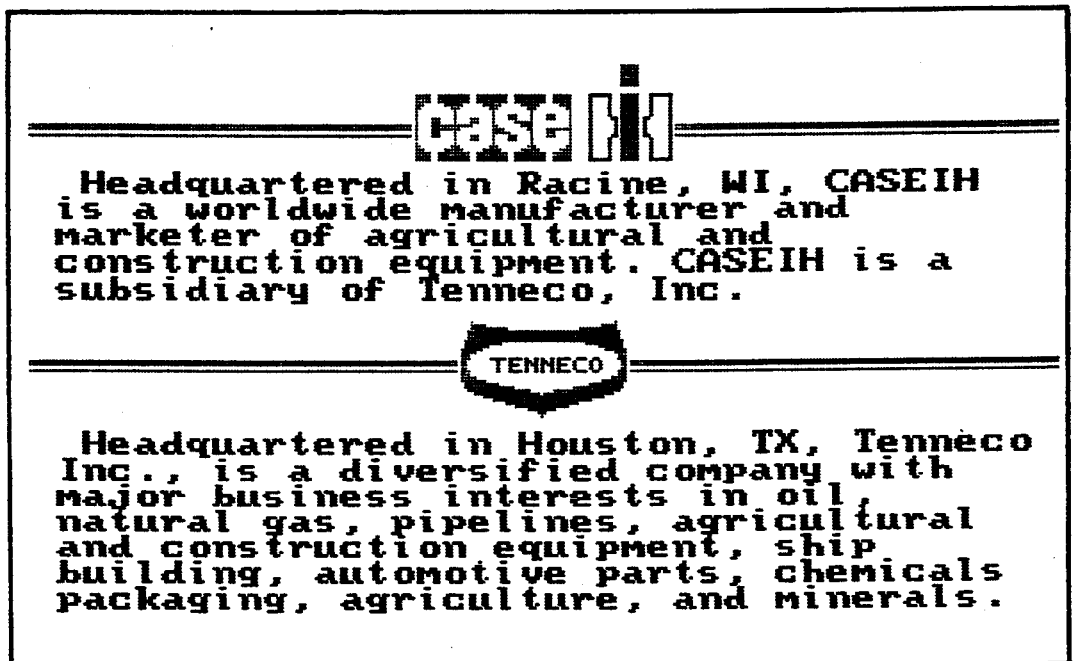
FIG. 50 is a representation of an example graphic display screen for use in the example described from the users point of view.
Figure 51:
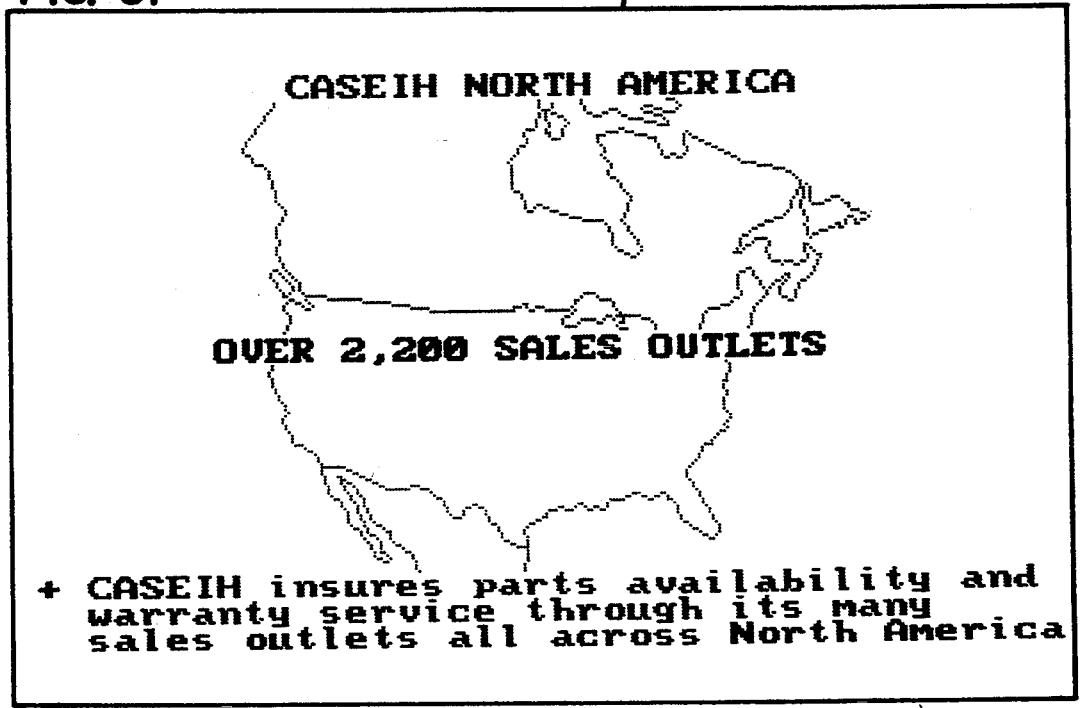
FIG. 51 is a representation of an example graphic display screen for use in the example described from the users point of view.
Figure 52:
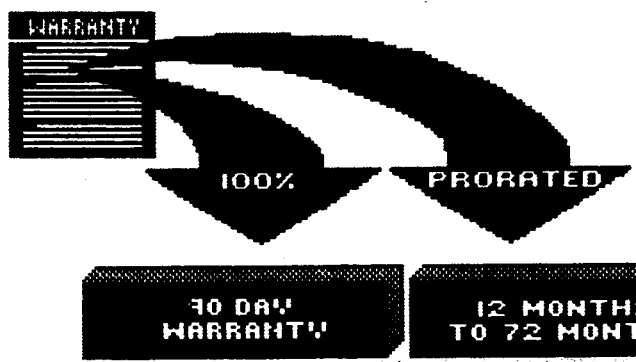
FIG. 52 is a representation of an .example graphic display screen for use in the example described from the users point of view.

If a user selects the introduction, a screen display 736 as shown in FIG. 49 is presented to the user. The user may select to know more about CASE IH, sales/warranty outlets or warranty in particular. Upon selecting to learn more about CASE IH, a graphic display screen 738 as shown in FIG. 50 is presented to the user. Alternatively, upon selecting sales warranty outlets, a graphic screen display 740 as shown in FIG. 51 is presented to the user. Alternatively, upon selecting warranty, a graphic screen display 752 as shown in FIG. 52 is shown to the user.

Figure 24D:
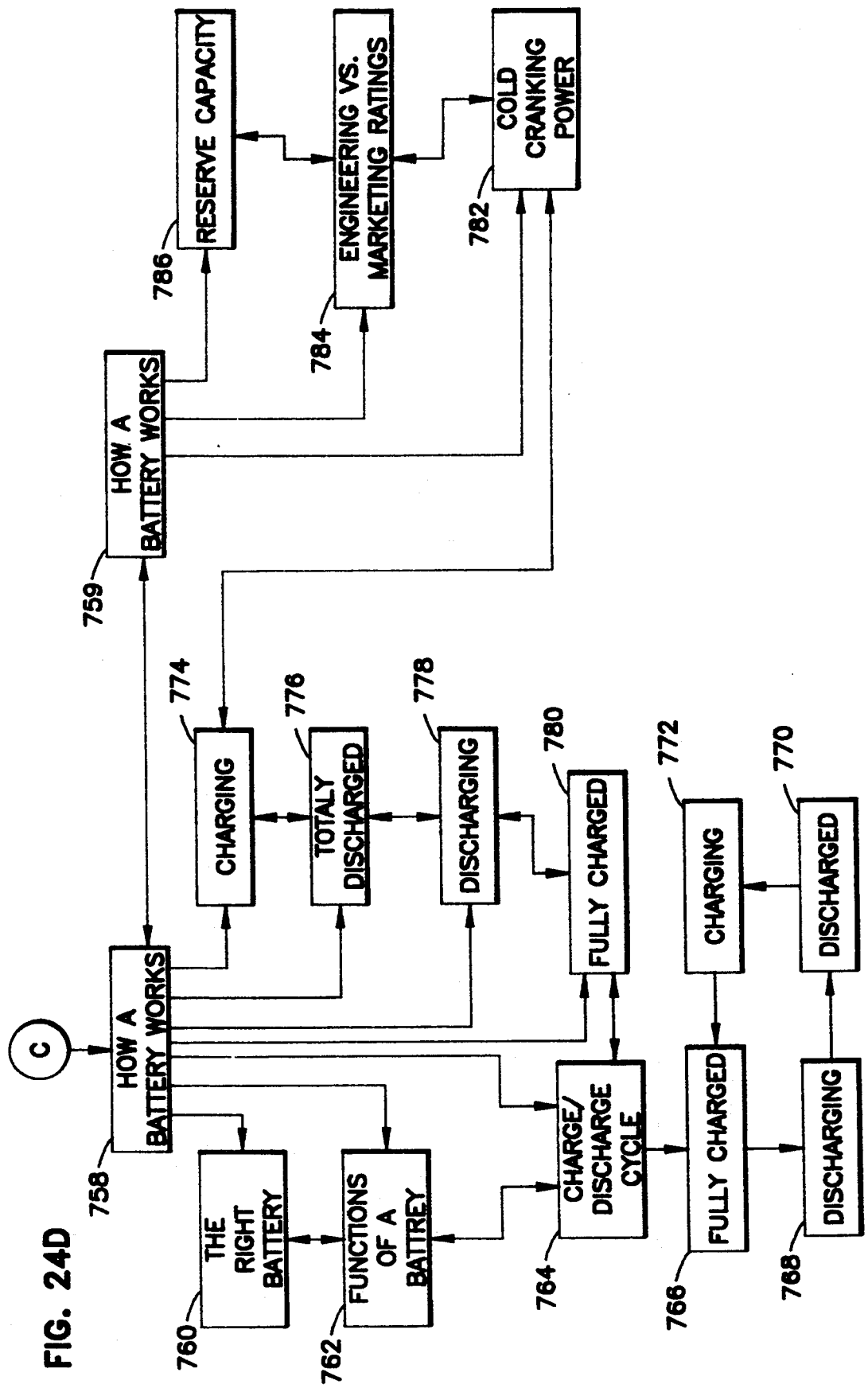
Figure 53:
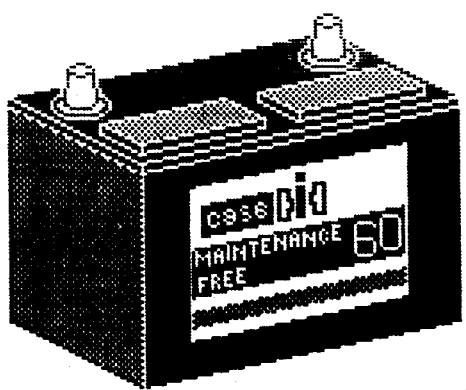
FIG. 53 is a representation of an example menu/graphic display screen for use in the example described from the users point of view.

Referring now to FIG. 24D (or alternatively to screen display 734 shown in FIG. 48) a user may choose to learn more about how a battery works. Upon selecting how a battery works, a screen display 758 as shown in FIG. 53 is presented to the user. As shown in FIG. 53, the user may choose to display a graphic screen display concerning several different topics. As shown in FIG. 24D, a user may choose to pick a particular topic such as choosing the right battery shown in screen display 760 and depicted in FIG. 54. Upon displaying screen display 760, a viewer may choose to continue viewing similar types of graphic screen displays in sequence such as screen display 762 depicting functions of a battery as shown in FIG. 55 or alternatively return to graphic screen display 758 as depicted in FIG. 53 and from graphic screen display 758 select any of the other graphic screen displays listed in the lower half of the screen depicted in FIG. 53.

Figure 56:
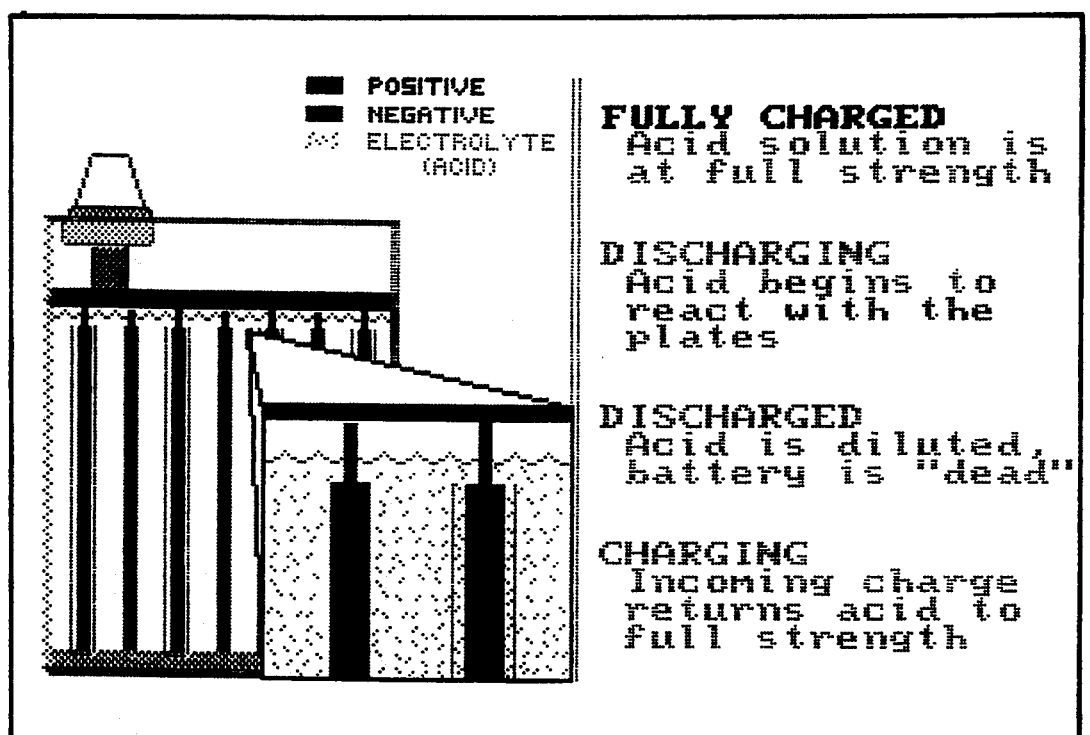
FIG. 56 is a representation of an example graphic display screen for use in the example described from the users point of view.
Figure 57:
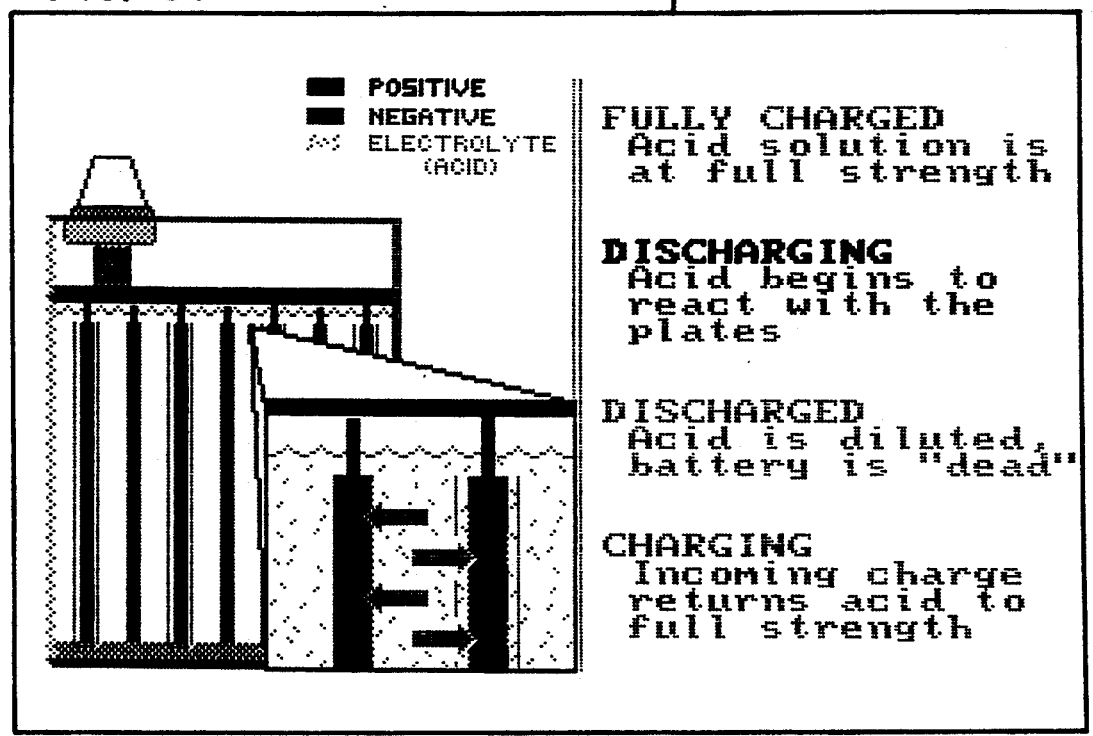
FIG. 57 is a representation of an example graphic display screen for use in the example described from the users point of view.
Figure 58:
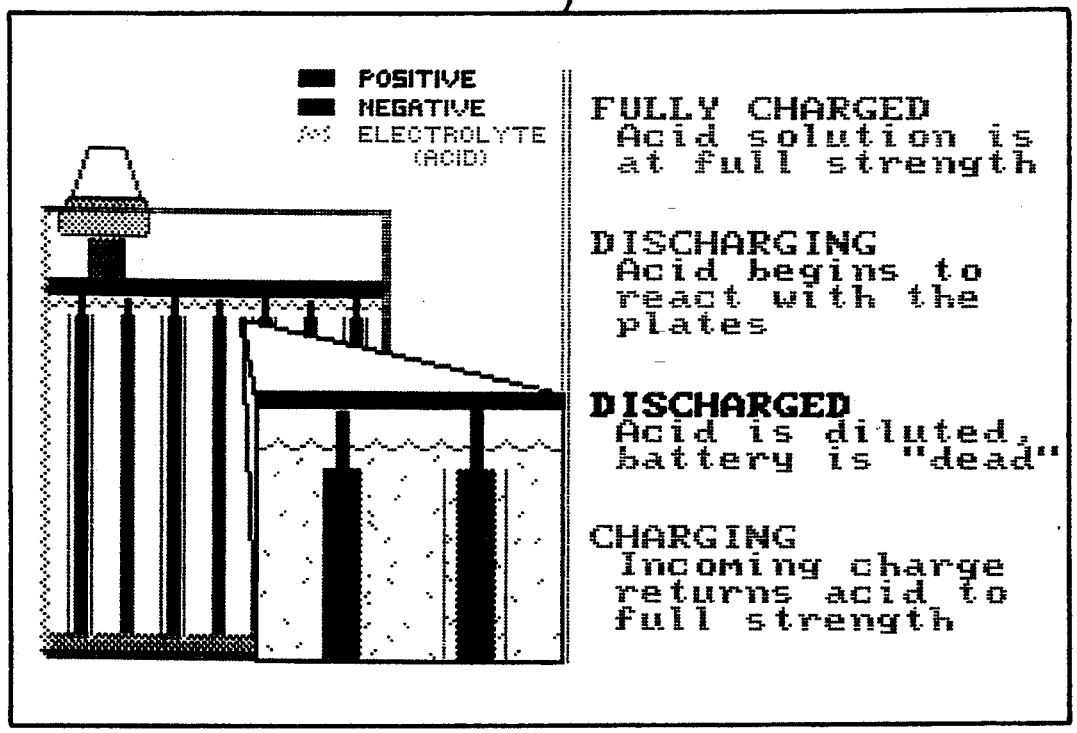
FIG. 58 is a representation of an example graphic display screen for use in the example described from the users point of view.
Figure 59:
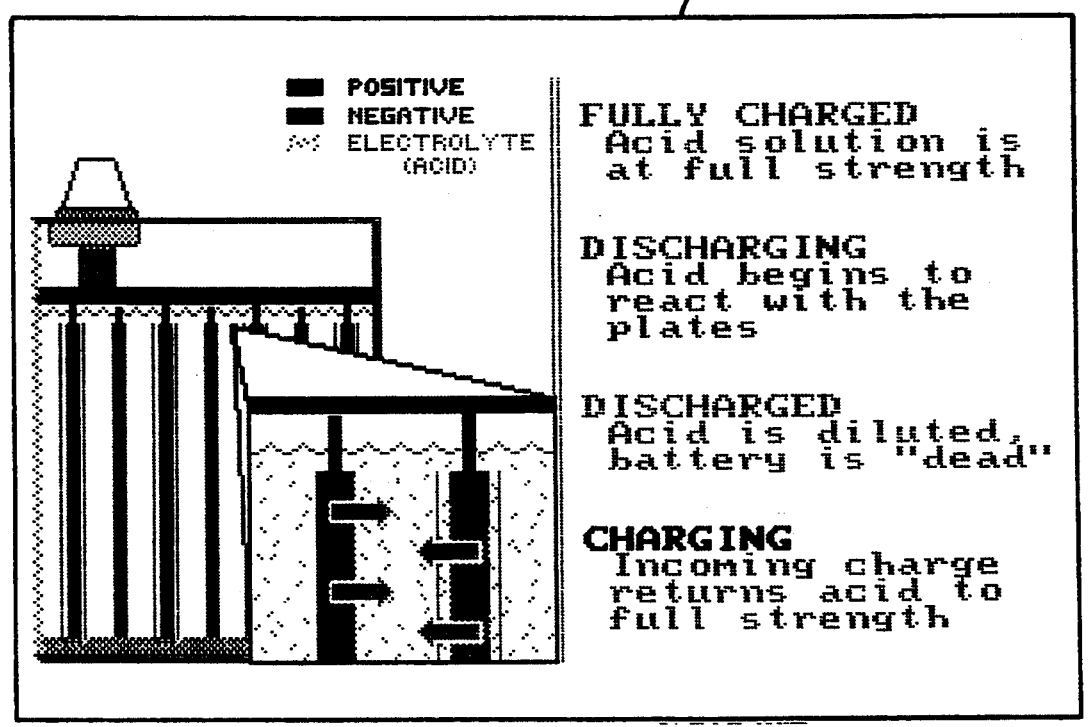
FIG. 59 is a representation of an example graphic display screen for use in the example described from the users point of view.
Figure 60:
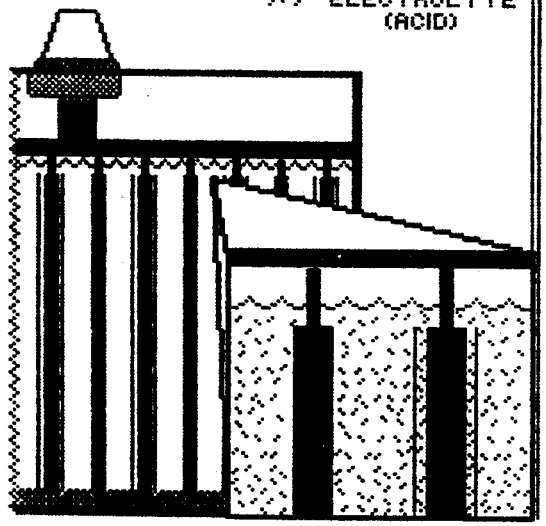
FIG. 60 is a representation of an example graphic display screen for use in the example described from the users point of view.
Figure 61:
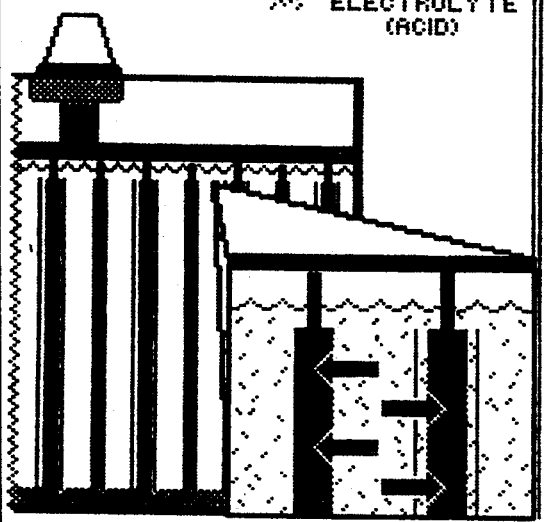
FIG. 61 is a representation of an example graphic display screen for use in the example described from the users point of view.
Figure 62:
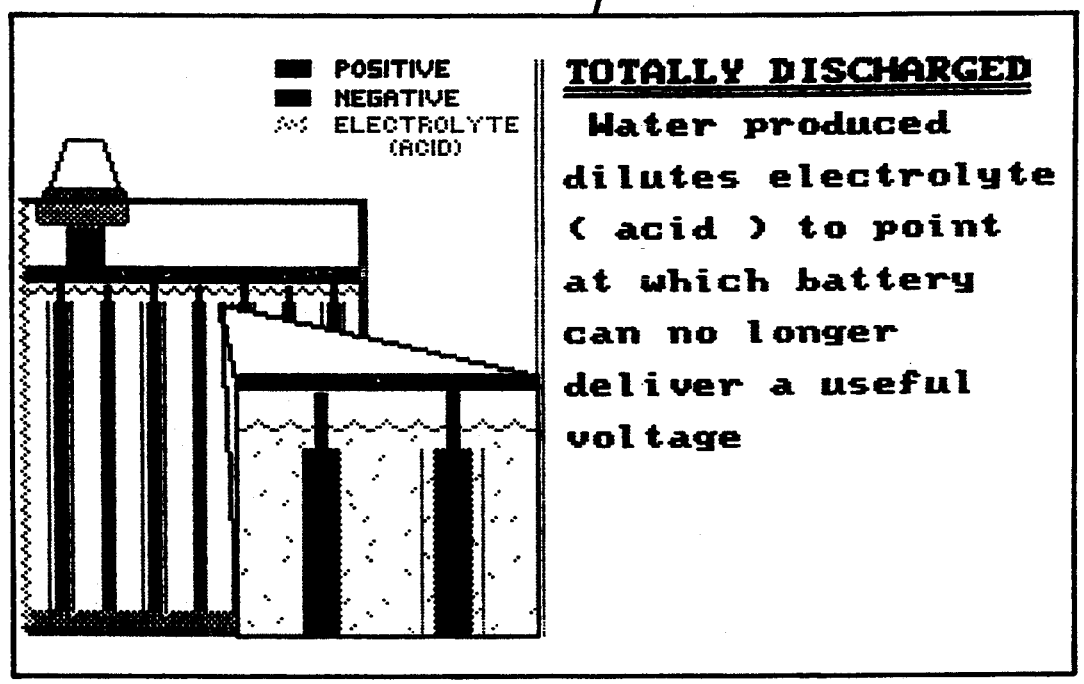
FIG. 62 is a representation of an example graphic display screen for use in the example described from the users point of view.
Figure 63:
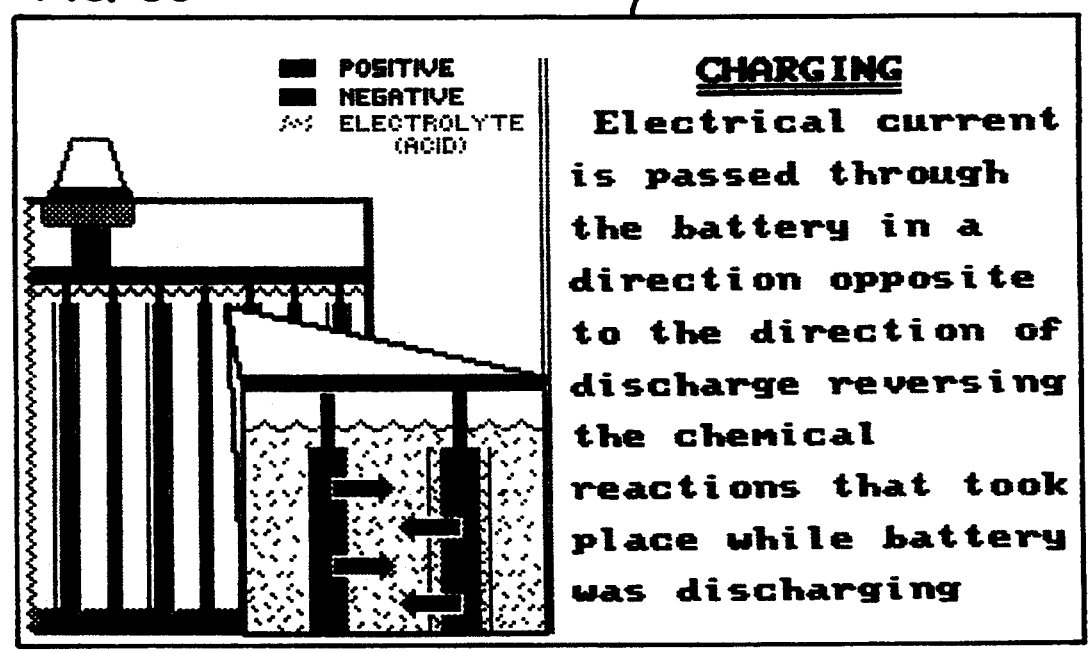
FIG. 63 is a representation of an example graphic display screen for use in the example described from the users point of view.
Figure 64:
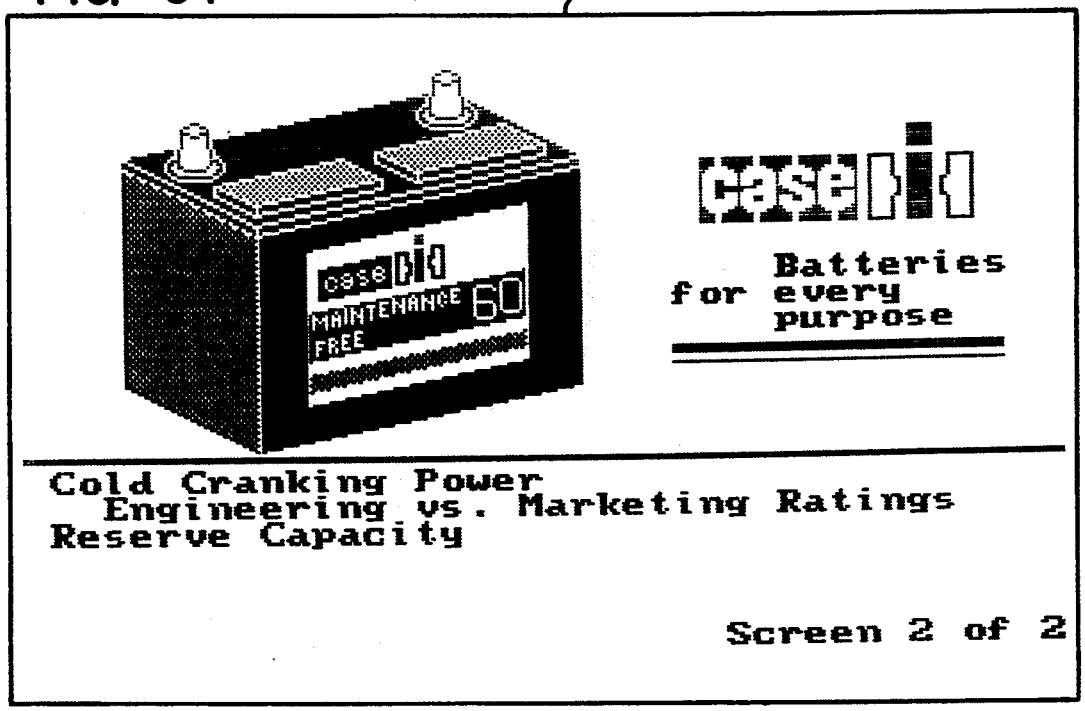
FIG. 64 is a representation of an example menu/graphic display screen for use in the example described from the users point of view.
Figure 65:
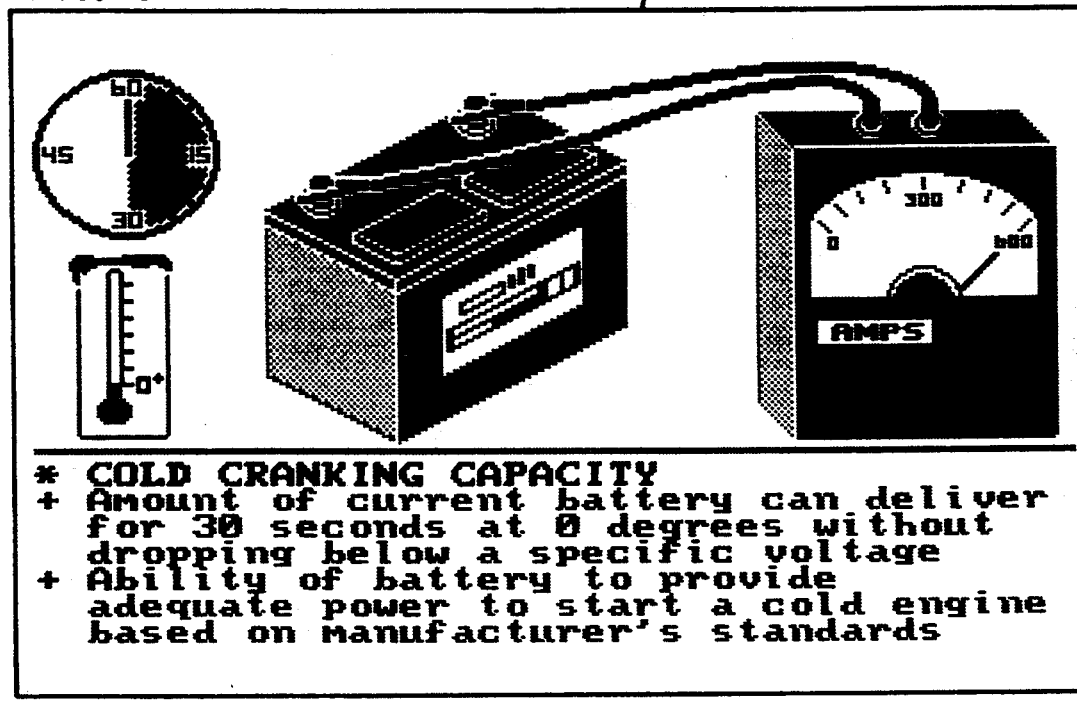
FIG. 65 is a representation of an example graphic display screen for use in the example described from the users point of view.
Figure 66:
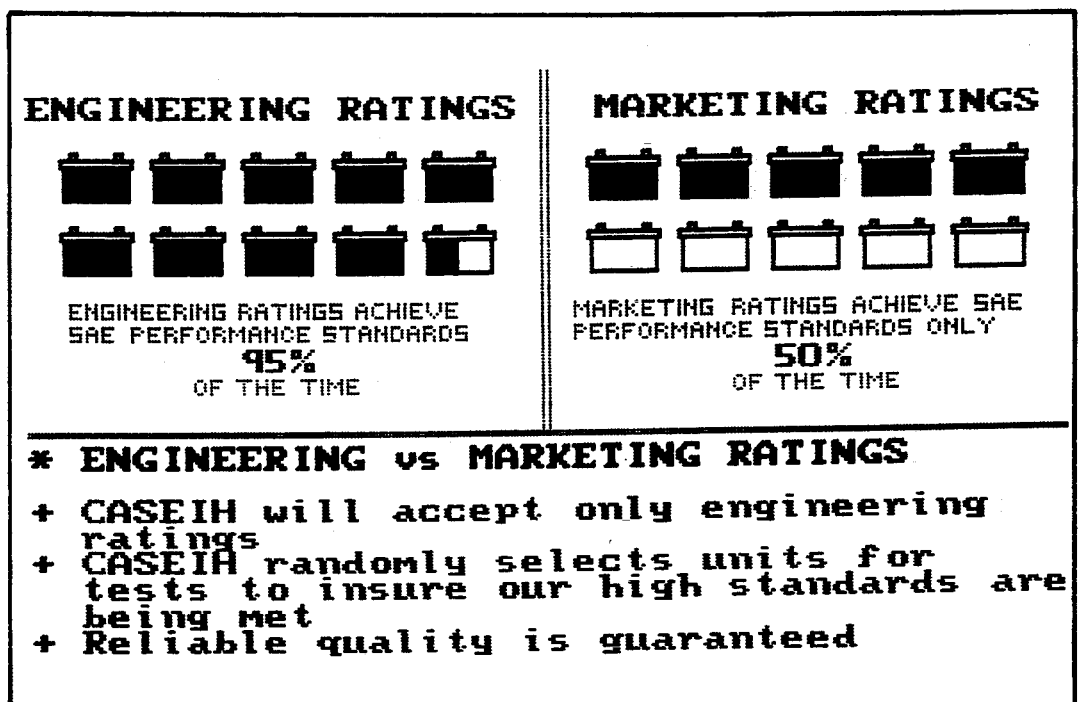
FIG. 66 is a representation of an example graphic display screen for use in the example described from the users point of view.
Figure 67:
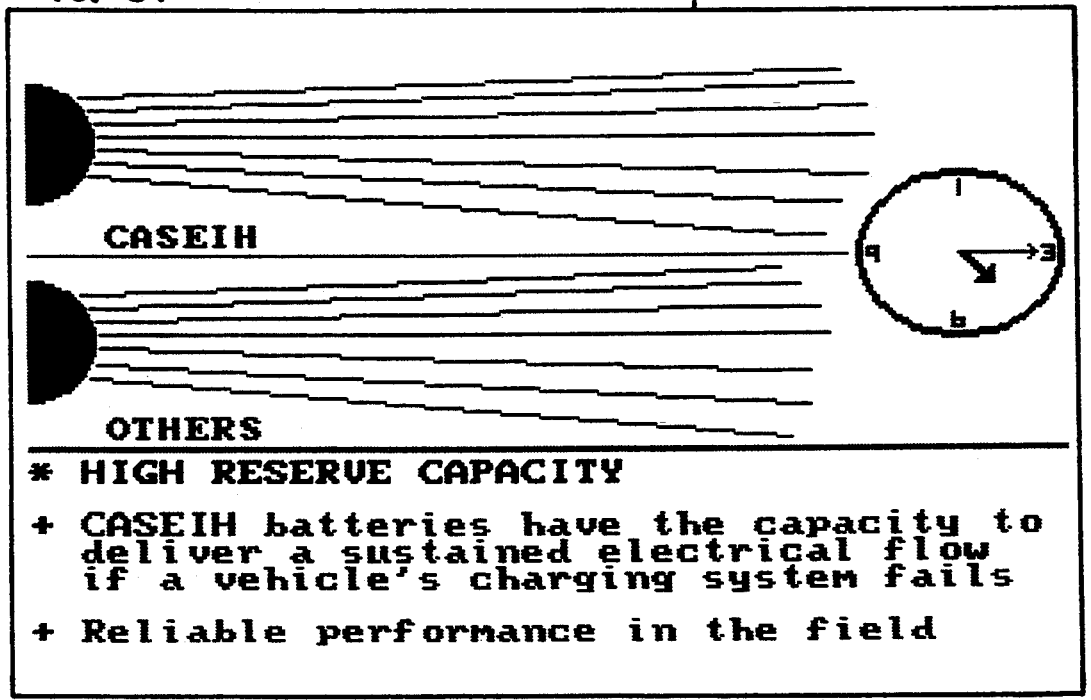
FIG. 67 is a representation of an example graphic display screen for use in the example described from the users point of view.

In either form of choosing a particular graphic screen display, the same screen display that should follow as shown by the arrow connectors in FIG. 24 is shown to the user. In particular, upon choosing to learn more about the charge/discharge cycle, 764 screen displays 766 shown in FIG. 56, graphic screen display 768 shown in FIG. 57, graphic screen display 770 shown in FIG. 58 and graphic screen display 772 shown in FIG. 59 are presented to the user. In the preferred embodiment, the group of screen displays 766, 768, 770 and 772 forms an animated sequence of screen displays which continually switch between the various four screens to show animation of the charging cycle of a battery. It will be appreciated by those in the art that such an animation comprises simply displaying several graphic screens in a sequence to show movement. Alternatively, from screen display 758, a user may choose to display information about a fully charged battery as shown in screen 780 depicted in FIG. 60, a discharging battery as shown in FIG. 778 depicted in FIG. 68, a totally discharged battery as shown in screen display 776 and depicted in FIG. 62 or a charging battery as shown in screen display 774 depicted in FIG. 63. Alternatively, from graphic screen display 758, a user may choose to view another screen 759 shown in FIG. 64. From graphic screen display 759, a user may choose to view more information about cold cranking power as shown in graphic screen display 782 and depicted in FIG. 65. Alternatively, a user may choose to view more information about engineering versus marketing ratings as shown in graphic screen display 784 depicted in FIG. 66. Alternatively, a user may choose to view more information about reserve capacity as shown in graphic screen display 786 and depicted in FIG. 67.

Figure 24F:
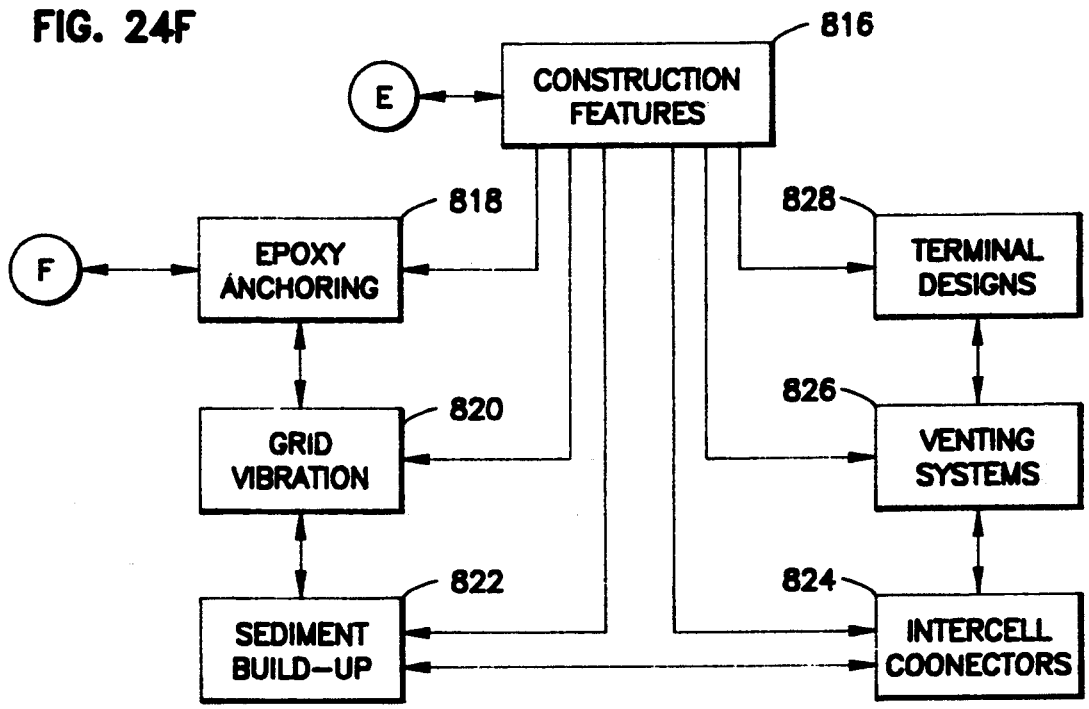
Figure 68:
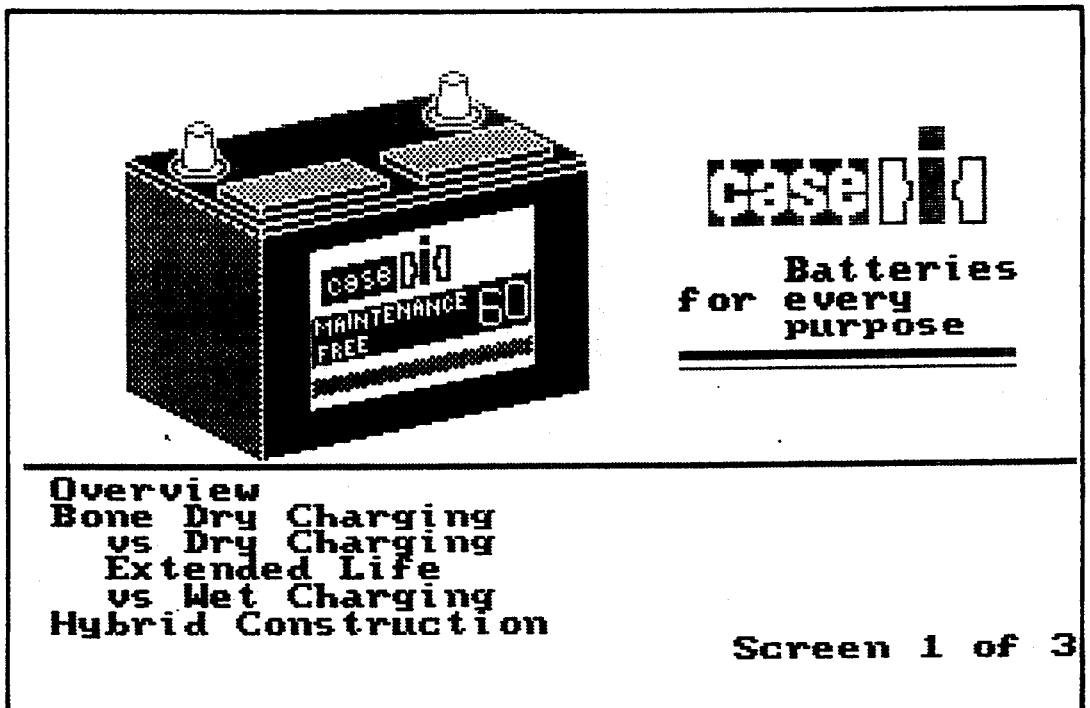
FIG. 68 is a representation of an example menu/graphic display screen for use in the example described from the users point of view.
Figure 69:
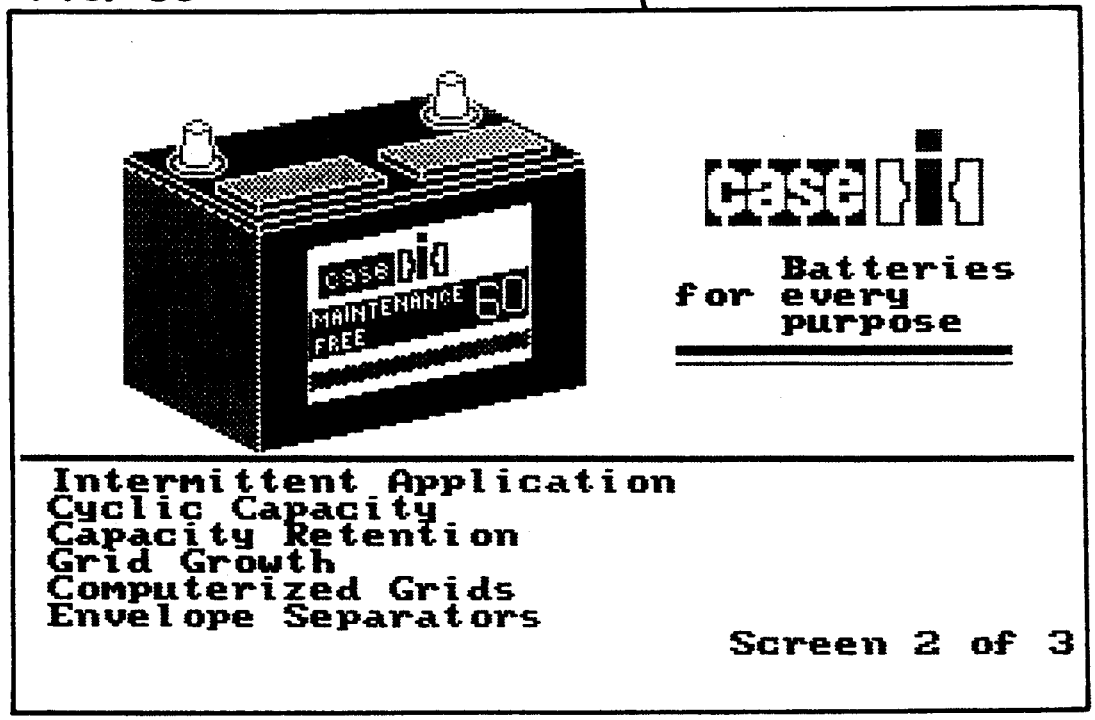
FIG. 69 is a representation of an example menu/graphic display screen for use in the example described from the users point of view.
Figure 70:
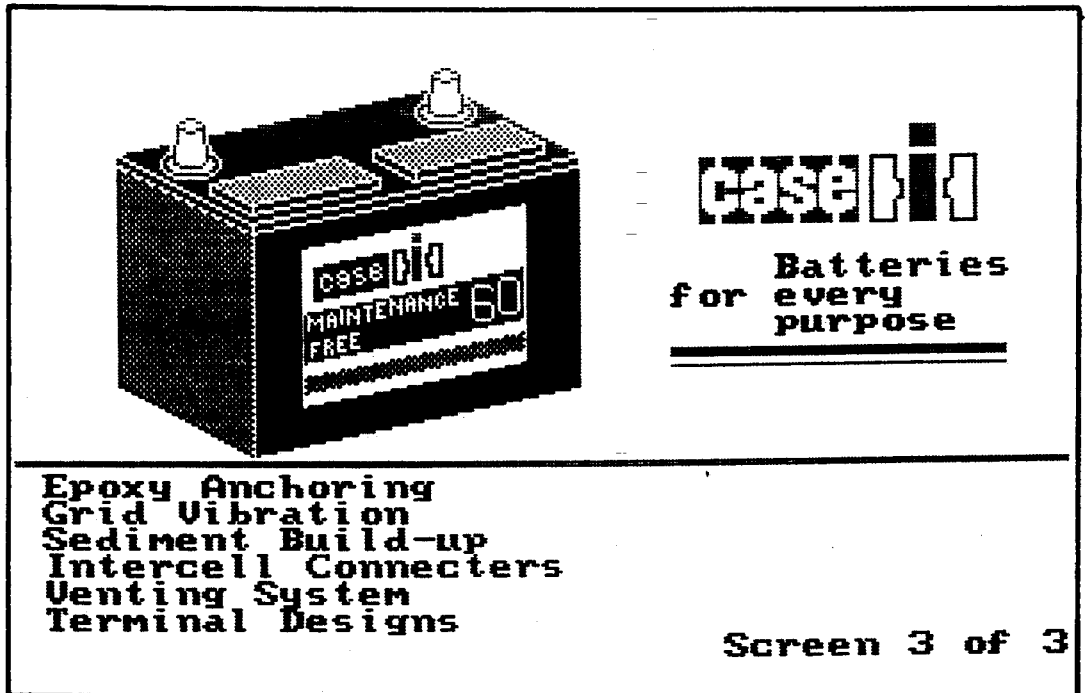
FIG. 70 is a representation of an example graphic display screen for use in the example described from the users point of view.
Figure 71:
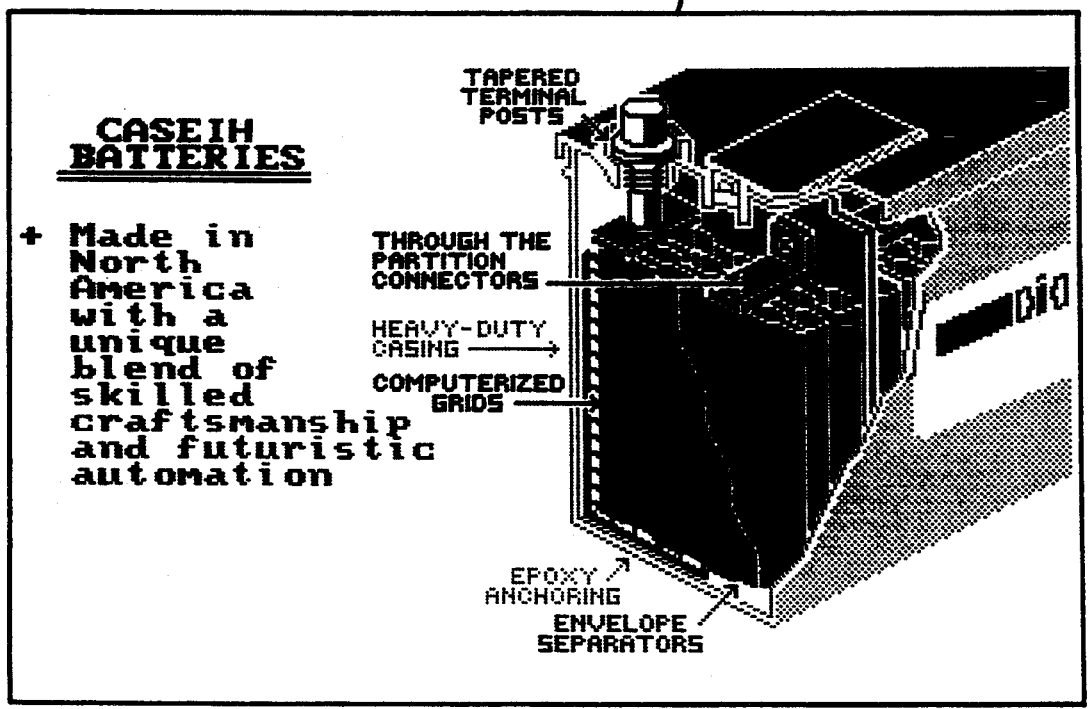
FIG. 71 is a representation of an example graphic display screen for use in the example described from the users point of view.
Figure 72:
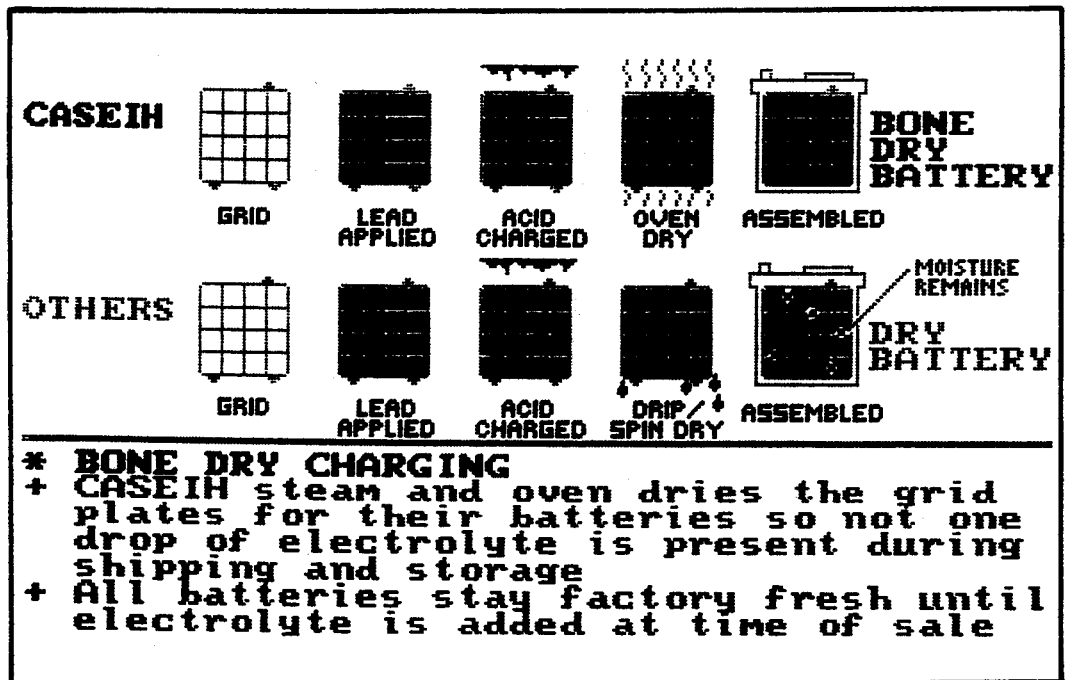
FIG. 72 is a representation of an example graphic display screen for use in the example described from the users point of view.
Figure 73:
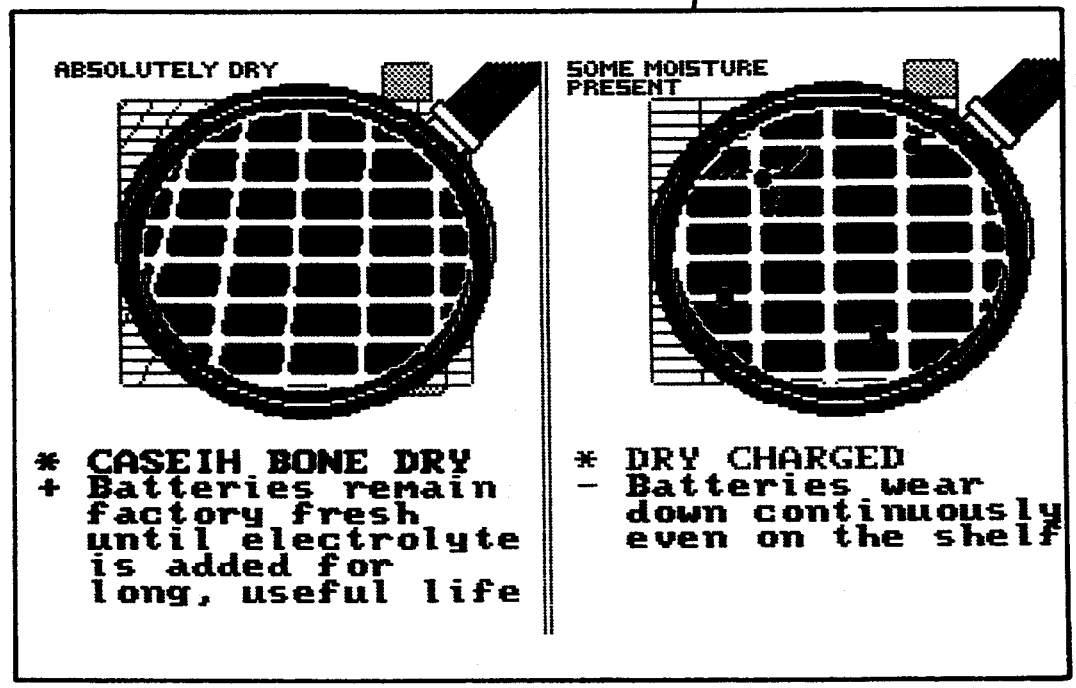
FIG. 73 is a representation of an example graphic display screen for use in the example described from the users point of view.
Figure 74:
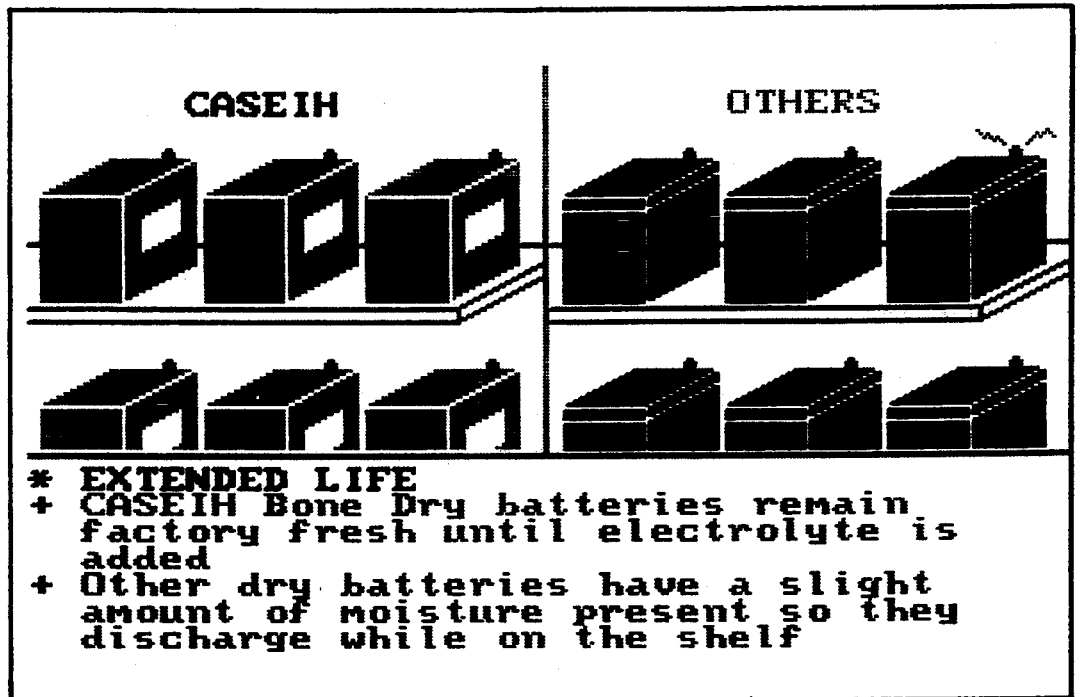
FIG. 74 is a representation of an example graphic display Screen for use in the example described from the users point of view.

Alternatively, from graphic screen display 7224 shown in FIG. 48, a user may choose to view more information about construction features. A flow chart of the operation of the construction features section of this example for batteries is shown in FIG. 24E and 24F. Upon choosing to learn more about construction features, a user selects construction features and a graphic screen display 788 depicted in FIG. 68 is shown to the user. At this point, the user may choose to select one of the menu items in the lower portion of the graphic screen display 788 or go to graphic screen display 790 shown in FIG. 69 or graphic screen display 816 shown in FIG. 70 which provide more menu choice items to learn about other construction features of the battery. Upon choosing any one of the menu choices shown in graphic screen displays 788, 790 or 816, the user is shown one of several graphic screen displays depicting particular construction features of the battery. By way of example, a user may choose to view more overview information about battery construction features. Upon doing so, a graphic screen display 792 shown in FIG. 71 is presented to the user. Alternatively, upon choosing to learn more about bone dry charging, a screen display 794 shown in FIG. 74 is presented. Alternatively, upon choosing to learn more about bone dry versus dry charging, a graphic screen display 796 shown in FIG. 73 is presented. Alternatively, upon choosing to learn more about the extended life of a battery, graphic screen display 798 shown in FIG. 74 is presented to the user.

Figure 75:
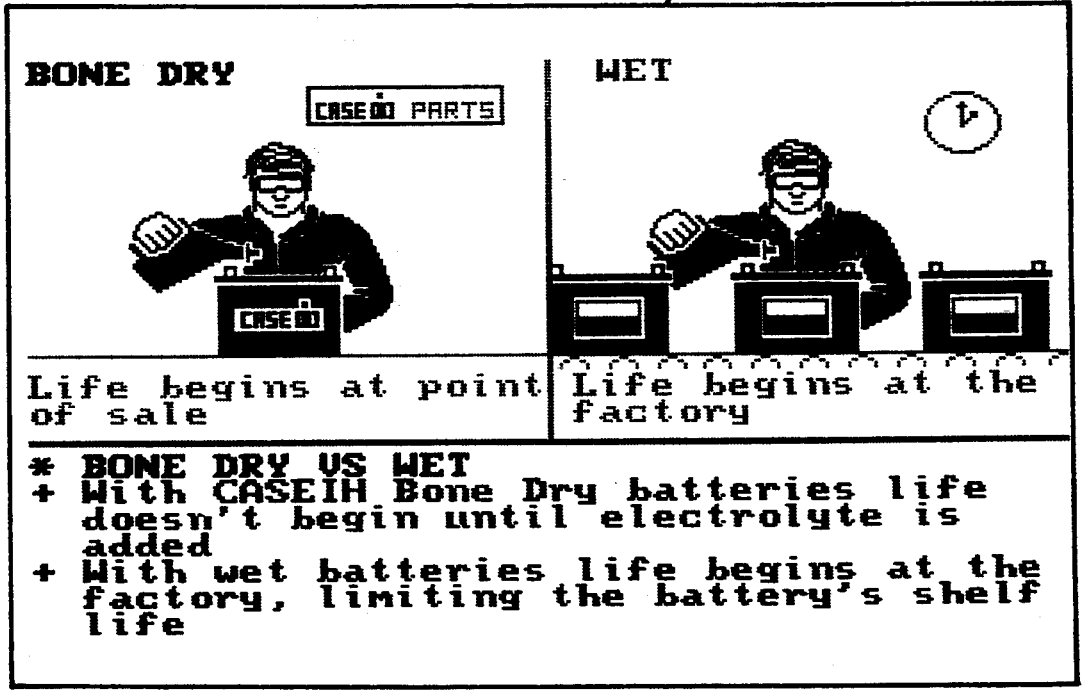
FIG. 75 is a representation of an example graphic display screen for use in the example described from the users point of view.
Figure 78:
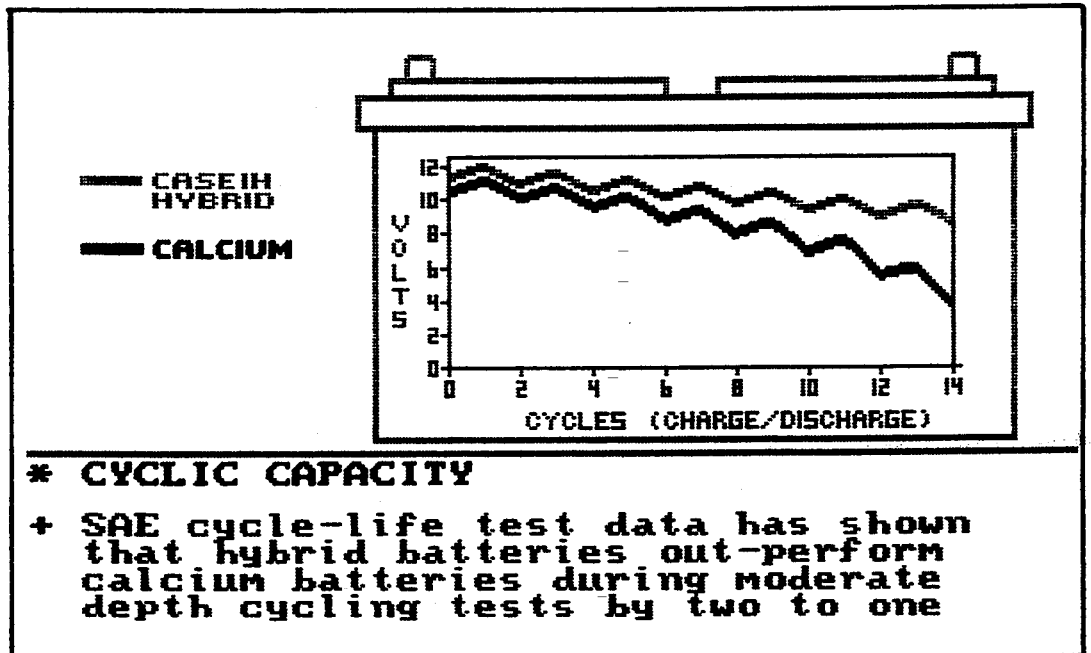
FIG. 78 is a representation of an example graphic display screen for use in the example described from the users point of view.
Figure 79:
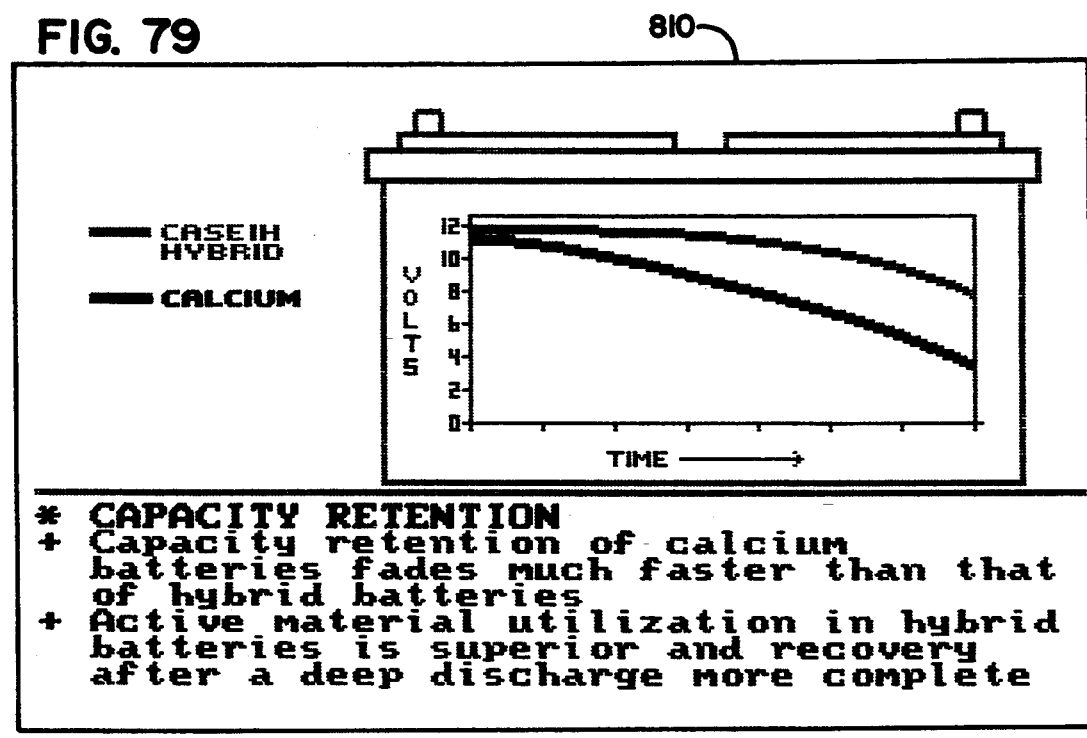
FIG. 79 is a representation of an example graphic display screen for use in the example described from the users point of view.
Figure 80:
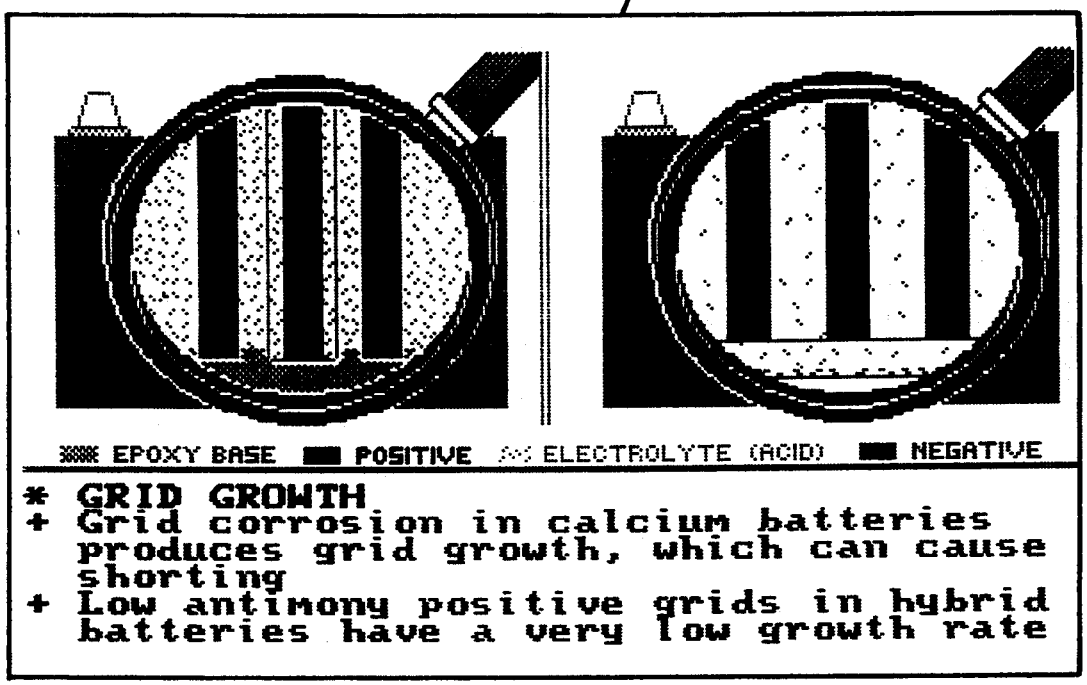
FIG. 80 is a representation of an example graphic display screen for use in the example described from the users point of view.
Figure 81:
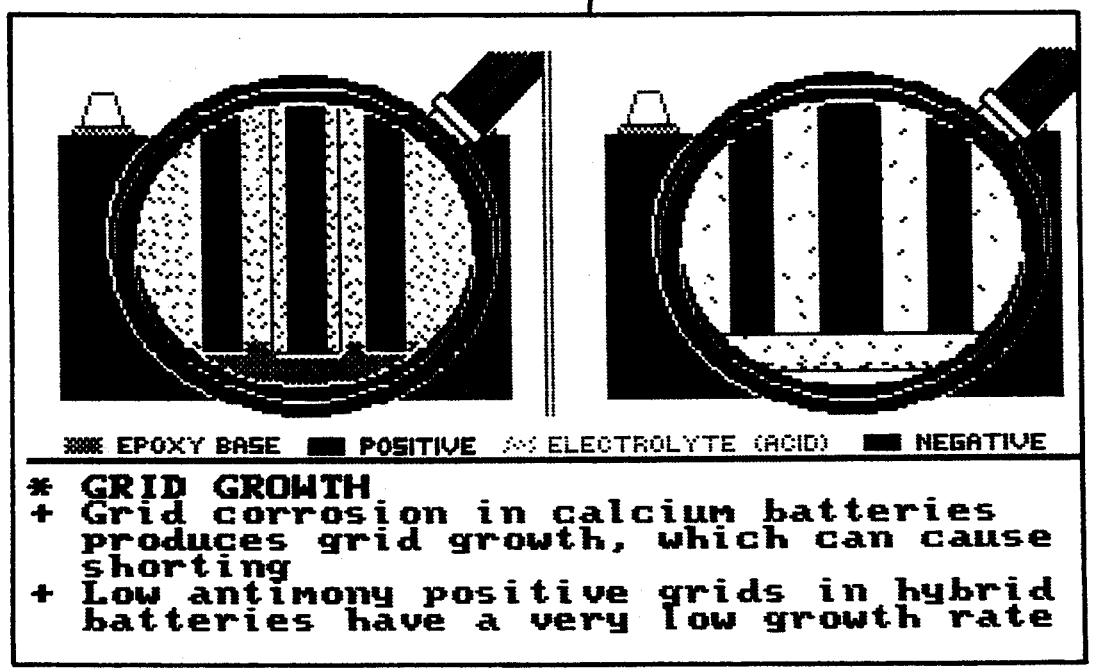
FIG. 81 is a representation of an example graphic display screen for use in the example described from the users point of view.
Figure 82:
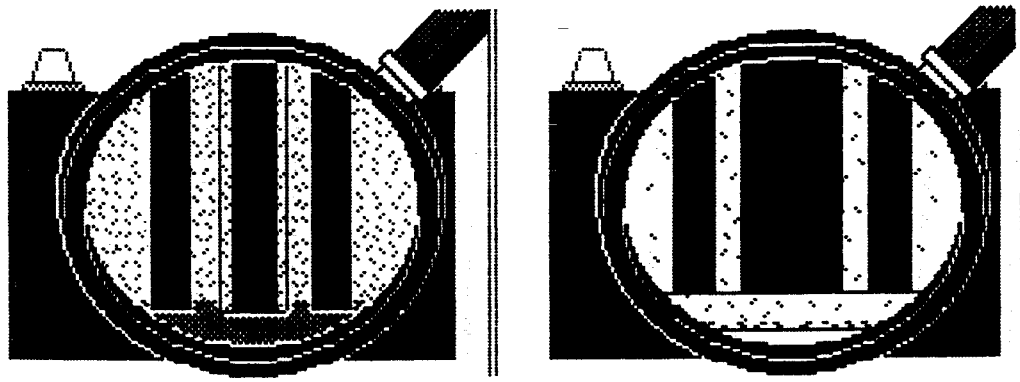
FIG. 82 is a representation of an example graphic display screen for use in the example described from the users point of view.
Figure 83:
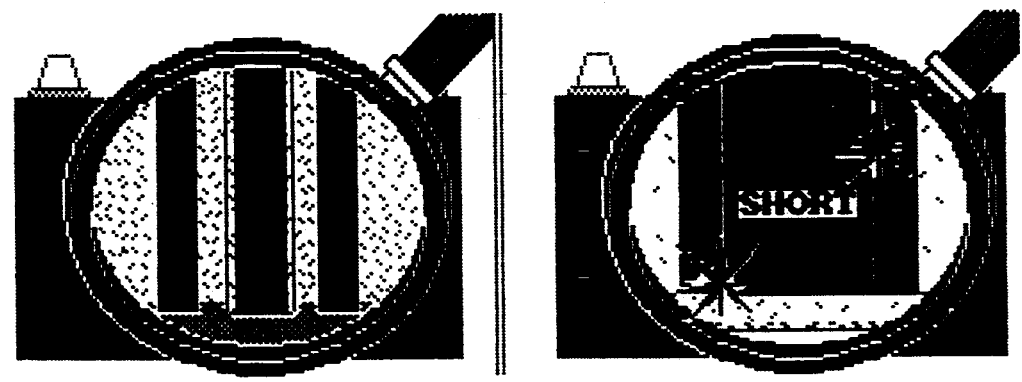
FIG. 83 is a representation of an example graphic display screen for use in the example described from the users point of view.

Alternatively, upon selecting to learn more about bone dry versus wet charging, graphic screen display 800 shown in FIG. 75 is presented to the user. Alternatively, upon choosing to learn more about a hybrid battery construction, a graphic screen display 802 shown in FIG. 76 is presented to the user. Alternatively, upon choosing to learn more about intermediate application of a battery, a graphic screen display 814 shown in FIG. 76 is presented to the user. Alternatively, upon choosing to learn more about the cyclic capacity of a battery, a graphic screen display 812 shown in FIG. 78 is presented to a user. Alternatively, upon choosing to learn more about capacity retention of a battery, graphic screen display 810 shown in FIG. 79 is presented to the user. Alternatively, upon choosing to learn more about grid growth, graphic screen display 808 depicted in FIG. 80, 81, 82 and 83 are presented to the user.

Figure 86:
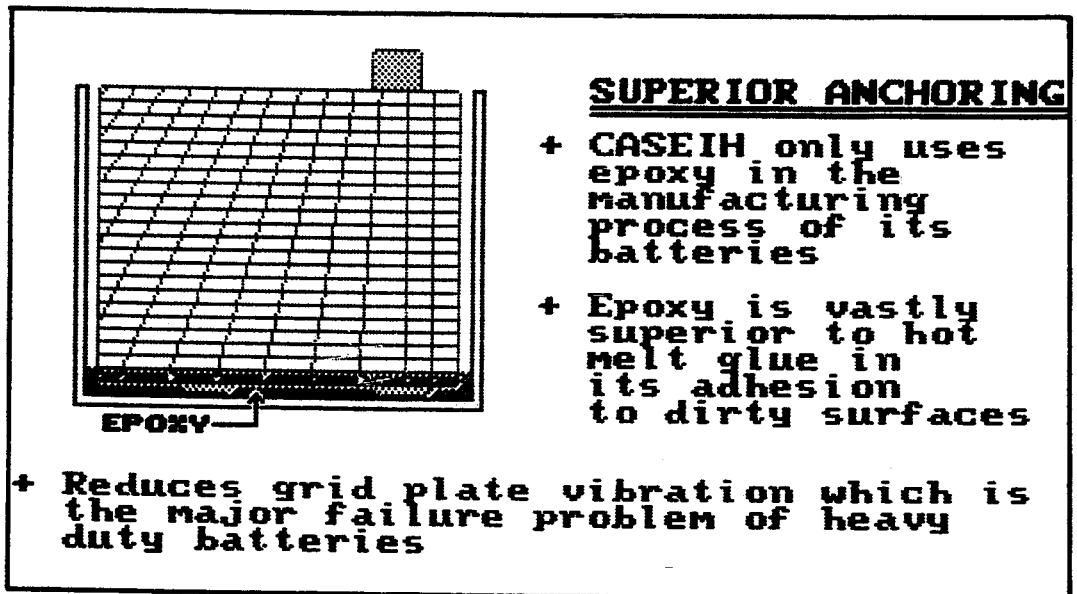
FIG. 86 is a representation of an example graphic display screen for use in the example described from the users point of view.
Figure 87:
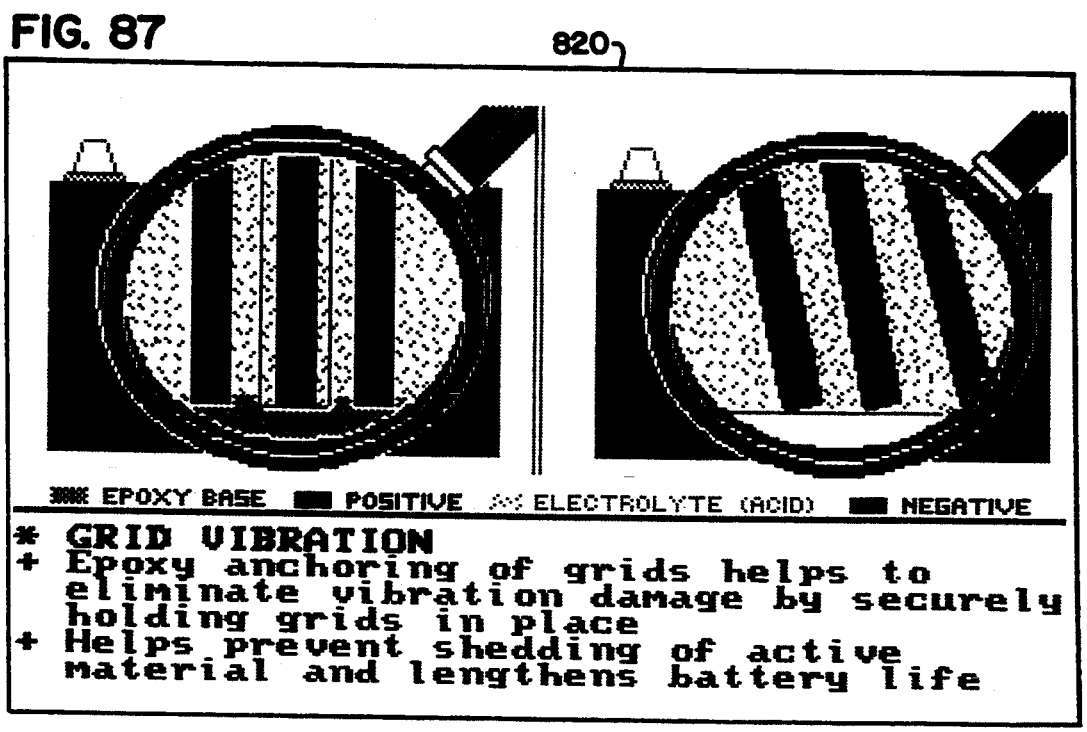
FIG. 87 is a representation of an example graphic display screen for use in the example described from the users point of view.
Figure 88:
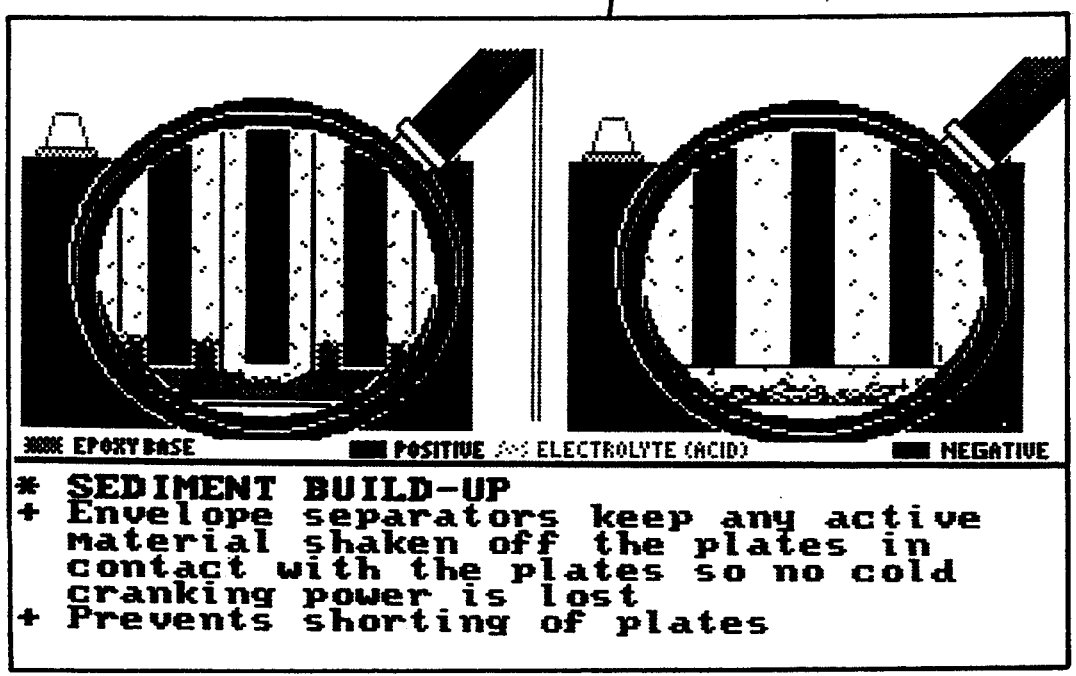
FIG. 88 is a representation of an example graphic display screen for use in the example described from the users point of view.
Figure 89:
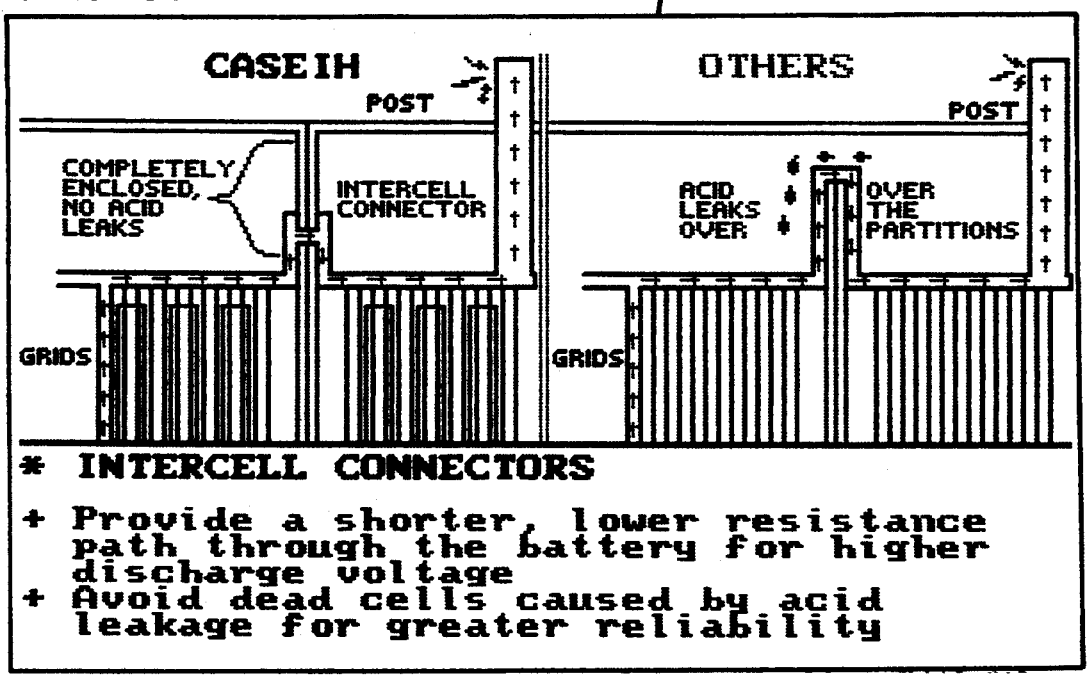
FIG. 89 is a representation of an example graphic display screen for use in the example described from the users point of view.

In the preferred embodiment, the combination of FIG. 80, 81, 82 and 83 encompasses an animated sequence of graphic screen displays which show grid growth. Alternatively, upon choosing to learn more about computerized radio grids, a graphic screen display 806 shown in FIG. 84 is presented to the user. Alternatively, upon choosing to learn more about envelope separators, a graphic screen display 804 shown in FIG. 85 is presented to the user. Alternatively, upon choosing to learn more about epoxy anchoring, a graphic screen display 818 shown in FIG. 86 is presented to the user. Alternatively, upon choosing to learn more about grid vibration, graphic screen display 820 shown in FIG. 87 is presented to the user. Alternatively, upon choosing to learn more about sediment build-up, a graphic screen display 822 shown in FIG. 88 is presented to the user. Alternatively, upon choosing to learn more about intercell connectors, a graphic screen display 824 shown in FIG. 89 is presented to a user. Alternatively, upon choosing to learn more about venting systems, a graphic screen display 826 shown in FIG. 90 is presented to the user. Alternatively, upon choosing to learn more about terminal designs, a graphic screen display 828 shown in FIG. 91 is presented to the user.

The previous discussion concerning the sequencing of graphic screen displays as indicated in FIG. 24A, 24B, 24C, 24D, 24E and 24F is provided by way of an example. It will be appreciated by those familiar with the art that such a sequence of screens can be readily altered to perform numerous types of tasks including training and product presentations. It will also be appreciated by those familiar with the art that the overall topic of discussion could be any one of a number of different types of parts or information related to parts, for example, information about filters, remanufactured electrical parts, lubrication or bearings could also be important topics to provide training or sales assistance through the use of screen displays. As such, the present invention should not be construed to be limited to depicting information concerning a battery part but rather encompasses providing training or sales assistance about various types of parts and parts related information including customers, particular kinds of parts, particular manufacturer's parts, particular advantages to particular parts and any reasonable variation thereof.

Although the present invention has been described and illustrated with a certain degree of particularity, it is understood that the present disclosure of embodiments has been made by way of example only and that numerous changes in the arrangement and combination of parts as well as steps may be resorted by those skilled in the art without departing from the spirit and scope of the present invention as claimed.

What is claimed is:

1. A computerized method of selling parts for particular equipment specified by a customer, comprising the steps of:
   a) receiving information identifying a customer's parts requirements for the equipment, comprising the step of receiving equipment application information, comprising an identification of the equipment with which one or more parts are to be used;
   b) electronically specifying information identifying a plurality of parts and specifications for the parts;
   c) gathering parts-related information for one or more parts within the plurality of parts which meets the customer's requirements, comprising the step of electronically associating at least one of the parts within the plurality of parts with the received equipment application information; and
   d) receiving the gathered parts-related information and compiling the parts-related information into a proposal meeting the customer's requirements.

2. The method of claim 1 wherein:
   a) the step (a) further comprises the step of receiving at least a portion of a manufacturer's part number; and
   b) the step (c) further comprises the step of electronically associating at least one of the parts within the plurality of parts with the received portion of a manufacturer's part number.

3. The method of claim 1 wherein:
   a) the step (a) further comprises the step of receiving feature information; and
   b) the step (c) further comprises the step of electronically associating at least one of the parts within the plurality of parts with the received feature information.

4. The method of claim 1 wherein the step (a) further comprises the steps of:
   a) selecting a type of the equipment; and
   b) selecting a manufacturer of the equipment.

5. The method of claim 1 wherein the step (d) comprises the step of generating a printed version of the proposal.

6. The method of claim 1 wherein the step (d) further comprises the step of including within the proposal specifications corresponding to the one or more parts which meets the customer's requirements.

7. The method of claim 1 wherein the step (d) further comprises the step of including within the proposal price information corresponding to the one or more parts which meets the customer's requirements.

8. The method of claim 1 wherein the step (d) comprises the step of including within the proposal graphical information corresponding to the one or more parts which meets the customer's requirements.

9. The method of claim 1 wherein the step (d) comprises the step of including within the proposal textual information corresponding to the one or more parts which meets the customer's requirements.

10. The method of claim 1 wherein the step (d) comprises the step of generating an animated demonstration illustrating how a particular identified part works.

11. The method of claim 1 wherein the step (d) comprises the step of graphically illustrating within the proposal construction features of a particular one of the parts which meets the customer's requirements.

12. The method of claim 1 wherein:

a) the step (a) further comprises the step of receiving information identifying a first feature and a second feature of a particular part within the plurality of parts;

b) the step (c) further comprises the step of accessing a storage means and retrieving information to compare the first and second features, comprising the steps of:

i) generating a first set of information describing the first and second features; and ii) generating a second set of information describing how the first and second features affect performance of the particular part; and c) the step (d) comprises the step of compiling the first and second sets of information into the proposal.

13. The method of claim 12 wherein:

a) the step of accessing the storage means and retrieving information to compare the first and second features further comprises the step of generating textual information describing the first and second features; and b) the step (d) further comprises the step of compiling the textual information into the proposal.

14. The method of claim 13 wherein:

a) the step of accessing the storage means and retrieving information to compare the first and second features further comprises the step of generating graphical information describing the first and second features; and b) the step (d) further comprises the step of compiling the graphical information into the proposal.

15. The method of claim 1 wherein the method is executed by a portable personal computer.

* * * * *

UNITED STATES PATENT AND TRADEMARK OFFICE
CERTIFICATE OF CORRECTION

PATENT NO. : 5,367,627  Page 1 of 1
APPLICATION NO. : 08/133986
DATED : November 22, 1994
INVENTOR(S) : Johnson It is certified that error appears in the above-identified patent and that said Letters Patent is hereby corrected as shown below:

On the title page of the patent, under the Item (63) Related U.S. Application Data, the date reading "November 13, 1989" should read --November 10, 1989--;

In column 1, line 7 of the patent, the date reading "November 13, 1989" should read--November 10, 1989--.

Signed and Sealed this

Twenty-fourth Day of April, 2007

JON W. DUDAS
*Director of the United States Patent and Trademark Office*

(12) EX PARTE REEXAMINATION CERTIFICATE (8787th)
United States Patent
Johnson

(10) Number: US 5,367,627 C1
(45) Certificate Issued: Jan. 10, 2012

(54) COMPUTER-ASSISTED PARTS SALES METHOD

(75) Inventor: Jerome D. Johnson, Mankato, MN (US)

(73) Assignee: Clear WTH Computers, LLC, Indian Wells, CA (US)

Reexamination Request:
No. 90/010,185, Jun. 3, 2008

Reexamination Certificate for:
Patent No.: 5,367,627
Issued: Nov. 22, 1994
Appl. No.: 08/133,986
Filed: Oct. 12, 1993

Certificate of Correction issued Apr. 24, 2007.

Related U.S. Application Data

(63) Continuation of application No. 07/959,525, filed on Oct. 13, 1992, now Pat. No. 5,283,865, which is a continuation of application No. 07/435,809, filed on Nov. 10, 1989, now abandoned.

(51) Int. Cl.
*G06Q 10/00* (2006.01)
*G06F 3/033* (2006.01)

(52) U.S. Cl. .................. 715/708; 715/202; 715/273; 715/962

(58) Field of Classification Search ...................... None
See application file for complete search history.

(56) References Cited

To view the complete listing of prior art documents cited during the proceeding for Reexamination Control Number 90/010,185, please refer to the USPTO's public Patent Application Information Retrieval (PAIR) system under the Display References tab.

*Primary Examiner*—Lynne Browne

(57) ABSTRACT

A computerized system provides a salesperson with assistance related to training and sales of parts corresponding to particular products. More particularly, a computerized system incorporating a data storage device, a display apparatus, a part selection device and a user interface mechanism enhances the efforts of a parts salesman. The data storage device electronically stores graphic and textual partsrelated information including specifications, features and customer benefits. The display apparatus electronically displays portions of the graphic and textual information in order to provide training and sales assistance related to part features and customer benefits. The part selection device electronically selects a particular part by navigating through part choices menus based on stored part specifications. The user interface mechanism controls the operation of the display apparatus and the part selection device parts so that each of the respective parts are operatively coupled and related to one another.

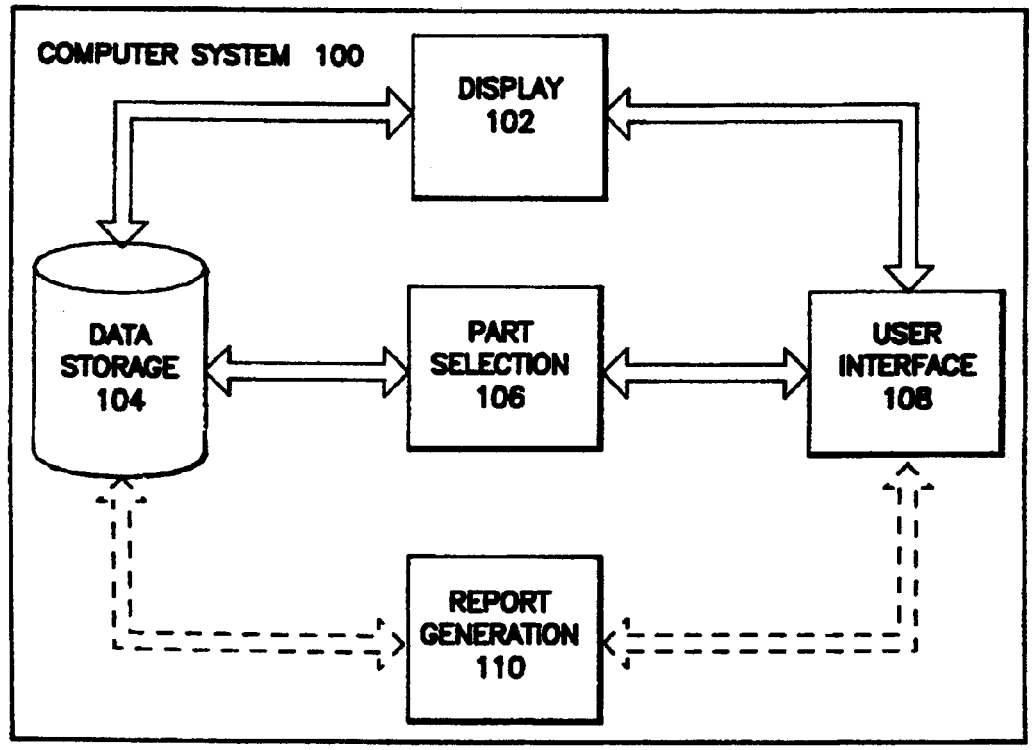

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1 and 6-8 are cancelled.

Claims 2-5 and 9-15 were not reexamined.

\* \* \* \* \*